US012422725B2

(12) United States Patent
Khanna et al.

(10) Patent No.: US 12,422,725 B2
(45) Date of Patent: *Sep. 23, 2025

(54) CONTROL METHODS AND SYSTEMS USING OUTSIDE TEMPERATURE AS A DRIVER FOR CHANGING WINDOW TINT STATES

(71) Applicant: View Operating Corporation, Milpitas, CA (US)

(72) Inventors: Nitin Khanna, Sunnyvale, CA (US); Jack Kendrick Rasmus-Vorrath, Mountain House, CA (US); Stephen Clark Brown, San Mateo, CA (US)

(73) Assignee: View Operating Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/608,299

(22) Filed: Mar. 18, 2024

(65) Prior Publication Data

US 2024/0369893 A1 Nov. 7, 2024

Related U.S. Application Data

(63) Continuation of application No. 17/753,098, filed as application No. PCT/US2020/047525 on Aug. 21, 2020, now Pat. No. 11,966,142, and a continuation-in-part of application No. PCT/US2019/023268, filed on Mar. 20, 2019, which is a continuation-in-part of application No. 16/013,770, filed on Jun. 20, 2018, now Pat. No. 10,802,372, which is a continuation of application No. 15/347,677, filed on Nov. 9, 2016, now Pat. No. 10,048,561, which is a continuation-in-part of application No. PCT/US2015/029675, filed on May 7, 2015, said application No. 15/347,677 is a continuation-in-part of application No. 13/772,969, filed on Feb. 21, 2013, now Pat. No. 9,638,978, said application No. PCT/US2020/047525 is a continuation-in-part of application No. 16/013,770, filed on Jun. 20, 2018, now Pat. No. 10,802,372.

(60) Provisional application No. 62/891,102, filed on Aug. 23, 2019, provisional application No. 62/646,260, filed on Mar. 21, 2018, provisional application No. (Continued)

(51) Int. Cl.
*G02F 1/163* (2006.01)
*G05B 19/048* (2006.01)
*E06B 9/24* (2006.01)
*G02B 5/20* (2006.01)

(52) U.S. Cl.
CPC .......... *G02F 1/163* (2013.01); *G05B 19/048* (2013.01); *E06B 2009/2464* (2013.01); *G02B 5/20* (2013.01)

(58) Field of Classification Search
CPC ................... G02F 1/163; G05B 19/048; E06B 2009/2464; G02B 5/20
See application file for complete search history.

(56) References Cited

U.S. PATENT DOCUMENTS 3,963,347 A 6/1976 Segre et al.
4,355,896 A 10/1982 Frosch et al.
(Continued)

*Primary Examiner* — Zhipeng Wang
(74) *Attorney, Agent, or Firm* — Cha & Reiter, LLC

(57) ABSTRACT

Methods and systems for determining tint of at least one tintable window when the outside temperature is greater than a first threshold and/or less than a second threshold value.

20 Claims, 36 Drawing Sheets

Related U.S. Application Data

62/666,572, filed on May 3, 2018, provisional application No. 61/991,375, filed on May 9, 2014.

(56) References Cited

U.S. PATENT DOCUMENTS

| | | |
|---|---|---|
| 5,124,833 A | 6/1992 | Barton et al. |
| 5,170,108 A | 12/1992 | Peterson et al. |
| 5,204,778 A | 4/1993 | Bechtel |
| 5,220,317 A | 6/1993 | Lynam et al. |
| 5,290,986 A | 3/1994 | Colon et al. |
| 5,353,148 A | 10/1994 | Eid et al. |
| 5,365,365 A | 11/1994 | Ripoche et al. |
| 5,379,146 A | 1/1995 | Defendini |
| 5,379,215 A | 1/1995 | Kruhoeffer et al. |
| 5,384,578 A | 1/1995 | Lynam et al. |
| 5,402,144 A | 3/1995 | Ripoche |
| 5,451,822 A | 9/1995 | Bechtel et al. |
| 5,583,972 A | 12/1996 | Miller |
| 5,598,000 A | 1/1997 | Popat |
| 5,621,526 A | 4/1997 | Kuze |
| 5,663,621 A | 9/1997 | Popat |
| 5,673,028 A | 9/1997 | Levy |
| 5,694,144 A | 12/1997 | Lefrou et al. |
| 5,760,558 A | 6/1998 | Popat |
| 5,764,402 A | 6/1998 | Thomas et al. |
| 5,822,107 A | 10/1998 | Lefrou et al. |
| 5,900,720 A | 5/1999 | Kallman et al. |
| 5,956,012 A | 9/1999 | Turnbull et al. |
| 5,973,818 A | 10/1999 | Sjursen et al. |
| 5,973,819 A | 10/1999 | Pletcher et al. |
| 5,978,126 A | 11/1999 | Sjursen |
| 6,002,511 A | 12/1999 | Varaprasad et al. |
| 6,039,390 A | 3/2000 | Agrawal et al. |
| 6,039,850 A | 3/2000 | Schulz |
| 6,055,089 A | 4/2000 | Schulz et al. |
| 6,064,949 A | 5/2000 | Werner et al. |
| 6,084,231 A | 7/2000 | Popat |
| 6,084,700 A | 7/2000 | Knapp et al. |
| 6,125,327 A | 9/2000 | Kalenian |
| 6,130,448 A | 10/2000 | Bauer et al. |
| 6,130,772 A | 10/2000 | Cava |
| 6,163,756 A | 12/2000 | Baron et al. |
| 6,222,177 B1 | 4/2001 | Bechtel et al. |
| 6,262,831 B1 | 7/2001 | Bauer et al. |
| 6,266,063 B1 | 7/2001 | Baron et al. |
| 6,386,713 B1 | 5/2002 | Turnbull et al. |
| 6,398,118 B1 | 6/2002 | Rosen et al. |
| 6,407,468 B1 | 6/2002 | LeVesque et al. |
| 6,407,847 B1 | 6/2002 | Poll et al. |
| 6,449,082 B1 | 9/2002 | Agrawal et al. |
| 6,471,360 B2 | 10/2002 | Rukavina et al. |
| 6,493,128 B1 | 12/2002 | Agrawal et al. |
| 6,535,126 B2 | 3/2003 | Lin et al. |
| 6,567,708 B1 | 5/2003 | Bechtel et al. |
| 6,614,577 B1 | 9/2003 | Yu et al. |
| 6,795,226 B2 | 9/2004 | Agrawal et al. |
| 6,819,367 B1 | 11/2004 | Cava |
| 6,829,511 B2 | 12/2004 | Bechtel et al. |
| 6,856,444 B2 | 2/2005 | Ingalls et al. |
| 6,897,936 B1 | 5/2005 | Li et al. |
| 6,940,627 B2 | 9/2005 | Freeman et al. |
| 6,965,813 B2 | 11/2005 | Granqvist et al. |
| 7,085,609 B2 | 8/2006 | Bechtel et al. |
| 7,111,952 B2 | 9/2006 | Veskovic |
| 7,133,181 B2 | 11/2006 | Greer |
| 7,215,318 B2 | 5/2007 | Turnbull et al. |
| 7,277,215 B2 | 10/2007 | Greer |
| 7,304,787 B2 | 12/2007 | Whitesides et al. |
| 7,417,397 B2 | 8/2008 | Berman et al. |
| 7,542,809 B2 | 6/2009 | Bechtel et al. |
| 7,548,833 B2 | 6/2009 | Ahmed |
| 7,567,183 B2 | 7/2009 | Schwenke |
| 7,588,067 B2 | 9/2009 | Veskovic |
| 7,610,910 B2 | 11/2009 | Ahmed |
| 7,800,812 B2 | 9/2010 | Moskowitz |
| 7,817,326 B1 | 10/2010 | Rennig et al. |
| 7,822,490 B2 | 10/2010 | Bechtel et al. |
| 7,873,490 B2 | 1/2011 | Macdonald |
| 7,941,245 B1 | 5/2011 | Popat |
| 7,950,827 B2 | 5/2011 | Veskovic |
| 7,963,675 B2 | 6/2011 | Veskovic |
| 7,972,021 B2 | 7/2011 | Scherer |
| 7,977,904 B2 | 7/2011 | Berman et al. |
| 7,990,603 B2 | 8/2011 | Ash et al. |
| 8,004,739 B2 | 8/2011 | Letocart |
| 8,018,644 B2 | 9/2011 | Gustavsson et al. |
| 8,102,586 B2 | 1/2012 | Albahri |
| 8,164,818 B2 | 4/2012 | Collins et al. |
| 8,213,074 B1 * | 7/2012 | Shrivastava ............ G02F 1/163 359/275 |
| 8,254,013 B2 | 8/2012 | Mehtani et al. |
| 8,270,059 B2 | 9/2012 | Friedman et al. |
| 8,288,981 B2 | 10/2012 | Zaharchuk et al. |
| 8,292,228 B2 | 10/2012 | Mitchell et al. |
| 8,300,298 B2 | 10/2012 | Wang et al. |
| 8,380,393 B1 | 2/2013 | Ohtomo |
| 8,432,603 B2 | 4/2013 | Wang et al. |
| 8,456,729 B2 | 6/2013 | Brown et al. |
| 8,547,624 B2 | 10/2013 | Ash et al. |
| 8,582,193 B2 | 11/2013 | Wang et al. |
| 8,705,162 B2 * | 4/2014 | Brown ..................... E06B 9/24 359/275 |
| 8,723,467 B2 | 5/2014 | Berman et al. |
| 8,764,950 B2 | 7/2014 | Wang et al. |
| 8,764,951 B2 | 7/2014 | Wang et al. |
| 8,836,263 B2 | 9/2014 | Berman et al. |
| 8,864,321 B2 | 10/2014 | Mehtani et al. |
| 8,890,456 B2 | 11/2014 | Berman et al. |
| 8,902,486 B1 | 12/2014 | Chandrasekhar |
| 8,934,170 B2 | 1/2015 | Takeda et al. |
| 8,976,440 B2 | 3/2015 | Berland et al. |
| 9,016,630 B2 | 4/2015 | Mitchell et al. |
| 9,030,725 B2 | 5/2015 | Pradhan et al. |
| 9,078,299 B2 | 7/2015 | Ashdown |
| 9,081,246 B2 | 7/2015 | Rozbicki |
| 9,081,247 B1 | 7/2015 | Pradhan et al. |
| 9,128,346 B2 | 9/2015 | Shrivastava et al. |
| 9,226,366 B2 | 12/2015 | Orillard et al. |
| 9,261,751 B2 | 2/2016 | Pradhan et al. |
| 9,298,203 B2 | 3/2016 | Wenzel |
| 9,341,912 B2 | 5/2016 | Shrivastava et al. |
| 9,348,192 B2 | 5/2016 | Brown et al. |
| 9,404,793 B2 | 8/2016 | Yang et al. |
| 9,406,028 B2 | 8/2016 | Humann |
| 9,423,664 B2 | 8/2016 | Brown et al. |
| 9,454,055 B2 | 9/2016 | Brown et al. |
| 9,523,902 B2 | 12/2016 | Parker |
| 9,546,515 B2 | 1/2017 | Hall et al. |
| 9,574,934 B2 | 2/2017 | Verbeek et al. |
| 9,638,978 B2 | 5/2017 | Brown et al. |
| 9,645,465 B2 | 5/2017 | Brown et al. |
| 9,664,974 B2 | 5/2017 | Kozlowski et al. |
| 9,668,315 B2 | 5/2017 | Shearer et al. |
| 9,674,924 B2 | 6/2017 | Lashina et al. |
| 9,709,869 B2 | 7/2017 | Baumann et al. |
| 9,807,857 B2 | 10/2017 | Huang |
| 9,927,674 B2 | 3/2018 | Brown et al. |
| 9,938,765 B2 | 4/2018 | Berman et al. |
| 10,048,561 B2 | 8/2018 | Brown |
| 10,234,596 B2 | 3/2019 | Frank et al. |
| 10,254,618 B2 | 4/2019 | Parker |
| 10,316,581 B1 | 6/2019 | Nagel et al. |
| 10,495,939 B2 | 12/2019 | Brown et al. |
| 10,520,784 B2 | 12/2019 | Brown et al. |
| 10,539,854 B2 | 1/2020 | Brown et al. |
| 10,605,970 B2 | 3/2020 | Blair et al. |
| 10,690,540 B2 | 6/2020 | Brown et al. |
| 10,712,627 B2 | 7/2020 | Brown et al. |
| 10,802,372 B2 | 10/2020 | Brown |
| 10,908,470 B2 | 2/2021 | Brown et al. |
| 10,921,675 B2 | 2/2021 | Barnum et al. |
| 10,982,487 B2 | 4/2021 | Ramirez |
| 11,126,057 B2 | 9/2021 | Brown et al. |
| 11,255,722 B2 | 2/2022 | Zedlitz et al. |

(56) References Cited

U.S. PATENT DOCUMENTS

| | | |
|---|---|---|
| 11,261,654 B2 | 3/2022 | Brown et al. |
| 11,520,207 B2 | 12/2022 | Brown et al. |
| 11,635,666 B2 | 4/2023 | Klawuhn et al. |
| 11,674,843 B2 | 6/2023 | Zedlitz et al. |
| 11,719,990 B2 | 8/2023 | Zedlitz et al. |
| 11,899,331 B2 | 2/2024 | Brown |
| 11,940,705 B2 | 3/2024 | Brown et al. |
| 11,950,340 B2 | 4/2024 | Rozbicki et al. |
| 11,960,190 B2 | 4/2024 | Zedlitz et al. |
| 11,966,142 B2 | 4/2024 | Khanna et al. |
| 2002/0075472 A1 | 6/2002 | Holton |
| 2002/0135881 A1 | 9/2002 | Rukavina et al. |
| 2002/0144831 A1* | 10/2002 | Kalt ............... E06B 9/24 52/200 |
| 2002/0152298 A1 | 10/2002 | Kikta et al. |
| 2003/0142140 A1 | 7/2003 | Brown et al. |
| 2003/0191546 A1 | 10/2003 | Bechtel et al. |
| 2003/0210355 A1 | 11/2003 | Dao |
| 2003/0210449 A1 | 11/2003 | Ingalls et al. |
| 2003/0210450 A1 | 11/2003 | Yu et al. |
| 2003/0227663 A1 | 12/2003 | Agrawal et al. |
| 2003/0227664 A1 | 12/2003 | Agrawal et al. |
| 2004/0001056 A1 | 1/2004 | Atherton et al. |
| 2004/0108191 A1 | 6/2004 | Su et al. |
| 2004/0135989 A1 | 7/2004 | Klebe |
| 2004/0160322 A1 | 8/2004 | Stilp |
| 2005/0046584 A1* | 3/2005 | Breed ............... G06F 3/0237 340/13.31 |
| 2005/0046920 A1 | 3/2005 | Freeman et al. |
| 2005/0063036 A1 | 3/2005 | Bechtel et al. |
| 2005/0200934 A1 | 9/2005 | Callahan et al. |
| 2005/0225830 A1 | 10/2005 | Huang et al. |
| 2005/0268629 A1 | 12/2005 | Ahmed |
| 2005/0270620 A1 | 12/2005 | Bauer et al. |
| 2005/0278047 A1 | 12/2005 | Ahmed |
| 2006/0018000 A1 | 1/2006 | Greer |
| 2006/0107616 A1 | 5/2006 | Ratti et al. |
| 2006/0170376 A1 | 8/2006 | Piepgras et al. |
| 2006/0187608 A1 | 8/2006 | Stark |
| 2006/0207730 A1 | 9/2006 | Berman et al. |
| 2006/0209007 A1 | 9/2006 | Pyo et al. |
| 2006/0245024 A1 | 11/2006 | Greer |
| 2007/0002007 A1 | 1/2007 | Tam |
| 2007/0053053 A1 | 3/2007 | Moskowitz |
| 2007/0055757 A1 | 3/2007 | Mairs et al. |
| 2007/0067048 A1 | 3/2007 | Bechtel et al. |
| 2007/0162233 A1 | 7/2007 | Schwenke |
| 2007/0285759 A1 | 12/2007 | Ash et al. |
| 2008/0012755 A1 | 1/2008 | Venkatachalam et al. |
| 2008/0018979 A1 | 1/2008 | Mahe et al. |
| 2008/0043316 A2 | 2/2008 | Moskowitz |
| 2008/0283621 A1 | 11/2008 | Quirino et al. |
| 2009/0020233 A1 | 1/2009 | Berman et al. |
| 2009/0027759 A1 | 1/2009 | Albahri |
| 2009/0066157 A1 | 3/2009 | Tarng et al. |
| 2009/0139669 A1 | 6/2009 | Robin |
| 2009/0143141 A1 | 6/2009 | Wells et al. |
| 2009/0187287 A1 | 7/2009 | Bruhnke et al. |
| 2009/0204269 A1 | 8/2009 | Bechtel et al. |
| 2009/0222137 A1 | 9/2009 | Berman et al. |
| 2009/0231092 A1 | 9/2009 | Maegawa et al. |
| 2009/0243732 A1 | 10/2009 | Tarng et al. |
| 2009/0243802 A1 | 10/2009 | Wolf et al. |
| 2009/0296188 A1 | 12/2009 | Jain et al. |
| 2009/0323160 A1 | 12/2009 | Egerton et al. |
| 2010/0039410 A1 | 2/2010 | Becker et al. |
| 2010/0066484 A1 | 3/2010 | Hanwright et al. |
| 2010/0071856 A1 | 3/2010 | Zaharchuk et al. |
| 2010/0082081 A1 | 4/2010 | Niessen et al. |
| 2010/0172009 A1 | 7/2010 | Matthews |
| 2010/0172010 A1 | 7/2010 | Gustavsson et al. |
| 2010/0188057 A1 | 7/2010 | Tarng |
| 2010/0235206 A1 | 9/2010 | Miller et al. |
| 2010/0243427 A1 | 9/2010 | Kozlowski et al. |
| 2010/0245972 A1 | 9/2010 | Wright |
| 2010/0245973 A1 | 9/2010 | Wang et al. |
| 2010/0294330 A1 | 11/2010 | Huang et al. |
| 2010/0296081 A1 | 11/2010 | Granqvist |
| 2010/0313476 A1* | 12/2010 | Sethuraman ......... G02B 17/006 49/31 |
| 2010/0315693 A1 | 12/2010 | Lam et al. |
| 2011/0035061 A1 | 2/2011 | Altonen et al. |
| 2011/0046810 A1 | 2/2011 | Bechtel et al. |
| 2011/0063708 A1 | 3/2011 | Letocart |
| 2011/0066302 A1* | 3/2011 | McEwan ............... E06B 9/32 700/295 |
| 2011/0080629 A1 | 4/2011 | Neuman et al. |
| 2011/0148218 A1 | 6/2011 | Rozbicki |
| 2011/0164304 A1 | 7/2011 | Brown et al. |
| 2011/0167617 A1 | 7/2011 | Letocart |
| 2011/0235152 A1 | 9/2011 | Letocart |
| 2011/0249313 A1 | 10/2011 | Letocart |
| 2011/0255142 A1 | 10/2011 | Ash et al. |
| 2011/0260961 A1 | 10/2011 | Burdis |
| 2011/0266137 A1 | 11/2011 | Wang et al. |
| 2011/0266138 A1 | 11/2011 | Wang et al. |
| 2011/0266419 A1 | 11/2011 | Jones et al. |
| 2011/0267674 A1 | 11/2011 | Wang et al. |
| 2011/0267675 A1 | 11/2011 | Wang et al. |
| 2011/0292488 A1 | 12/2011 | McCarthy et al. |
| 2011/0295575 A1 | 12/2011 | Levine et al. |
| 2011/0304898 A1 | 12/2011 | Letocart |
| 2011/0304899 A1 | 12/2011 | Kwak et al. |
| 2012/0007507 A1 | 1/2012 | Niemann et al. |
| 2012/0026573 A1 | 2/2012 | Collins et al. |
| 2012/0033287 A1* | 2/2012 | Friedman ............ G02F 1/161 156/107 |
| 2012/0033288 A1* | 2/2012 | Lee .............. G02F 1/0147 359/288 |
| 2012/0062975 A1 | 3/2012 | Mehtani et al. |
| 2012/0069420 A1 | 3/2012 | Suzuki |
| 2012/0091315 A1 | 4/2012 | Moskowitz |
| 2012/0095601 A1 | 4/2012 | Abraham et al. |
| 2012/0133315 A1 | 5/2012 | Berman et al. |
| 2012/0147449 A1 | 6/2012 | Bhatnagar et al. |
| 2012/0188627 A1 | 7/2012 | Chen et al. |
| 2012/0190386 A1 | 7/2012 | Anderson |
| 2012/0194895 A1 | 8/2012 | Podbelski et al. |
| 2012/0200908 A1 | 8/2012 | Bergh et al. |
| 2012/0236386 A1 | 9/2012 | Mehtani et al. |
| 2012/0239209 A1* | 9/2012 | Brown ............ G02F 1/13318 359/275 |
| 2012/0261078 A1 | 10/2012 | Adams et al. |
| 2012/0265350 A1 | 10/2012 | Ashdown |
| 2012/0268803 A1 | 10/2012 | Greer et al. |
| 2012/0275008 A1 | 11/2012 | Pradhan et al. |
| 2012/0293855 A1 | 11/2012 | Shrivastava et al. |
| 2012/0323382 A1 | 12/2012 | Kamel et al. |
| 2013/0011315 A1* | 1/2013 | Ahmed ............... F24S 50/80 52/173.3 |
| 2013/0021659 A1 | 1/2013 | Friedman et al. |
| 2013/0038093 A1* | 2/2013 | Snider ............... B62D 25/06 296/219 |
| 2013/0057157 A1 | 3/2013 | Nackaerts et al. |
| 2013/0057937 A1* | 3/2013 | Berman ............ G05B 13/04 359/245 |
| 2013/0063065 A1 | 3/2013 | Berman et al. |
| 2013/0139804 A1 | 6/2013 | Goldberg |
| 2013/0158790 A1 | 6/2013 | McIntyre, Jr. et al. |
| 2013/0173926 A1 | 7/2013 | Morese et al. |
| 2013/0242370 A1 | 9/2013 | Wang |
| 2013/0263510 A1 | 10/2013 | Gassion |
| 2013/0264948 A1 | 10/2013 | Orillard et al. |
| 2013/0271812 A1 | 10/2013 | Brown et al. |
| 2013/0271813 A1 | 10/2013 | Brown |
| 2013/0271814 A1 | 10/2013 | Brown |
| 2013/0271815 A1 | 10/2013 | Pradhan et al. |
| 2013/0321923 A1 | 12/2013 | Thuot et al. |
| 2014/0043667 A1 | 2/2014 | Bergh et al. |
| 2014/0067733 A1 | 3/2014 | Humann |
| 2014/0083413 A1 | 3/2014 | Bibi et al. |
| 2014/0104667 A1 | 4/2014 | Greer et al. |
| 2014/0145002 A1 | 5/2014 | Caldeira et al. |

(56) References Cited

U.S. PATENT DOCUMENTS

| | | |
|---|---|---|
| 2014/0160550 A1 | 6/2014 | Brown et al. |
| 2014/0177025 A1 | 6/2014 | Lee et al. |
| 2014/0177028 A1 | 6/2014 | Shrivastava et al. |
| 2014/0236323 A1 | 8/2014 | Brown et al. |
| 2014/0259931 A1 | 9/2014 | Plummer |
| 2014/0262057 A1 | 9/2014 | Chambers et al. |
| 2014/0268287 A1 | 9/2014 | Brown et al. |
| 2014/0288715 A1 | 9/2014 | Beaujeu et al. |
| 2014/0300945 A1 | 10/2014 | Parker |
| 2014/0303788 A1 | 10/2014 | Sanders et al. |
| 2014/0330538 A1 | 11/2014 | Conklin et al. |
| 2014/0371931 A1 | 12/2014 | Lin et al. |
| 2015/0002919 A1 | 1/2015 | Jack et al. |
| 2015/0035440 A1 | 2/2015 | Spero |
| 2015/0049378 A1 | 2/2015 | Shrivastava et al. |
| 2015/0060648 A1 | 3/2015 | Brown et al. |
| 2015/0070745 A1 | 3/2015 | Pradhan |
| 2015/0092259 A1 | 4/2015 | Greer et al. |
| 2015/0116811 A1* | 4/2015 | Shrivastava ............. H04Q 9/00 359/275 |
| 2015/0122474 A1 | 5/2015 | Petersen |
| 2015/0129140 A1* | 5/2015 | Dean ..................... E06B 9/24 160/5 |
| 2015/0185581 A1 | 7/2015 | Pradhan et al. |
| 2015/0219975 A1 | 8/2015 | Phillips et al. |
| 2015/0234945 A1 | 8/2015 | Marceau et al. |
| 2015/0293422 A1 | 10/2015 | Pradhan et al. |
| 2015/0338713 A1 | 11/2015 | Brown |
| 2015/0368967 A1 | 12/2015 | Lundy et al. |
| 2016/0040478 A1* | 2/2016 | Lundy .................... G05B 15/02 700/275 |
| 2016/0054633 A1 | 2/2016 | Brown et al. |
| 2016/0054634 A1 | 2/2016 | Brown et al. |
| 2016/0062332 A1* | 3/2016 | Call ..................... F24F 11/83 236/51 |
| 2016/0124283 A1 | 5/2016 | Brown et al. |
| 2016/0154290 A1 | 6/2016 | Brown et al. |
| 2016/0202589 A1 | 7/2016 | Nagel et al. |
| 2016/0203403 A1 | 7/2016 | Nagel et al. |
| 2016/0223878 A1 | 8/2016 | Tran et al. |
| 2016/0258209 A1* | 9/2016 | Berman .................. E06B 9/32 |
| 2017/0053068 A1 | 2/2017 | Pillai et al. |
| 2017/0075183 A1 | 3/2017 | Brown |
| 2017/0097259 A1 | 4/2017 | Brown et al. |
| 2017/0122802 A1 | 5/2017 | Brown et al. |
| 2017/0123286 A1 | 5/2017 | Parker |
| 2017/0130523 A1 | 5/2017 | Shrivastava et al. |
| 2017/0168368 A1 | 6/2017 | Brown et al. |
| 2017/0219907 A1 | 8/2017 | Brown et al. |
| 2017/0242315 A1* | 8/2017 | Ash ............................. B60J 3/04 |
| 2017/0276542 A1 | 9/2017 | Klawuhn et al. |
| 2017/0279876 A1 | 9/2017 | Prasad et al. |
| 2017/0328121 A1* | 11/2017 | Purdy ..................... E06B 3/677 |
| 2017/0365908 A1 | 12/2017 | Hughes et al. |
| 2018/0073712 A1 | 3/2018 | Baaijens et al. |
| 2018/0129172 A1 | 5/2018 | Shrivastava et al. |
| 2018/0141414 A1* | 5/2018 | Lota ............................ B60J 3/04 |
| 2018/0157141 A1 | 6/2018 | Brown et al. |
| 2018/0162203 A1* | 6/2018 | Boehm .................. B60Q 9/00 |
| 2018/0187484 A1* | 7/2018 | Hebeisen ............... G05B 17/02 |
| 2018/0231860 A1 | 8/2018 | Podbelski et al. |
| 2018/0284555 A1 | 10/2018 | Klawuhn et al. |
| 2018/0307114 A1 | 10/2018 | Brown et al. |
| 2018/0373111 A1 | 12/2018 | Brown |
| 2019/0025661 A9 | 1/2019 | Brown et al. |
| 2019/0171081 A1 | 6/2019 | Zedlitz et al. |
| 2019/0230776 A1 | 7/2019 | Casey et al. |
| 2019/0250029 A1 | 8/2019 | Zedlitz et al. |
| 2019/0257143 A1 | 8/2019 | Nagel et al. |
| 2019/0294018 A1 | 9/2019 | Shrivastava et al. |
| 2020/0007762 A1 | 1/2020 | Dallmeier |
| 2020/0057346 A1 | 2/2020 | Zedlitz et al. |
| 2020/0063490 A1 | 2/2020 | Hebeisen et al. |
| 2020/0072674 A1 | 3/2020 | Baker et al. |
| 2020/0096831 A1 | 3/2020 | Brown et al. |
| 2020/0260556 A1 | 8/2020 | Rozbicki et al. |
| 2020/0355977 A1 | 11/2020 | Brown et al. |
| 2020/0393733 A1 | 12/2020 | Brown |
| 2021/0003899 A1 | 1/2021 | Zedlitz et al. |
| 2021/0080319 A1 | 3/2021 | Brown et al. |
| 2021/0190991 A1 | 6/2021 | Frank et al. |
| 2021/0214274 A1 | 7/2021 | Friedman et al. |
| 2021/0325754 A1 | 10/2021 | Brown et al. |
| 2022/0113184 A1* | 4/2022 | Zedlitz .................. E06B 3/6715 |
| 2022/0214592 A1 | 7/2022 | Brown et al. |
| 2022/0326584 A1 | 10/2022 | Khanna et al. |
| 2023/0004059 A1 | 1/2023 | Klawuhn et al. |
| 2023/0152654 A1 | 5/2023 | Klawuhn et al. |
| 2023/0341259 A1 | 10/2023 | Zedlitz et al. |
| 2023/0408883 A1 | 12/2023 | Zedlitz et al. |
| 2024/0103332 A1 | 3/2024 | Brown et al. |
| 2024/0160076 A1 | 5/2024 | Brown |
| 2024/0168354 A1 | 5/2024 | Brown et al. |
| 2024/0210781 A1 | 6/2024 | Zedlitz et al. |

* cited by examiner

Table 1

| Time | Zone 1 Glare | Zone 1 Reflection | Zone 1 Passive Heat |
|---|---|---|---|
| 7:30:00 AM | 0 | 0 | 1 |
| 7:40:00 AM | 0 | 0 | 1 |
| 7:50:00 AM | 0 | 0 | 1 |
| 8:00:00 AM | 0 | 0 | 1 |
| 8:10:00 AM | 0 | 1 | 1 |
| 8:20:00 AM | 0 | 1 | 1 |
| 8:30:00 AM | 0 | 1 | 1 |
| 8:40:00 AM | 0 | 1 | 1 |
| 8:50:00 AM | 0 | 1 | 0 |
| 9:00:00 AM | 1 | 1 | 0 |
| 9:10:00 AM | 1 | 1 | 0 |
| 9:20:00 AM | 1 | 1 | 0 |
| 9:30:00 AM | 1 | 1 | 0 |
| 9:40:00 AM | 1 | 1 | 0 |
| 9:50:00 AM | 1 | 1 | 0 |
| 10:00:00 AM | 1 | 1 | 0 |
| 10:10:00 AM | 1 | 1 | 0 |
| 10:20:00 AM | 1 | 1 | 0 |
| 10:30:00 AM | 1 | 1 | 0 |
| 10:40:00 AM | 1 | 1 | 0 |
| 10:50:00 AM | 1 | 1 | 0 |

Table 2

| Zone | Glare | Reflection | Passive Heat |
|---|---|---|---|
| Zone 1 | 4 | 3 | 2 |
| Zone 2 | 4 | 3 | 2 |
| Zone 3 | 3 | 2 | 2 |
| Zone 4 | 3 | 2 | 2 |
| Zone 5 | 4 | 3 | 2 |
| Zone 6 | 4 | 3 | 2 |
| Zone 7 | 4 | 3 | 2 |
| Zone 8 | 4 | 3 | 2 |
| Zone 9 | 4 | 3 | 2 |
| Zone 10 | 4 | 3 | 2 |

Table 3

| | Glare | Reflection | Passive Heat |
|---|---|---|---|
| Zone 1 | 1 | 2 | 3 |
| Zone 2 | 1 | 2 | 3 |
| Zone 3 | 1 | 2 | 3 |
| Zone 4 | 1 | 2 | 3 |
| Zone 5 | 1 | 2 | 3 |
| Zone 6 | 1 | 2 | 3 |
| Zone 7 | 1 | 2 | 3 |
| Zone 8 | 1 | 2 | 3 |
| Zone 9 | 1 | 2 | 3 |
| Zone 10 | 1 | 2 | 3 |

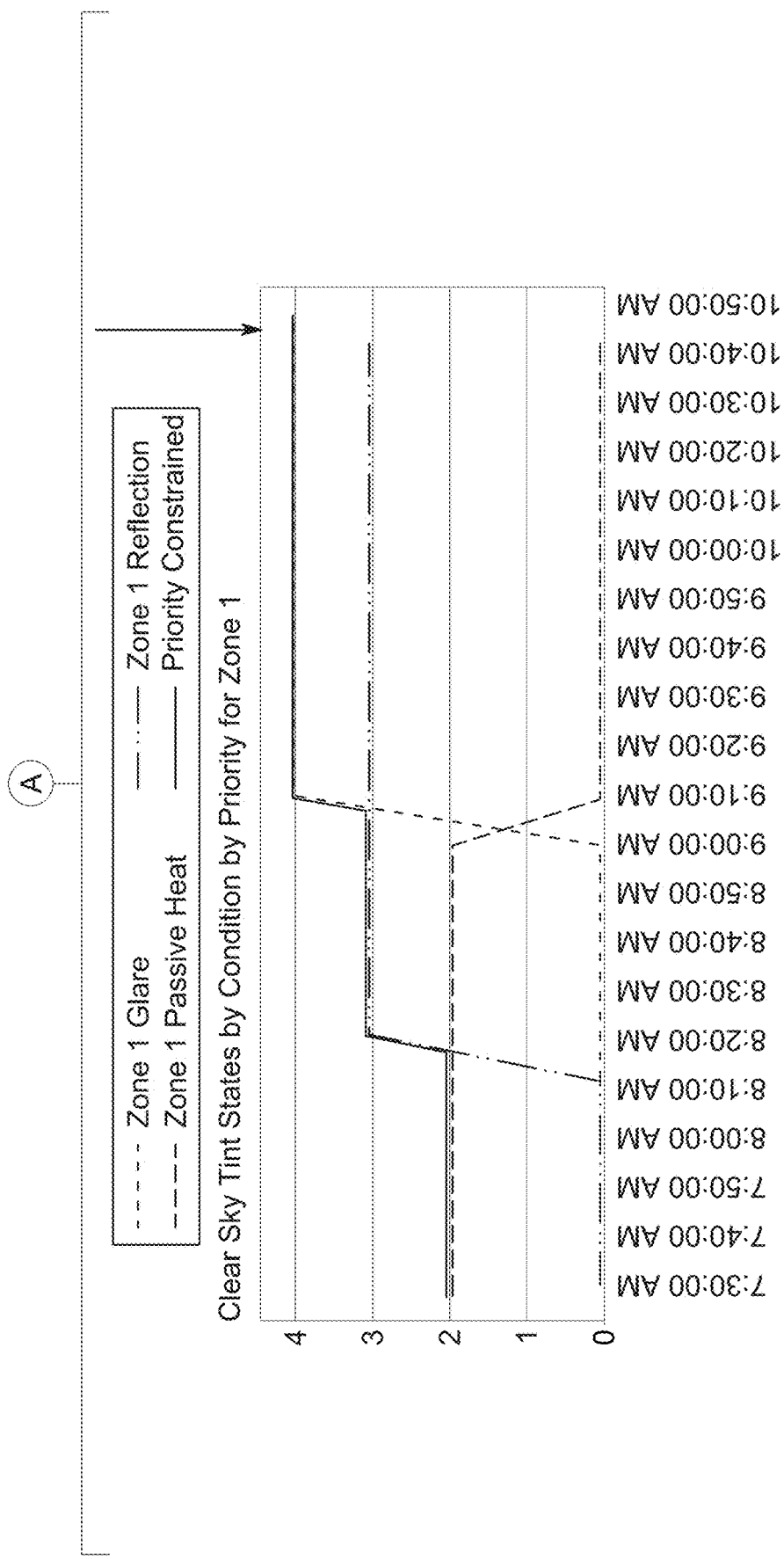
FIG. 12 (Continued...)

Clear Sky Tint Schedule data generated by Cloud-based Clear Sky Module
Module C – Irradiance Photosensor
Module D – Infrared Sensor

CONTROL METHODS AND SYSTEMS USING OUTSIDE TEMPERATURE AS A DRIVER FOR CHANGING WINDOW TINT STATES

CROSS-REFERENCES TO RELATED APPLICATIONS

An Application Data Sheet is filed concurrently with this specification as part of the present application. Each application that the present application claims benefit of or priority to as identified in the concurrently filed Application Data Sheet is incorporated by reference herein in its entirety and for all purposes.

FIELD

The embodiments disclosed herein relate generally to window controllers and related control logic for implementing methods of controlling tint and other functions of tintable windows (e.g., electrochromic windows).

BACKGROUND

Electrochromism is a phenomenon in which a material exhibits a reversible electrochemically-mediated change in an optical property when placed in a different electronic state, typically by being subjected to a voltage change. The optical property is typically one or more of color, transmittance, absorbance, and reflectance. One well known electrochromic material is tungsten oxide ($WO_3$). Tungsten oxide is a cathodic electrochromic material in which a coloration transition, transparent to blue, occurs by electrochemical reduction.

Electrochromic materials may be incorporated into, for example, windows for home, commercial and other uses. The color, transmittance, absorbance, and/or reflectance of such windows may be changed by inducing a change in the electrochromic material, that is, electrochromic windows are windows that can be darkened or lightened electronically. A small voltage applied to an electrochromic device of the window will cause them to darken; reversing the voltage causes them to lighten. This capability allows control of the amount of light that passes through the windows, and presents an opportunity for electrochromic windows to be used as energy-saving devices.

While electrochromism was discovered in the 1960s, electrochromic devices, and particularly electrochromic windows, still unfortunately suffer various problems and have not begun to realize their full commercial potential despite many recent advances in electrochromic technology, apparatus and related methods of making and/or using electrochromic devices.

SUMMARY

In one embodiment, the one or more tintable windows include only all solid state and inorganic electrochromic devices.

Certain aspects pertain to a method of determining a tint level for each zone of tintable windows of a building based on output from glare and reflection models of the building site. The method initializes and assigns attributes to a 3D model of the building site. The method also generates one or more three-dimensional occupancy regions in the 3D model and generates glare and reflection models based on the 3D model. In addition, the method determines an intersection of a three-dimensional occupancy region with three-dimensional light projections through tintable windows of each zone in the clear sky glare or reflection models, evaluates whether one or more conditions exists based on the determined intersection, and determines a tint state for each zone based on the evaluation. In one implementation, the 3D model resides on a on a cloud-based 3D modelling platform.

Certain aspects pertain to a system for generating a 3D model of a building site and determining a schedule of tint states for each zone of tintable windows of a building at the building site. The system comprises a network with computer readable medium and one or more processors in communication with the computer readable medium. The system further comprises a clear sky logic module stored on the computer readable medium, the clear sky logic module configured to generate a glare model and a reflection model based on the 3D model, determine a tint state for each zone at each time interval based on output from the glare model and/or the reflection model, and push, via a communication network, the schedule of tint states for each zone to a network of window controllers at the building. The network of window controllers is configured to control the tint state of each of the one or more zones of tintable windows of the building based on a minimum of the tint state from the schedule and a weather-based tint state based on one or both of infrared sensor readings and photosensor readings. In one implementation, the network is a cloud network.

Certain aspects pertain to a system for customizing spaces of a 3D model of a building site and controlling tinting of one or more zones of tintable windows of a building at the building site. The system comprises a network with one or more processors and computer readable medium in communication with the one or more processors, a communications interface configured to receive input for customizing spaces of the 3D model from one or more users and to output visualizations to the one or more users, a 3D modelling system configured to customize the 3D model based on the input received from the one or more users, and a clear sky logic module stored on the computer readable medium, the clear sky logic module configured to generate a glare model and a reflection model based on the customized 3D model, determine a tint state for each zone at each time interval based on output from the glare model and/or the reflection model, and provide a visualization of the customized 3D model to the one or more users via the communications interface. In one implementation, the network is a cloud network and the 3D modelling system resides on the cloud network.

Certain aspects pertain to a method of controlling tint of one or more zones of tintable windows of a building at a building site. The method includes receiving schedule information with a clear sky tint level for each of the zones, the schedule information derived from clear sky glare and reflection models of the building site, determining a cloud condition using one or both of photosensor readings and infrared sensor readings, calculating a weather-based tint level using the determined cloud condition, and communicating tint instructions over a network to a window controller to transition tint of the zone of tintable windows to the minimum of the clear sky tint level and the weather-based tint level. In one implementation, the clear sky glare and reflection models of the building site reside on a cloud network One aspect pertains to a method of controlling tint of one or more tintable windows located between an interior and an exterior of a building. The method comprises determining a position of the sun with respect to a first tintable window and determining, using the determined position of the sun with respect to the first tintable window, a default tint state for the first tintable window. The method also comprises determining that an outside temperature is at or above a threshold temperature (e.g., at least about 40° C.) and using the determination that the outside temperature is at or above the threshold temperature to determine a modified tint state that is darker than the default tint state for the first tintable window. In addition, the method comprises providing instructions to transition the first tintable window to the modified tint state.

One aspect pertains to a system of controlling tint of one or more tintable windows located between an interior and an exterior of a building. The system includes one or more processors and a controller in communication with the one or more processors and with the tintable window. The one or more processors are configured to determine a position of the sun with respect to a first tintable window and determine, using the determined position of the sun with respect to the first tintable window, a default tint state for the first tintable window. The one or more processors are also configured to determine that an outside temperature is at or above a threshold temperature, use the determination that the outside temperature is at or above the threshold temperature to determine a modified tint state that is darker than the default tint state for the first tintable window, and provide instructions to transition the first tintable window to the modified tint state. The controller is configured to apply commands to transition the first tintable window to the modified tint state.

One aspect pertains to a method of determining a tint state of a tintable window located between an interior and an exterior of a building. The method includes determining a default tint state for the tintable window, determining that an outside temperature is above a threshold temperature, using the determination that the outside temperature is above the threshold temperature to determine a modified tint state that is darker than the default tint state for the tintable window, and providing instructions to transition the tintable window to the modified tint state.

One aspect pertains to a system for controlling tint of a tintable window located between an interior and an exterior of a building. The system includes one or more processors and a controller in communication with the one or more processors and with the tintable window. The one or more processors are configured to determine a default tint state for the tintable window, determine that an outside temperature is above a threshold temperature, use the determination that the outside temperature is above the threshold temperature to determine a modified tint state that is darker than the default tint state for the tintable window, and provide instructions to transition the tintable window to the modified tint state. The controller is configured to apply commands to transition the tintable window to the modified tint state.

One aspect pertains to a method of determining of controlling tint state of at least one tintable window. The method includes determining a baseline tint state for the at least one tintable window using one or more tint decision modules. The method also includes if it is determined that an outside temperature is (i) at or above a first threshold temperature and/or (ii) at or below a second threshold temperature, determining a modified tint state that is a predefined amount darker than the baseline tint state and providing instructions to transition the at least one tintable window to the modified tint state.

One aspect pertains to a system for controlling tint of a tintable window located between an interior and an exterior of a building. The system includes one or more processors and a controller in communication with the one or more processors and with the tintable window. The one or more processors are configured to determine a baseline tint state for the at least one tintable window using one or more tint decision modules, and if it is determined that an outside temperature is (i) at or above a first threshold temperature and/or (ii) at or below a second threshold temperature, determine a modified tint state that is a predefined amount darker than the baseline tint state and provide instructions to transition the at least one tintable window to the modified tint state. The controller is configured to apply commands to transition the tintable window to the modified tint state.

These and other features and embodiments will be described in more detail below with reference to the drawings.

BRIEF DESCRIPTION OF THE DRAWINGS

FIG. 12 is schematic illustration of an example of logic operations of a clear sky module in generating clear sky model schedule information, according to an implementation.

DETAILED DESCRIPTION

In the following description, numerous specific details are set forth in order to provide a thorough understanding of the presented embodiments. The disclosed embodiments may be practiced without some or all of these specific details. In other instances, well-known process operations have not been described in detail to not unnecessarily obscure the disclosed embodiments. While the disclosed embodiments will be described in conjunction with the specific embodiments, it will be understood that it is not intended to limit the disclosed embodiments. It should be understood that while disclosed embodiments focus on electrochromic windows (also referred to as smart windows), the aspects disclosed herein may apply to other types of tintable windows. For example, a tintable window incorporating a liquid crystal device or a suspended particle device, instead of an electrochromic device could be incorporated in any of the disclosed embodiments.

I. Overview of Electrochromic Devices and Window Controllers

In order to orient the reader to the embodiments of systems and methods disclosed herein, a brief discussion of electrochromic devices and window controllers is provided. This initial discussion is provided for context only, and the subsequently described embodiments of systems, window controllers, and methods are not limited to the specific features and fabrication processes of this initial discussion.

A. Electrochromic Devices

Figure 1A:
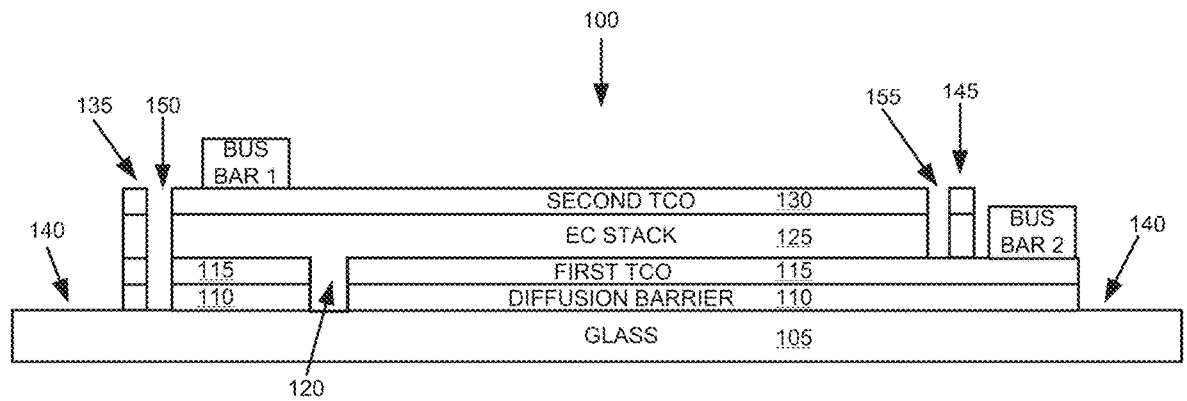
FIGS. 1A-1C show schematic diagrams of electrochromic devices formed on glass substrates, i.e., electrochromic lites.
Figure 1B:
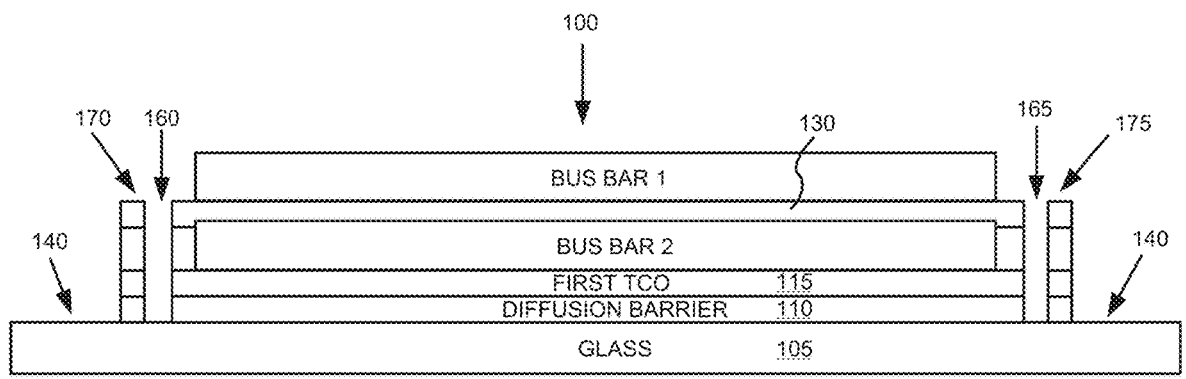
Figure 1C:
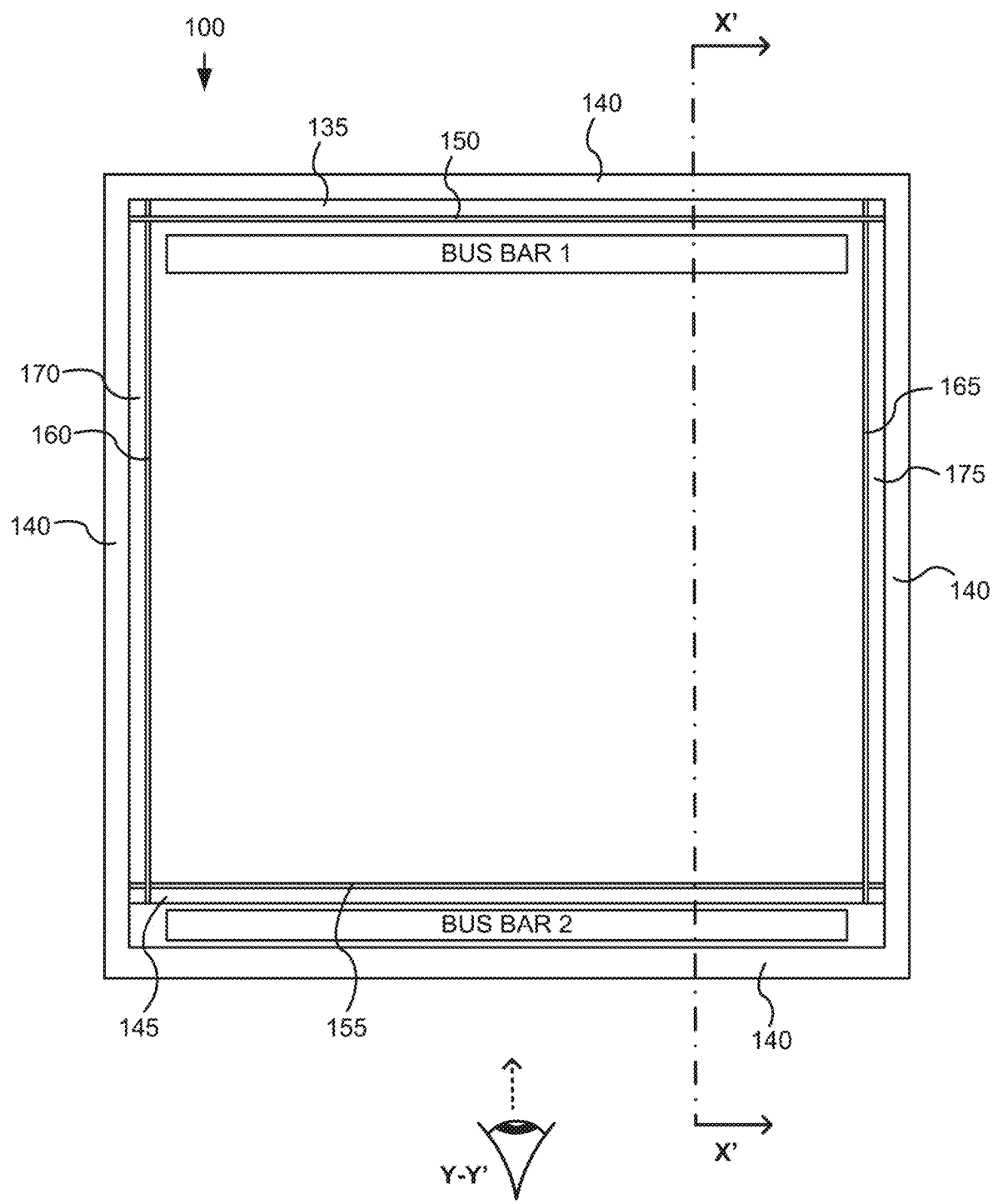

A particular example of an electrochromic lite is described with reference to FIGS. 1A-1C, in order to illustrate embodiments described herein. FIG. 1A is a cross-sectional representation (see section cut X'-X' of FIG. 1C) of an electrochromic lite 100, which is fabricated starting with a glass sheet 105. FIG. 1B shows an end view (see viewing perspective Y-Y' of FIG. 1C) of electrochromic lite 100, and FIG. 1C shows a top-down view of electrochromic lite 100. FIG. 1A shows the electrochromic lite after fabrication on glass sheet 105, edge deleted to produce area 140, around the perimeter of the lite. The electrochromic lite has also been laser scribed and bus bars have been attached. The glass lite 105 has a diffusion barrier 110, and a first transparent conducting oxide layer (TCO) 115, on the diffusion barrier. In this example, the edge deletion process removes both TCO 115 and diffusion barrier 110, but in other embodiments only the TCO is removed, leaving the diffusion barrier intact. The TCO 115 is the first of two conductive layers used to form the electrodes of the electrochromic device fabricated on the glass sheet. In this example, the glass sheet includes underlying glass and the diffusion barrier layer. Thus, in this example, the diffusion barrier is formed, and then the first TCO, an electrochromic stack 125, (e.g., having electrochromic, ion conductor, and counter electrode layers), and a second TCO 130, are formed. In one embodiment, the electrochromic device (electrochromic stack and second TCO) is fabricated in an integrated deposition system where the glass sheet does not leave the integrated deposition system at any time during fabrication of the stack. In one embodiment, the first TCO layer is also formed using the integrated deposition system where the glass sheet does not leave the integrated deposition system during deposition of the electrochromic stack and the (second) TCO layer. In one embodiment, all of the layers (diffusion barrier, first TCO, electrochromic stack, and second TCO) are deposited in the integrated deposition system where the glass sheet does not leave the integrated deposition system during deposition. In this example, prior to deposition of electrochromic stack 125, an isolation trench 120, is cut through TCO 115 and diffusion barrier 110. Trench 120 is made in contemplation of electrically isolating an area of TCO 115 that will reside under bus bar 1 after fabrication is complete (see FIG. 1A). This is done to avoid charge buildup and coloration of the electrochromic device under the bus bar, which can be undesirable.

After formation of the electrochromic device, edge deletion processes and additional laser scribing are performed. FIG. 1A depicts areas 140 where the device has been removed, in this example, from a perimeter region surrounding laser scribe trenches 150, 155, 160, and 165. Trenches 150, 160 and 165 pass through the electrochromic stack and also through the first TCO and diffusion barrier. Trench 155 passes through second TCO 130 and the electrochromic stack, but not the first TCO 115. Laser scribe trenches 150, 155, 160, and 165 are made to isolate portions of the electrochromic device, 135, 145, 170, and 175, which were potentially damaged during edge deletion processes from the operable electrochromic device. In this example, laser scribe trenches 150, 160, and 165 pass through the first TCO to aid in isolation of the device (laser scribe trench 155 does not pass through the first TCO, otherwise it would cut off bus bar 2's electrical communication with the first TCO and thus the electrochromic stack). The laser or lasers used for the laser scribe processes are typically, but not necessarily, pulse-type lasers, for example, diode-pumped solid state lasers. For example, the laser scribe processes can be performed using a suitable laser from IPG Photonics (of Oxford, Massachusetts), or from Ekspla (of Vilnius, Lithuania). Scribing can also be performed mechanically, for example, by a diamond tipped scribe. One of ordinary skill in the art would appreciate that the laser scribing processes can be performed at different depths and/or performed in a single process whereby the laser cutting depth is varied, or not, during a continuous path around the perimeter of the electrochromic device. In one embodiment, the edge deletion is performed to the depth of the first TCO.

After laser scribing is complete, bus bars are attached. Non-penetrating bus bar 1 is applied to the second TCO. Non-penetrating bus bar 2 is applied to an area where the device was not deposited (e.g., from a mask protecting the first TCO from device deposition), in contact with the first TCO or, in this example, where an edge deletion process (e.g., laser ablation using an apparatus having a XY or XYZ galvanometer) was used to remove material down to the first TCO. In this example, both bus bar 1 and bus bar 2 are non-penetrating bus bars. A penetrating bus bar is one that is typically pressed into and through the electrochromic stack to make contact with the TCO at the bottom of the stack. A non-penetrating bus bar is one that does not penetrate into the electrochromic stack layers, but rather makes electrical and physical contact on the surface of a conductive layer, for example, a TCO.

The TCO layers can be electrically connected using a non-traditional bus bar, for example, a bus bar fabricated with screen and lithography patterning methods. In one embodiment, electrical communication is established with the device's transparent conducting layers via silk screening (or using another patterning method) a conductive ink followed by heat curing or sintering the ink. Advantages to using the above described device configuration include simpler manufacturing, for example, and less laser scribing than conventional techniques which use penetrating bus bars.

After the bus bars are connected, the device is integrated into an insulated glass unit (IGU), which includes, for example, wiring the bus bars and the like. In some embodiments, one or both of the bus bars are inside the finished IGU, however in one embodiment one bus bar is outside the seal of the IGU and one bus bar is inside the IGU. In the former embodiment, area 140 is used to make the seal with one face of the spacer used to form the IGU. Thus, the wires or other connection to the bus bars runs between the spacer and the glass. As many spacers are made of metal, e.g., stainless steel, which is conductive, it is desirable to take steps to avoid short circuiting due to electrical communication between the bus bar and connector thereto and the metal spacer.

As described above, after the bus bars are connected, the electrochromic lite is integrated into an IGU, which includes, for example, wiring for the bus bars and the like. In the embodiments described herein, both of the bus bars are inside the primary seal of the finished IGU.

Figure 2A:
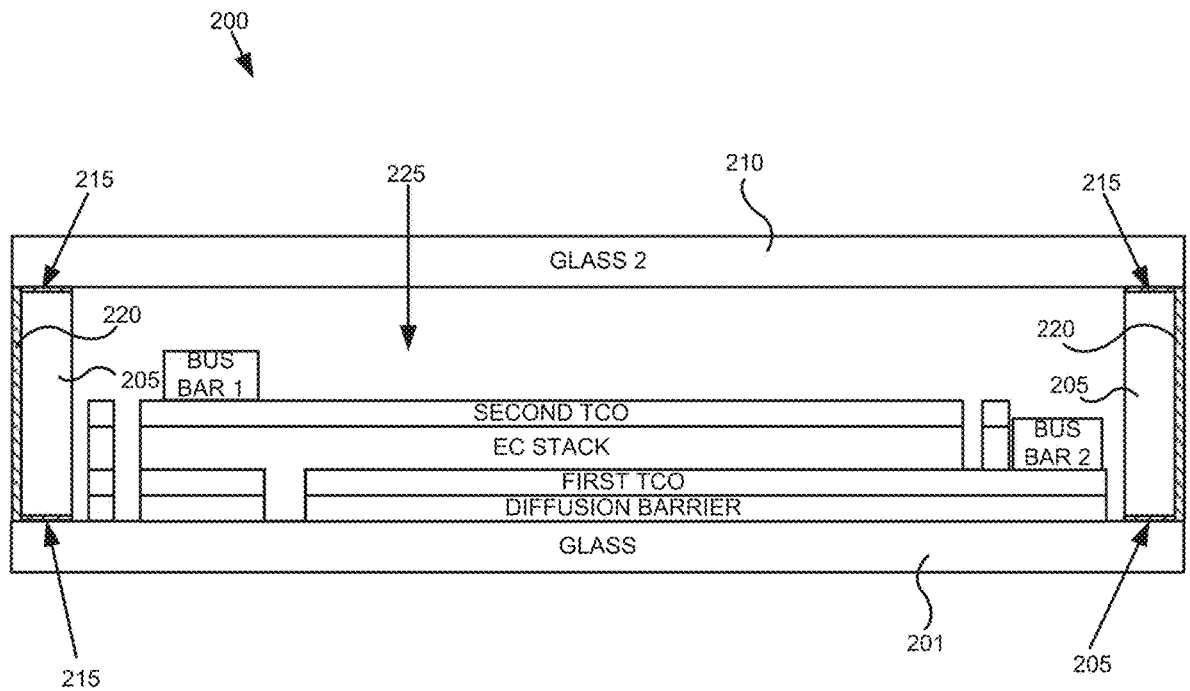
FIGS. 2A and 2B show cross-sectional schematic diagrams of the electrochromic lites as described in relation to FIGS. 1A-1C integrated into an insulated glass unit.
Figure 2B:
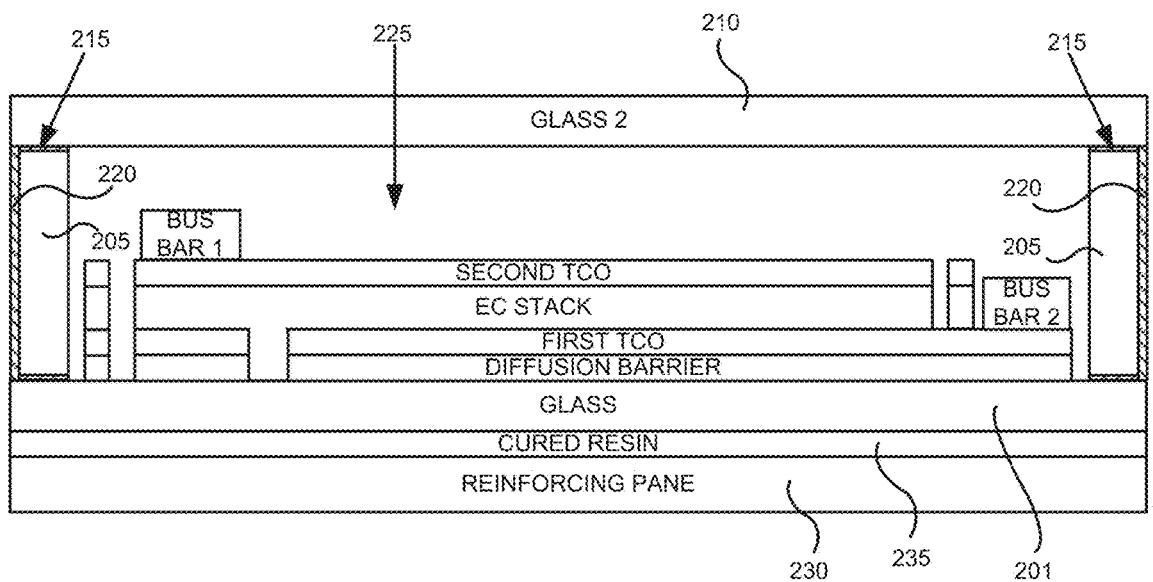

FIG. 2A shows a cross-sectional schematic diagram of the electrochromic window as described in relation to FIGS. 1A-1C integrated into an IGU 200. A spacer 205 is used to separate the electrochromic lite from a second lite 210. Second lite 210 in IGU 200 is a non-electrochromic lite, however, the embodiments disclosed herein are not so limited. For example, lite 210 can have an electrochromic device thereon and/or one or more coatings such as low-E coatings and the like. Lite 201 can also be laminated glass, such as depicted in FIG. 2B (lite 201 is laminated to reinforcing pane 230, via resin 235). Between spacer 205 and the first TCO layer of the electrochromic lite is a primary seal material 215. This primary seal material is also between spacer 205 and second glass lite 210. Around the perimeter of spacer 205 is a secondary seal 220. Bus bar wiring/leads traverse the seals for connection to a controller. Secondary seal 220 may be much thicker that depicted. These seals aid in keeping moisture out of an interior space 225, of the IGU. They also serve to prevent argon or other gas in the interior of the IGU from escaping.

Figure 3A:
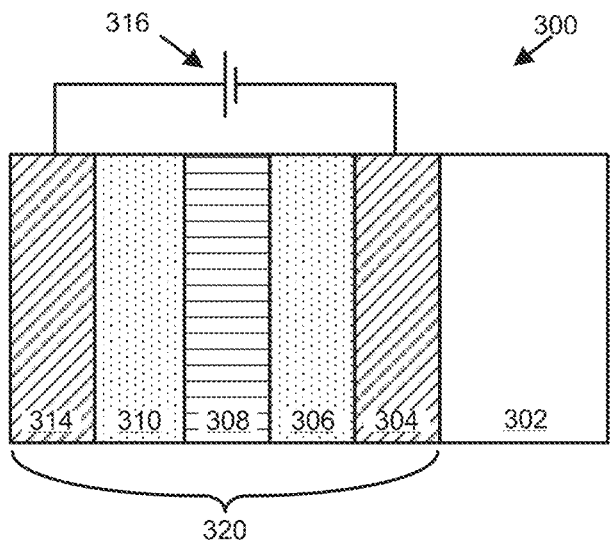
FIG. 3A depicts a schematic cross-section of an electrochromic device.

FIG. 3A schematically depicts an electrochromic device 300, in cross-section. Electrochromic device 300 includes a substrate 302, a first conductive layer (CL) 304, an electrochromic layer (EC) 306, an ion conducting layer (IC) 308, a counter electrode layer (CE) 310, and a second conductive layer (CL) 314. Layers 304, 306, 308, 310, and 314 are collectively referred to as an electrochromic stack 320. A voltage source 316 operable to apply an electric potential across electrochromic stack 320 effects the transition of the electrochromic device from, for example, a bleached state to a colored state (depicted). The order of layers can be reversed with respect to the substrate.

Electrochromic devices having distinct layers as described can be fabricated as all solid state devices and/or all inorganic devices. Such devices and methods of fabricating them are described in more detail in U.S. patent application Ser. No. 12/645,111, entitled "Fabrication of Low-Defectivity Electrochromic Devices," filed on Dec. 22, 2009, and naming Mark Kozlowski et al. as inventors, and in U.S. patent application Ser. No. 12/645,159, entitled, "Electrochromic Devices," filed on Dec. 22, 2009 and naming Zhongchun Wang et al. as inventors, both of which are hereby incorporated by reference in their entireties. It should be understood, however, that any one or more of the layers in the stack may contain some amount of organic material. The same can be said for liquids that may be present in one or more layers in small amounts. It should also be understood that solid state material may be deposited or otherwise formed by processes employing liquid components such as certain processes employing sol-gels or chemical vapor deposition.

Additionally, it should be understood that the reference to a transition between a bleached state and colored state is non-limiting and suggests only one example, among many, of an electrochromic transition that may be implemented. Unless otherwise specified herein (including the foregoing discussion), whenever reference is made to a bleached-colored transition, the corresponding device or process encompasses other optical state transitions such as non-reflective-reflective, transparent-opaque, etc. Further, the term "bleached" refers to an optically neutral state, for example, uncolored, transparent, or translucent. Still further, unless specified otherwise herein, the "color" of an electrochromic transition is not limited to any particular wavelength or range of wavelengths. As understood by those of skill in the art, the choice of appropriate electrochromic and counter electrode materials governs the relevant optical transition.

In embodiments described herein, the electrochromic device reversibly cycles between a bleached state and a colored state. In some cases, when the device is in a bleached state, a potential is applied to the electrochromic stack 320 such that available ions in the stack reside primarily in the counter electrode 310. When the potential on the electrochromic stack is reversed, the ions are transported across the ion conducting layer 308 to the electrochromic material 306 and cause the material to transition to the colored state. In a similar way, the electrochromic device of embodiments described herein can be reversibly cycled between different tint levels (e.g., bleached state, darkest colored state, and intermediate levels between the bleached state and the darkest colored state).

Referring again to FIG. 3A, voltage source 316 may be configured to operate in conjunction with radiant and other environmental sensors. As described herein, voltage source 316 interfaces with a device controller (not shown in this figure). Additionally, voltage source 316 may interface with an energy management system that controls the electrochromic device according to various criteria such as the time of year, time of day, and measured environmental conditions. Such an energy management system, in conjunction with large area electrochromic devices (e.g., an electrochromic window), can dramatically lower the energy consumption of a building.

Any material having suitable optical, electrical, thermal, and mechanical properties may be used as substrate 302. Such substrates include, for example, glass, plastic, and mirror materials. Suitable glasses include either clear or tinted soda lime glass, including soda lime float glass. The glass may be tempered or untempered.

In many cases, the substrate is a glass pane sized for residential window applications. The size of such glass pane can vary widely depending on the specific needs of the residence. In other cases, the substrate is architectural glass. Architectural glass is typically used in commercial buildings, but may also be used in residential buildings, and typically, though not necessarily, separates an indoor environment from an outside environment. In certain embodiments, architectural glass is at least 20 inches by 20 inches, and can be much larger, for example, as large as about 80 inches by 120 inches. Architectural glass is typically at least about 2 mm thick, typically between about 3 mm and about 6 mm thick. Of course, electrochromic devices are scalable to substrates smaller or larger than architectural glass. Further, the electrochromic device may be provided on a mirror of any size and shape.

On top of substrate 302 is conductive layer 304. In certain embodiments, one or both of the conductive layers 304 and 314 is inorganic and/or solid. Conductive layers 304 and 314 may be made from a number of different materials, including conductive oxides, thin metallic coatings, conductive metal nitrides, and composite conductors. Typically, conductive layers 304 and 314 are transparent at least in the range of wavelengths where electrochromism is exhibited by the electrochromic layer. Transparent conductive oxides include metal oxides and metal oxides doped with one or more metals. Examples of such metal oxides and doped metal oxides include indium oxide, indium tin oxide, doped indium oxide, tin oxide, doped tin oxide, zinc oxide, aluminum zinc oxide, doped zinc oxide, ruthenium oxide, doped ruthenium oxide and the like. Since oxides are often used for these layers, they are sometimes referred to as "transparent conductive oxide" (TCO) layers. Thin metallic coatings that are substantially transparent may also be used, as well as combinations of TCOs and metallic coatings.

The function of the conductive layers is to spread an electric potential provided by voltage source 316 over surfaces of the electrochromic stack 320 to interior regions of the stack, with relatively little ohmic potential drop. The electric potential is transferred to the conductive layers though electrical connections to the conductive layers. In some embodiments, bus bars, one in contact with conductive layer 304 and one in contact with conductive layer 314, provide the electric connection between the voltage source 316 and the conductive layers 304 and 314. The conductive layers 304 and 314 may also be connected to the voltage source 316 with other conventional means.

Overlaying conductive layer 304 is electrochromic layer 306. In some embodiments, electrochromic layer 306 is inorganic and/or solid. The electrochromic layer may contain any one or more of a number of different electrochromic materials, including metal oxides. Such metal oxides include tungsten oxide ($WO_3$), molybdenum oxide ($MoO_3$), niobium oxide ($Nb_2O_5$), titanium oxide ($TiO_2$), copper oxide (CuO), iridium oxide ($Ir_2O_3$), chromium oxide ($Cr_2O_3$), manganese oxide ($Mn_2O_3$), vanadium oxide ($V_2O_5$), nickel oxide ($Ni_2O_3$), cobalt oxide ($Co_2O_3$) and the like. During operation, electrochromic layer 306 transfers ions to and receives ions from counter electrode layer 310 to cause optical transitions.

Generally, the colorization (or change in any optical property—e.g., absorbance, reflectance, and transmittance) of the electrochromic material is caused by reversible ion insertion into the material (e.g., intercalation) and a corresponding injection of a charge balancing electron. Typically some fraction of the ions responsible for the optical transition is irreversibly bound up in the electrochromic material. Some or all of the irreversibly bound ions are used to compensate "blind charge" in the material. In most electrochromic materials, suitable ions include lithium ions ($Li+$) and hydrogen ions ($H+$) (that is, protons). In some cases, however, other ions will be suitable. In various embodiments, lithium ions are used to produce the electrochromic phenomena. Intercalation of lithium ions into tungsten oxide ($WO3-y$ ($0<y\leq\sim0.3$)) causes the tungsten oxide to change from transparent (bleached state) to blue (colored state).

Referring again to FIG. 3A, in electrochromic stack 320, ion conducting layer 308 is sandwiched between electrochromic layer 306 and counter electrode layer 310. In some embodiments, counter electrode layer 310 is inorganic and/or solid. The counter electrode layer may comprise one or more of a number of different materials that serve as a reservoir of ions when the electrochromic device is in the bleached state. During an electrochromic transition initiated by, for example, application of an appropriate electric potential, the counter electrode layer transfers some or all of the ions it holds to the electrochromic layer, changing the electrochromic layer to the colored state. Concurrently, in the case of NiWO, the counter electrode layer colors with the loss of ions.

In some embodiments, suitable materials for the counter electrode complementary to WO3 include nickel oxide (NiO), nickel tungsten oxide (NiWO), nickel vanadium oxide, nickel chromium oxide, nickel aluminum oxide, nickel manganese oxide, nickel magnesium oxide, chromium oxide ($Cr2O3$), manganese oxide ($MnO2$), and Prussian blue.

When charge is removed from a counter electrode 310 made of nickel tungsten oxide (that is, ions are transported from counter electrode 310 to electrochromic layer 306), the counter electrode layer will transition from a transparent state to a colored state.

In the depicted electrochromic device, between electrochromic layer 306 and counter electrode layer 310, there is the ion conducting layer 308. Ion conducting layer 308 serves as a medium through which ions are transported (in the manner of an electrolyte) when the electrochromic device transitions between the bleached state and the colored state. Preferably, ion conducting layer 308 is highly conductive to the relevant ions for the electrochromic and the counter electrode layers, but has sufficiently low electron conductivity that negligible electron transfer takes place during normal operation. A thin ion conducting layer with high ionic conductivity permits fast ion conduction and hence fast switching for high performance electrochromic devices. In certain embodiments, the ion conducting layer 308 is inorganic and/or solid.

Examples of suitable ion conducting layers (for electrochromic devices having a distinct IC layer) include silicates, silicon oxides, tungsten oxides, tantalum oxides, niobium oxides, and borates. These materials may be doped with different dopants, including lithium. Lithium doped silicon oxides include lithium silicon-aluminum-oxide. In some embodiments, the ion conducting layer comprises a silicate-based structure. In some embodiments, a silicon-aluminum-oxide (SiAlO) is used for the ion conducting layer 308.

Electrochromic device 300 may include one or more additional layers (not shown), such as one or more passive layers. Passive layers used to improve certain optical properties may be included in electrochromic device 300. Passive layers for providing moisture or scratch resistance may also be included in electrochromic device 300. For example, the conductive layers may be treated with anti-reflective or protective oxide or nitride layers. Other passive layers may serve to hermetically seal electrochromic device 300.

Figure 3B:
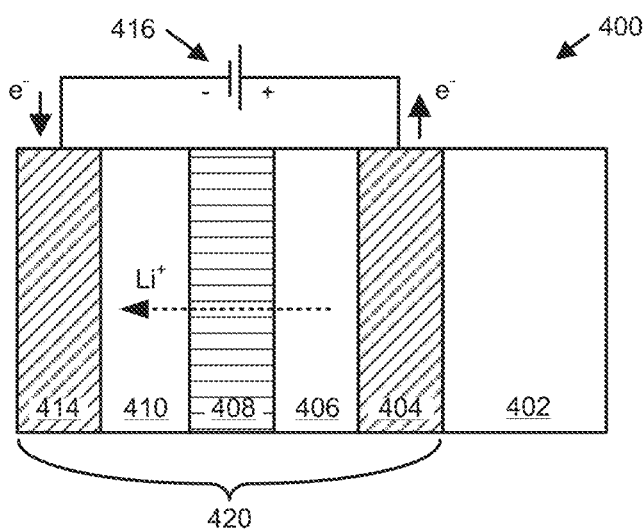
FIG. 3B depicts a schematic cross-section of an electrochromic device in a bleached state (or transitioning to a bleached state).

FIG. 3B is a schematic cross-section of an electrochromic device in a bleached state (or transitioning to a bleached state). In accordance with specific embodiments, an electrochromic device 400 includes a tungsten oxide electrochromic layer (EC) 406 and a nickel-tungsten oxide counter electrode layer (CE) 410. Electrochromic device 400 also includes a substrate 402, a conductive layer (CL) 404, an ion conducting layer (IC) 408, and conductive layer (CL) 414.

A power source 416 is configured to apply a potential and/or current to an electrochromic stack 420 through suitable connections (e.g., bus bars) to the conductive layers 404 and 414. In some embodiments, the voltage source is configured to apply a potential of a few volts in order to drive a transition of the device from one optical state to another. The polarity of the potential as shown in FIG. 3A is such that the ions (lithium ions in this example) primarily reside (as indicated by the dashed arrow) in nickel-tungsten oxide counter electrode layer 410

Figure 3C:
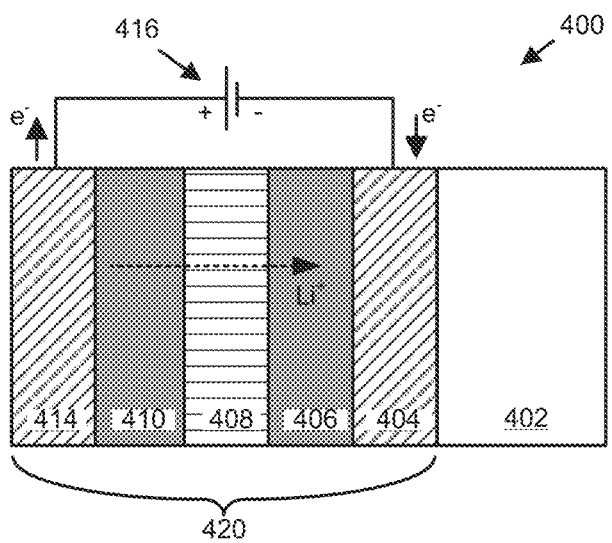
FIG. 3C depicts a schematic cross-section of the electrochromic device shown in FIG. 3B, but in a colored state (or transitioning to a colored state).

FIG. 3C is a schematic cross-section of electrochromic device 400 shown in FIG. 3B but in a colored state (or transitioning to a colored state). In FIG. 3C, the polarity of voltage source 416 is reversed, so that the electrochromic layer is made more negative to accept additional lithium ions, and thereby transition to the colored state. As indicated by the dashed arrow, lithium ions are transported across ion conducting layer 408 to tungsten oxide electrochromic layer 406. Tungsten oxide electrochromic layer 406 is shown in the colored state. Nickel-tungsten oxide counter electrode 410 is also shown in the colored state. As explained, nickel-tungsten oxide becomes progressively more opaque as it gives up (deintercalates) lithium ions. In this example, there is a synergistic effect where the transition to colored states for both layers 406 and 410 are additive toward reducing the amount of light transmitted through the stack and substrate.

As described above, an electrochromic device may include an electrochromic (EC) electrode layer and a counter electrode (CE) layer separated by an ionically conductive (IC) layer that is highly conductive to ions and highly resistive to electrons. As conventionally understood, the ionically conductive layer therefore prevents shorting between the electrochromic layer and the counter electrode layer. The ionically conductive layer allows the electrochromic and counter electrodes to hold a charge and thereby maintain their bleached or colored states. In electrochromic devices having distinct layers, the components form a stack which includes the ion conducting layer sandwiched between the electrochromic electrode layer and the counter electrode layer. The boundaries between these three stack components are defined by abrupt changes in composition and/or microstructure. Thus, the devices have three distinct layers with two abrupt interfaces.

In accordance with certain embodiments, the counter electrode and electrochromic electrodes are formed immediately adjacent one another, sometimes in direct contact, without separately depositing an ionically conducting layer.

In some embodiments, electrochromic devices having an interfacial region rather than a distinct IC layer are employed. Such devices, and methods of fabricating them, are described in U.S. Pat. No. 8,300,298 and U.S. patent application Ser. No. 12/772,075 filed on Apr. 30, 2010, and U.S. patent application Ser. Nos. 12/814,277 and 12/814,279, filed on Jun. 11, 2010—each of the three patent applications and patent is entitled "Electrochromic Devices," each names Zhongchun Wang et al. as inventors, and each is incorporated by reference herein in its entirety.

B. Window Controllers

A window controller is used to control the tint level of the electrochromic device of an electrochromic window. In some embodiments, the window controller is able to transition the electrochromic window between two tint states (levels), a bleached state and a colored state. In other embodiments, the controller can additionally transition the electrochromic window (e.g., having a single electrochromic device) to intermediate tint levels. In some disclosed embodiments, the window controller is able to transition the electrochromic window to four or more tint levels. Certain electrochromic windows allow intermediate tint levels by using two (or more) electrochromic lites in a single IGU, where each lite is a two-state lite. This is described in reference to FIGS. 2A and 2B in this section.

As noted above with respect to FIGS. 2A and 2B, in some embodiments, an electrochromic window can include an electrochromic device 400 on one lite of an IGU 200 and another electrochromic device 400 on the other lite of the IGU 200. If the window controller is able to transition each electrochromic device between two states, a bleached state and a colored state, the electrochromic window is able to attain four different states (tint levels), a colored state with both electrochromic devices being colored, a first intermediate state with one electrochromic device being colored, a second intermediate state with the other electrochromic device being colored, and a bleached state with both electrochromic devices being bleached. Embodiments of multi-pane electrochromic windows are further described in U.S. Pat. No. 8,270,059, naming Robin Friedman et al. as inventors, titled "MULTI-PANE ELECTROCHROMIC WINDOWS," which is hereby incorporated by reference in its entirety.

In some embodiments, the window controller is able to transition an electrochromic window having an electrochromic device capable of transitioning between two or more tint levels. For example, a window controller may be able to transition the electrochromic window to a bleached state, one or more intermediate levels, and a colored state. In some other embodiments, the window controller is able to transition an electrochromic window incorporating an electrochromic device between any number of tint levels between the bleached state and the colored state. Embodiments of methods and controllers for transitioning an electrochromic window to an intermediate tint level or levels are further described in U.S. Pat. No. 8,254,013, naming Disha Mehtani et al. as inventors, titled "CONTROLLING TRANSITIONS IN OPTICALLY SWITCHABLE DEVICES," which is hereby incorporated by reference in its entirety.

In some embodiments, a window controller can power one or more electrochromic devices in an electrochromic window. Typically, this function of the window controller is augmented with one or more other functions described in more detail below. Window controllers described herein are not limited to those that have the function of powering an electrochromic device to which it is associated for the purposes of control. That is, the power source for the electrochromic window may be separate from the window controller, where the controller has its own power source and directs application of power from the window power source to the window. However, it is convenient to include a power source with the window controller and to configure the controller to power the window directly, because it obviates the need for separate wiring for powering the electrochromic window.

Further, the window controllers described in this section are described as standalone controllers which may be configured to control the functions of a single window or a plurality of electrochromic windows, without integration of the window controller into a building control network or a building management system (BMS). Window controllers, however, may be integrated into a building control network or a BMS, as described further in the Building Management System section of this disclosure.

Figure 4:
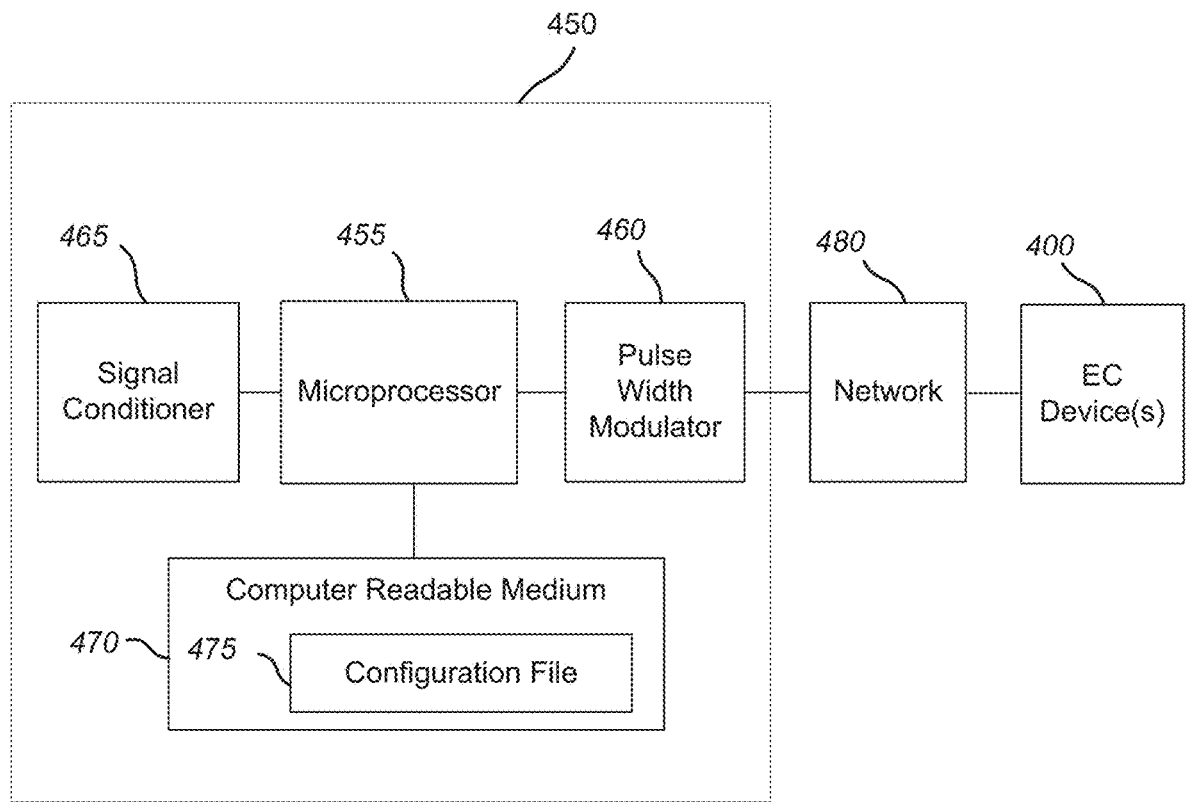
FIG. 4 depicts a simplified block diagram of components of a window controller.

FIG. 4 depicts a block diagram of some components of a window controller 450 and other components of a window controller system of disclosed embodiments. FIG. 4 is a simplified block diagram of a window controller, and more detail regarding window controllers can be found in U.S. patent application Ser. Nos. 13/449,248 and 13/449,251, both naming Stephen Brown as inventor, both titled "CONTROLLER FOR OPTICALLY-SWITCHABLE WINDOWS," and both filed on Apr. 17, 2012, and in U.S. patent Ser. No. 13/449,235, titled "CONTROLLING TRANSITIONS IN OPTICALLY SWITCHABLE DEVICES," naming Stephen Brown et al. as inventors and filed on Apr. 17, 2012, all of which are hereby incorporated by reference in their entireties.

In FIG. 4, the illustrated components of the window controller 450 include a window controller 450 having a microprocessor 455 or other processor, a pulse width modulator 460, a signal conditioning module 465, and a computer readable medium (e.g., memory) having a configuration file 475. Window controller 450 is in electronic communication with one or more electrochromic devices 400 in an electrochromic window through network 480 (wired or wireless) to send instructions to the one or more electrochromic devices 400. In some embodiments, the window controller 450 may be a local window controller in communication through a network (wired or wireless) to a master window controller.

In disclosed embodiments, a building may have at least one room having an electrochromic window between the exterior and interior of a building. One or more sensors may be located to the exterior of the building and/or inside the room. In embodiments, the output from the one or more sensors may be input to the signal conditioning module 465 of the window controller 450. In some cases, the output from the one or more sensors may be input to a BMS, as described further in the Building Management Systems section. Although the sensors of depicted embodiments are shown as located on the outside vertical wall of the building, this is for the sake of simplicity, and the sensors may be in other locations, such as inside the room or on other surfaces to the exterior, as well. In some cases, two or more sensors may be used to measure the same input, which can provide redundancy in case one sensor fails or has an otherwise erroneous reading.

Figure 5:
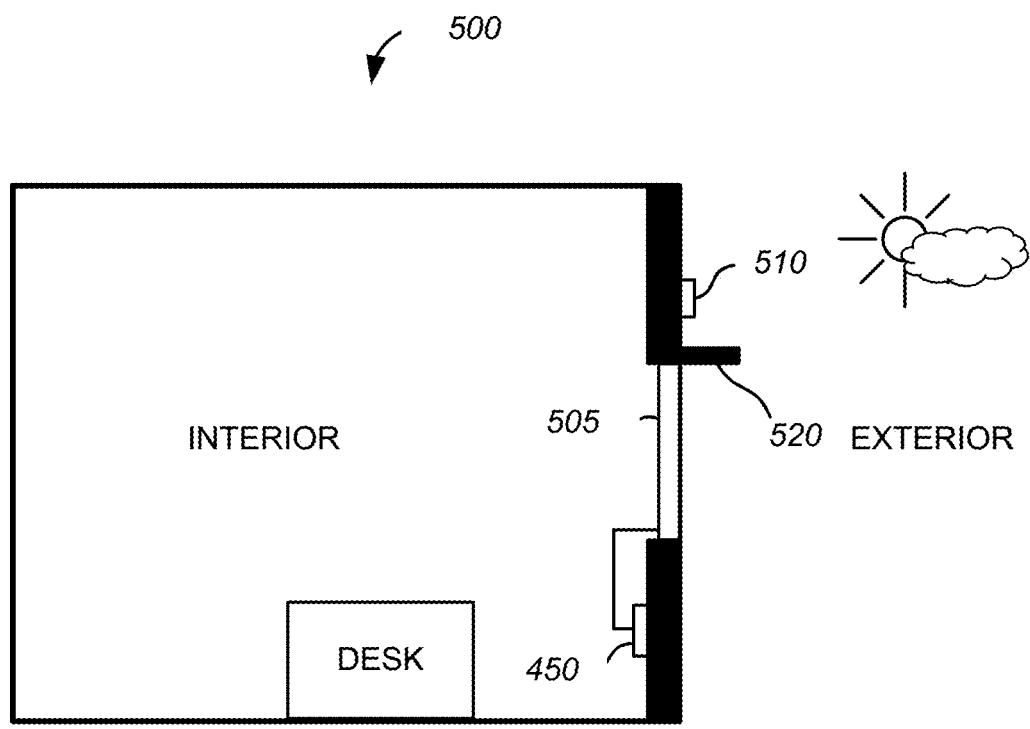
FIG. 5 is a schematic diagram of a room including a tintable window and at least one sensor, according to disclosed embodiments.

FIG. 5 depicts a schematic (side view) diagram of a room 500 having an electrochromic window 505 with at least one electrochromic device. The electrochromic window 505 is located between the exterior and the interior of a building, which includes the room 500. The room 500 also includes the window controller 450 of FIG. 4, which is connected to and configured to control the tint level of the electrochromic window 505. An exterior sensor 510 is located on a vertical surface in the exterior of the building. In other embodiments, an interior sensor may also be used to measure the ambient light in room 500. In yet other embodiments, an occupant sensor may also be used to determine when an occupant is in the room 500.

Exterior sensor 510 is a device, such as a photosensor, that is able to detect radiant light incident upon the device flowing from a light source such as the sun or from light reflected to the sensor from a surface, particles in the atmosphere, clouds, etc. The exterior sensor 510 may generate a signal in the form of electrical current that results from the photoelectric effect and the signal may be a function of the light incident on the sensor 510. In some cases, the device may detect radiant light in terms of irradiance in units of watts/m$^2$ or other similar units. In other cases, the device may detect light in the visible range of wavelengths in units of foot candles or similar units. In many cases, there is a linear relationship between these values of irradiance and visible light.

In some embodiments, exterior sensor 510 is configured to measure infrared light. In some embodiments, an exterior photosensor is configured to measure infrared light and/or visible light. In some embodiments, an exterior photosensor 510 may also include sensors for measuring temperature and/or humidity data. In some embodiments, intelligence logic may determine the presence of an obstructing cloud and/or quantify the obstruction caused by a cloud using one or more parameters (e.g., visible light data, infrared light data, humidity data, and temperature data) determined using an exterior sensor or received from an external network (e.g., a weather station). Various methods of detecting clouds using infrared sensors are described in International Patent Application No. PCT/US17/55631, titled "INFRARED CLOUD DETECTOR SYSTEMS AND METHODS," and filed, Oct. 6, 2017 which designates the United States and is incorporated herein in its entirety.

Irradiance values from sunlight can be predicted based on the time of day and time of year as the angle at which sunlight strikes the earth changes. Exterior sensor 510 can detect radiant light in real-time, which accounts for reflected and obstructed light due to buildings, changes in weather (e.g., clouds), etc. For example, on cloudy days, sunlight would be blocked by the clouds and the radiant light detected by an exterior sensor 510 would be lower than on cloudless days.

In some embodiments, there may be one or more exterior sensors 510 associated with a single electrochromic window 505. Output from the one or more exterior sensors 510 could be compared to one another to determine, for example, if one of exterior sensors 510 is shaded by an object, such as by a bird that landed on exterior sensor 510. In some cases, it may be desirable to use relatively few sensors in a building because some sensors can be unreliable and/or expensive. In certain implementations, a single sensor or a few sensors may be employed to determine the current level of radiant light from the sun impinging on the building or perhaps one side of the building. A cloud may pass in front of the sun or a construction vehicle may park in front of the setting sun. These will result in deviations from the amount of radiant light from the sun calculated to normally impinge on the building.

Exterior sensor 510 may be a type of photosensor. For example, exterior sensor 510 may be a charge coupled device (CCD), photodiode, photoresistor, or photovoltaic cell. One of ordinary skill in the art would appreciate that future developments in photosensor and other sensor technology would also work, as they measure light intensity and provide an electrical output representative of the light level.

In some embodiments, output from exterior sensor 510 may be input to the signal conditioning module 465. The input may be in the form of a voltage signal to signal conditioning module 465. Signal conditioning module 465 passes an output signal to the window controller 450. Window controller 450 determines a tint level of the electrochromic window 505, based on various information from the configuration file 475, output from the signal conditioning module 465, override values. Window controller 450 and then instructs the PWM 460, to apply a voltage and/or current to electrochromic window 505 to transition to the desired tint level.

In disclosed embodiments, window controller 450 can instruct the PWM 460, to apply a voltage and/or current to electrochromic window 505 to transition it to any one of four or more different tint levels. In disclosed embodiments, electrochromic window 505 can be transitioned to at least eight different tint levels described as: 0 (lightest), 5, 10, 15, 20, 25, 30, and 35 (darkest). The tint levels may linearly correspond to visual transmittance values and solar heat gain coefficient (SHGC) values of light transmitted through the electrochromic window 505. For example, using the above eight tint levels, the lightest tint level of 0 may correspond to an SHGC value of 0.80, the tint level of 5 may correspond to an SHGC value of 0.70, the tint level of 10 may correspond to an SHGC value of 0.60, the tint level of 15 may correspond to an SHGC value of 0.50, the tint level of 20 may correspond to an SHGC value of 0.40, the tint level of 25 may correspond to an SHGC value of 0.30, the tint level of 30 may correspond to an SHGC value of 0.20, and the tint level of 35 (darkest) may correspond to an SHGC value of 0.10.

Window controller 450 or a master controller in communication with the window controller 450 may employ any one or more predictive control logic components to determine a desired tint level based on signals from the exterior sensor 510 and/or other input. The window controller 450 can instruct the PWM 460 to apply a voltage and/or current to electrochromic window 505 to transition it to the desired tint level.

Building Management System (BMS)

The window controllers described herein also are suited for integration with or are within/part of a BMS. A BMS is a computer-based control system installed in a building that monitors and controls the building's mechanical and electrical equipment such as ventilation, lighting, power systems, elevators, fire systems, and security systems. A BMS consists of hardware, including interconnections by communication channels to a computer or computers, and associated software for maintaining conditions in the building according to preferences set by the occupants and/or by the building manager. For example, a BMS may be implemented using a local area network, such as Ethernet. The software can be based on, for example, internet protocols and/or open standards. One example is software from Tridium, Inc. (of Richmond, Virginia). One communications protocol commonly used with a BMS is BACnet (building automation and control networks).

A BMS is most common in a large building, and typically functions at least to control the environment within the building. For example, a BMS may control temperature, carbon dioxide levels, and humidity within a building. Typically, there are many mechanical devices that are controlled by a BMS such as heaters, air conditioners, blowers, vents, and the like. To control the building environment, a BMS may turn on and off these various devices under defined conditions. A core function of a typical modern BMS is to maintain a comfortable environment for the building's occupants while minimizing heating and cooling costs/demand. Thus, a modern BMS is used not only to monitor and control, but also to optimize the synergy between various systems, for example, to conserve energy and lower building operation costs.

In some embodiments, a window controller is integrated with a BMS, where the window controller is configured to control one or more electrochromic windows (e.g., 505) or other tintable windows. In other embodiments, the window controller is within or part of the BMS and the BMS controls both the tintable windows and the functions of other systems of the building. In one example, the BMS may control the functions of all the building systems including the one or more zones of tintable windows in the building.

In some embodiments, each tintable window of the one or more zones includes at least one solid state and inorganic electrochromic device. In one embodiment, each of the tintable windows of the one or more zones is an electrochromic window having one or more solid state and inorganic electrochromic devices. In one embodiment, the one or more tintable windows include at least one all solid state and inorganic electrochromic device, but may include more than one electrochromic device, e.g. where each lite or pane of an IGU is tintable. In one embodiment, the electrochromic windows are multistate electrochromic windows, as described in U.S. patent application Ser. No. 12/851,514, filed on Aug. 5, 2010, and entitled "Multipane Electrochromic Windows."

Figure 6:
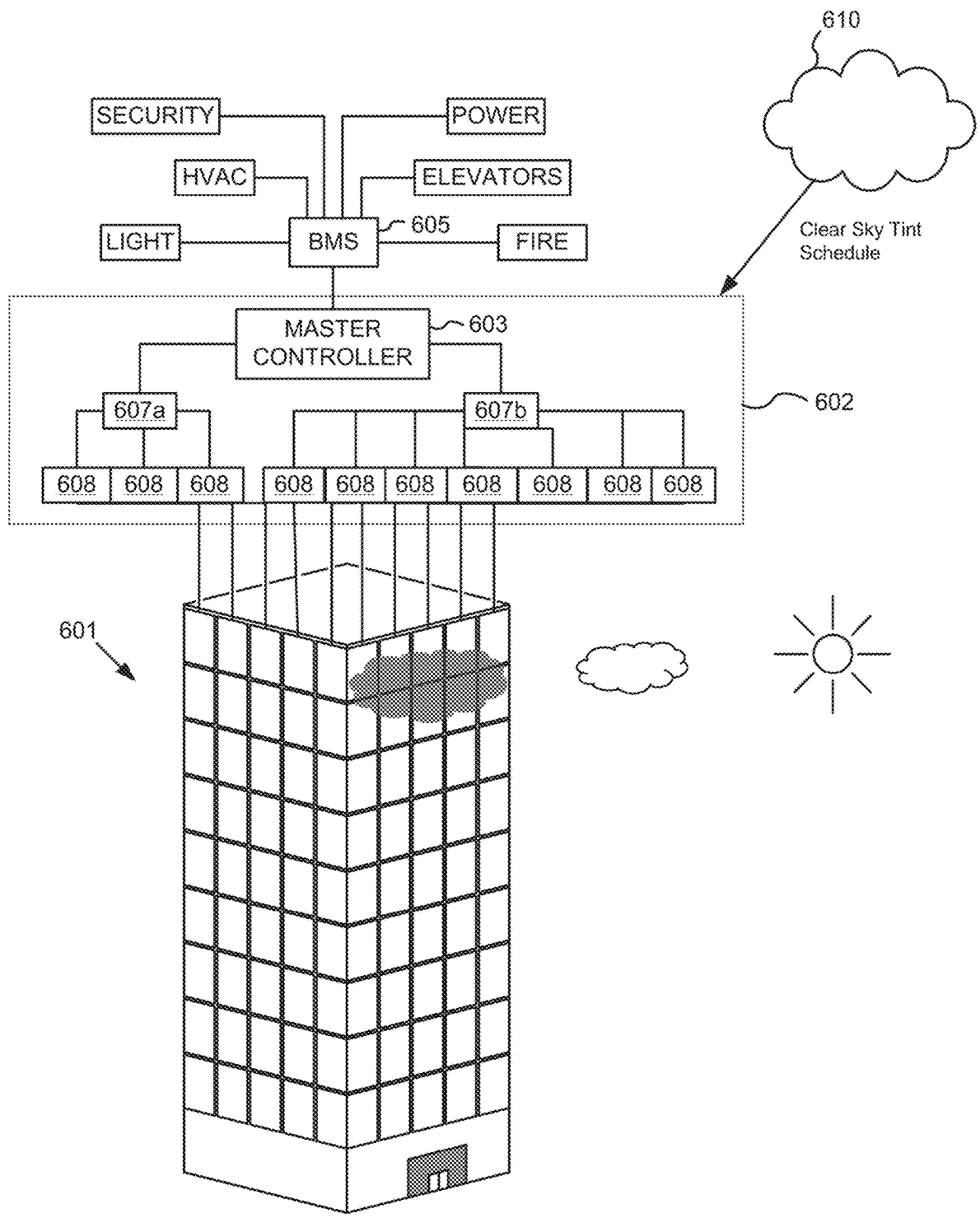
FIG. 6 is a schematic diagram of an example of a building and a building management system (BMS), according to certain implementations.

FIG. 6 depicts a schematic diagram of an example of a building 601 and a BMS 605 that manages a number of building systems including security systems, heating/ventilation/air conditioning (HVAC), lighting of the building, power systems, elevators, fire systems, and the like. Security systems may include magnetic card access, turnstiles, solenoid driven door locks, surveillance cameras, burglar alarms, metal detectors, and the like. Fire systems may include fire alarms and fire suppression systems including a water plumbing control. Lighting systems may include interior lighting, exterior lighting, emergency warning lights, emergency exit signs, and emergency floor egress lighting. Power systems may include the main power, backup power generators, and uninterrupted power source (UPS) grids.

Also, the BMS 605 manages a window control system 602. The window control system 602 is a distributed network of window controllers including a master controller, 603, network controllers, 607a and 607b, and end or leaf controllers 608. The end or leaf controllers 608 may be similar to the window controller 450 described with respect to FIG. 4. For example, the master controller 603 may be in close proximity to the BMS 605, and each floor of building 601 may have one or more network controllers 607a and 607b, while each window of the building has its own end controller 608. In this example, each of the end of leaf controllers 608 controls a specific electrochromic window of building 601. The window control system 602 is in communication with a cloud network 610 to received data. For example, the window control system 602 can receive tint schedule information from clear sky models maintained on cloud network 610. Although, the master controller 603 is described in FIG. 6 as separate from the BMS 605, in another embodiment, the master controller 603 is part of or within the BMS 605.

Each of controllers 608 can be in a separate location from the electrochromic window that it controls, or can be integrated into the electrochromic window. For simplicity, only ten electrochromic windows of building 601 are depicted as being controlled by the master window controller 602. In a typical setting there may be a large number of electrochromic windows in a building controlled by the window control system 602. Advantages and features of incorporating window controllers as described herein with BMSs are described below in more detail and in relation to FIG. 6, where appropriate.

One aspect of certain disclosed embodiments is a BMS including a multipurpose window controller as described herein. By incorporating feedback from a window controller, a BMS can provide, for example, enhanced: 1) environmental control, 2) energy savings, 3) security, 4) flexibility in control options, 5) improved reliability and usable life of other systems due to less reliance thereon and therefore less maintenance thereof, 6) information availability and diagnostics, 7) effective use of, and higher productivity from, staff, and various combinations of these, because the electrochromic windows can be automatically controlled. In some embodiments, a BMS may not be present or a BMS may be present but may not communicate with a master controller or may communicate at a high level with the master controller. In these cases, maintenance on the BMS would not interrupt control of the electrochromic windows.

According to certain disclosed examples, the systems of the BMS (e.g., BMS 605) or building network run according to daily, monthly, quarterly, or yearly schedules. For example, the lighting control system, the window control system, the HVAC, and the security system may operate on a 24-hour schedule accounting for when people are in the building during the work day. At night, the building may enter an energy savings mode, and during the day, the building systems may operate in a manner that minimizes the energy consumption of the building while providing for occupant comfort. As another example, the building systems may shut down or enter an energy savings mode over a holiday period or other time period with low building occupancy.

The BMS schedule may be combined with geographical information. Geographical information may include the latitude and longitude of the building. Geographical information also may include information about the direction that each side of the building faces. Using such information, different rooms on different sides of the building may be controlled in different manners. For example, for east-facing rooms of the building in the winter, the window controller may instruct the windows to have no tint in the morning so that the room warms up due to sunlight shining in the room and the lighting control panel may instruct the lights to be dim because of the lighting from the sunlight. The west-facing windows may be controllable by the occupants of the room in the morning because the tint of the windows on the west side may have no impact on energy savings. However, the modes of operation of the east-facing windows and the west-facing windows may switch in the evening (e.g., when the sun is setting, the west-facing windows are not tinted to allow sunlight in for both heat and lighting).

Described below is an example of a building, for example, like building 601 in FIG. 6, including a building network or a BMS, tintable windows (e.g., electrochromic windows) for the exterior windows of the building (i.e., windows separating the interior of the building from the exterior of the building), and a number of different sensors. Light passing through exterior windows of a building generally has an effect on the interior light level in the building up to about 20 feet to 30 feet from the windows. That is, any space in a building that is more than about 20 to 30 feet from an exterior window receives little light that might pass through the exterior window. Such spaces away from the exterior windows in a building are mainly lit by interior lighting systems of the building. Further, the temperature within a building may be influenced by exterior light and/or the exterior ambient temperature. For example, on a cold day and with the building being heated by a heating system, rooms closer to doors and/or windows will lose heat faster than the interior regions of the building and be cooler compared to the interior regions.

For buildings with exterior sensors, the exterior sensors may be on the roof of the building. Alternatively or additionally, the building may include an exterior sensor associated with each exterior window (e.g., exterior sensor 510 described in relation to FIG. 5, room 500) or an exterior sensor on each side of the building. An exterior sensor on each side of the building could track, e.g., the irradiance on a side of the building as the sun changes position throughout the day.

Regarding the methods described with respect to FIGS. 23, 26-36, when a window controller is integrated into a building network or a BMS, outputs from exterior sensors may be input to a building network of BMS and provided as input to the local window controller. For example, in some embodiments, output signals from any two or more sensors are received. In some embodiments, only one output signal is received, and in some other embodiments, three, four, five, or more outputs are received. These output signals may be received over a building network or a BMS.

In some embodiments, the output signals received include a signal indicating energy or power consumption by a heating system, a cooling system, and/or lighting within the building. For example, the energy or power consumption of the heating system, the cooling system, and/or the lighting of the building may be monitored to provide the signal indicating energy or power consumption. Devices may be interfaced with or attached to the circuits and/or wiring of the building to enable this monitoring. Alternatively, the power systems in the building may be installed such that the power consumed by the heating system, a cooling system, and/or lighting for an individual room within the building or a group of rooms within the building can be monitored.

Tint instructions can be provided to change to tint of the tintable window to the determined level of tint. For example, referring to FIG. 6, this may include master controller 603 issuing commands to one or more network controllers 607*a* and 607*b*, which in turn issue commands to end controllers 608 that control each window of the building. End controllers 608 may apply voltage and/or current to the window to drive the change in tint pursuant to the instructions.

Figure 7:
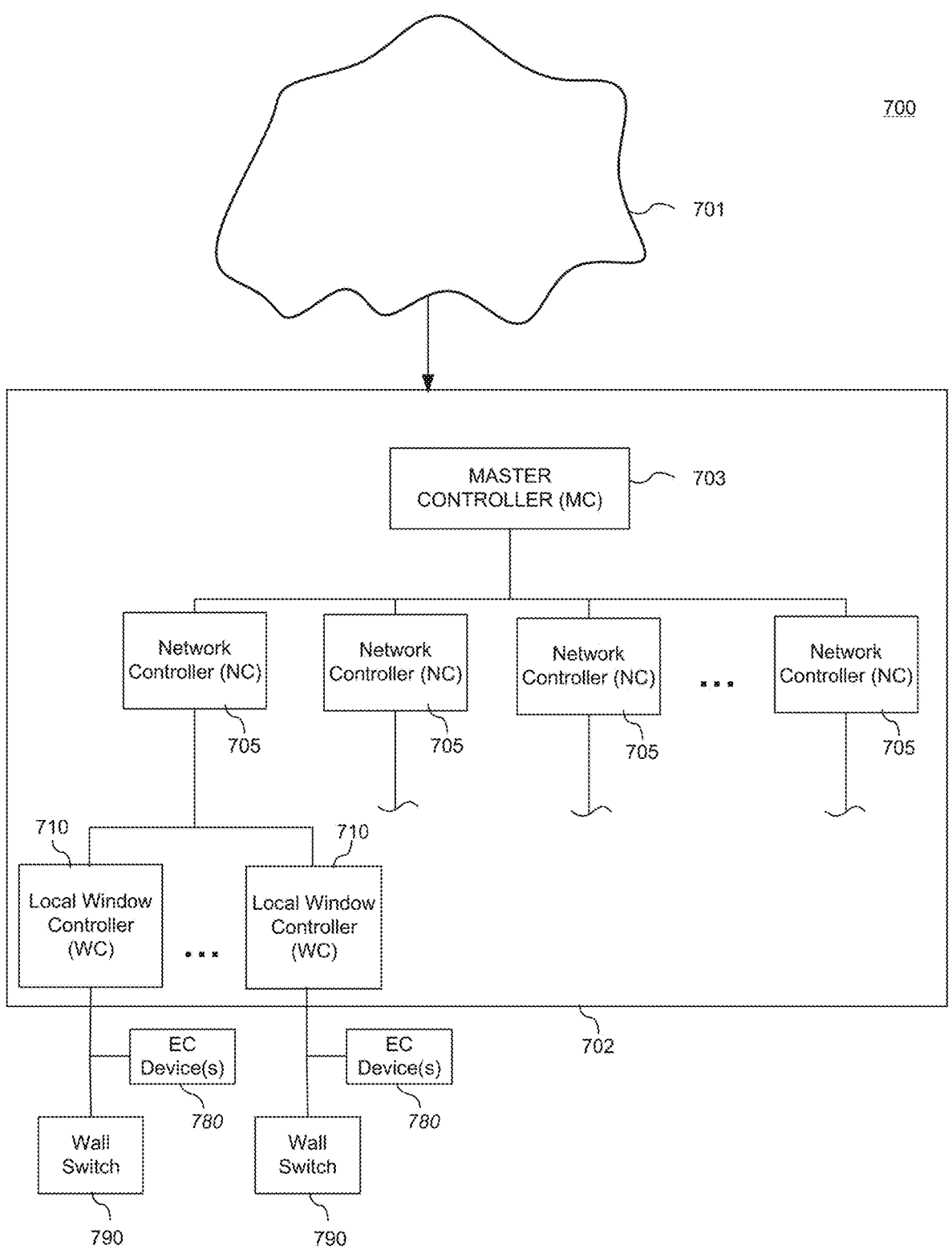
FIG. 7 is a block diagram of components of a system for controlling functions of one or more tintable windows of a building according to certain implementations.

In some embodiments, a building including tintable windows and a BMS may be enrolled in or participate in a demand response program run by the utility or utilities providing power to the building. The program may be a program in which the energy consumption of the building is reduced when a peak load occurrence is expected. The utility may send out a warning signal prior to an expected peak load occurrence. For example, the warning may be sent on the day before, the morning of, or about one hour before the expected peak load occurrence. A peak load occurrence may be expected to occur on a hot summer day when cooling systems/air conditioners are drawing a large amount of power from the utility, for example. The warning signal may be received by the BMS of the building or by window controllers configured to control the tintable windows in the building. This warning signal can be an override mechanism that disengages the Modules A, B, and C as shown in FIG. 7. The BMS can then instruct the window controller(s) to transition the appropriate optically-switchable device (e.g., electrochromic device) in the tintable windows 505 to a dark tint level aid in reducing the power draw of the cooling systems in the building at the time when the peak load is expected.

In some embodiments, tintable windows for the exterior windows of the building (i.e., windows separating the interior of the building from the exterior of the building), may be grouped into zones, with tintable windows in a zone being instructed in a similar manner. For example, groups of tintable windows on different floors of the building or different sides of the building may be in different zones. For example, on the first floor of the building, all of the east facing tintable windows may be in zone 1, all of the south facing tintable windows may be in zone 2, all of the west facing tintable windows may be in zone 3, and all of the north facing tintable windows may be in zone 4. As another example, all of the tintable windows on the first floor of the building may be in zone 1, all of the tintable windows on the second floor may be in zone 2, and all of the tintable windows on the third floor may be in zone 3. As yet another example, all of the east facing tintable windows may be in zone 1, all of the south facing tintable windows may be in zone 2, all of the west facing tintable windows may be in zone 3, and all of the north facing tintable windows may be in zone 4. As yet another example, east facing tintable windows on one floor could be divided into different zones. Any number of tintable windows on the same side and/or different sides and/or different floors of the building may be assigned to a zone. In embodiments where individual tintable windows have independently controllable zones, tinting zones may be created on a building façade using combinations of zones of individual windows, e.g. where individual windows may or may not have all of their zones tinted.

In some embodiments, tintable windows in a zone may be controlled by the same window controller. In some other embodiments, tintable windows in a zone may be controlled by different window controllers, but the window controllers may all receive the same output signals from sensors and use the same function or lookup table to determine the level of tint for the windows in a zone.

In some embodiments, tintable windows in a zone may be controlled by a window controller or controllers that receive an output signal from a transmissivity sensor. In some embodiments, the transmissivity sensor may be mounted proximate the windows in a zone. For example, the transmissivity sensor may be mounted in or on a frame containing an IGU (e.g., mounted in or on a mullion, the horizontal sash of a frame) included in the zone. In some other embodiments, tintable windows in a zone that includes the windows on a single side of the building may be controlled by a window controller or controllers that receive an output signal from a transmissivity sensor.

In some embodiments, a sensor (e.g., photosensor) may provide an output signal to a window controller to control the tintable windows (e.g., electrochromic window 505) of a first zone (e.g., a master control zone). The window controller may also control the tintable windows in a second zone (e.g., a slave control zone) in the same manner as the first zone. In some other embodiments, another window controller may control the tintable windows in the second zone in the same manner as the first zone.

In some embodiments, a building manager, occupants of rooms in the second zone, or other person may manually instruct (using a tint or clear command or a command from a user console of a BMS, for example) the tintable windows in the second zone (i.e., the slave control zone) to enter a tint level such as a colored state (level) or a clear state. In some embodiments, when the tint level of the windows in the second zone is overridden with such a manual command, the tintable windows in the first zone (i.e., the master control zone) remain under control of the window controller receiving output from the transmissivity sensor. The second zone may remain in a manual command mode for a period of time and then revert back to be under control of the window controller receiving output from the transmissivity sensor. For example, the second zone may stay in a manual mode for one hour after receiving an override command, and then may revert back to be under control of the window controller receiving output from the transmissivity sensor.

In some embodiments, a building manager, occupants of rooms in the first zone, or other person may manually instruct (using a tint command or a command from a user console of a BMS, for example) the windows in the first zone (i.e., the master control zone) to enter a tint level such as a colored state or a clear state. In some embodiments, when the tint level of the windows in the first zone is overridden with such a manual command, the tintable windows in the second zone (i.e., the slave control zone) remain under control of the window controller receiving outputs from the exterior sensor. The first zone may remain in a manual command mode for a period of time and then revert back to be under control of window controller receiving output from the transmissivity sensor. For example, the first zone may stay in a manual mode for one hour after receiving an override command, and then may revert back to be under control of the window controller receiving output from the transmissivity sensor. In some other embodiments, the tintable windows in the second zone may remain in the tint level that they are in when the manual override for the first zone is received. The first zone may remain in a manual command mode for a period of time and then both the first zone and the second zone may revert back to be under control of the window controller receiving output from the transmissivity sensor.

Any of the methods described herein of control of a tintable window, regardless of whether the window controller is a standalone window controller or is interfaced with a building network, may be used control the tint of a tintable window.

Wireless or Wired Communication

In some embodiments, window controllers described herein include components for wired or wireless communication between the window controller, sensors, and separate communication nodes. Wireless or wired communications may be accomplished with a communication interface that interfaces directly with the window controller. Such interface could be native to the microprocessor or provided via additional circuitry enabling these functions.

A separate communication node for wireless communications can be, for example, another wireless window controller, an end, intermediate, or master window controller, a remote control device, or a BMS. Wireless communication is used in the window controller for at least one of the following operations: 1) programming and/or operating the tintable windows (e.g., electrochromic window 505), 2) collecting data from the tintable windows from the various sensors and protocols described herein, and 3) using the tintable window windows as relay points for wireless communication. Data collected from tintable windows may also include count data such as, e.g., the number of times an electrochromic device has been activated, efficiency of the electrochromic device over time, and the like. These wireless communication features is described in more detail below.

In one embodiment, wireless communication is used to operate the associated electrochromic windows (e.g., electrochromic window 505), for example, via an infrared (IR), and/or radio frequency (RF) signal. In certain embodiments, the controller will include a wireless protocol chip, such as Bluetooth, EnOcean, WiFi, Zigbee, and the like. Window controllers may also have wireless communication via a network. Input to the window controller can be manually input by an end user at a wall switch, either directly or via wireless communication, or the input can be from a BMS of a building of which the electrochromic window is a component.

In one embodiment, when the window controller is part of a distributed network of controllers, wireless communication is used to transfer data to and from each of a plurality of electrochromic windows via the distributed network of controllers, each having wireless communication components. For example, referring again to FIG. 6, master controller 603, communicates wirelessly with each of the network controllers 607a and 607b, which in turn communicate wirelessly with end or leaf controllers 608, each associated with an electrochromic window. Master controller 603 may also communicate wirelessly with the BMS 605. In one embodiment, at least one level of communication in the network of window controllers is performed wirelessly.

In some embodiments, more than one mode of wireless communication is used in the window controller distributed network. For example, a master window controller may communicate wirelessly to intermediate controllers via WiFi or Zigbee, while the intermediate controllers communicate with end controllers via Bluetooth, Zigbee, EnOcean, or other protocol. In another example, window controllers have redundant wireless communication systems for flexibility in end user choices for wireless communication.

Wireless communication between, for example, master and/or intermediate window controllers and end or leaf window controllers offers the advantage of obviating the installation of hard communication lines. This is also true for wireless communication between window controllers and the BMS or a building network. In one aspect, wireless communication in these roles is useful for data transfer to and from electrochromic windows for operating the window and providing data to, for example, a BMS for optimizing the environment and energy savings in a building. Window location data as well as feedback from sensors are synergized for such optimization. For example, granular level (window-by-window) microclimate information may be fed to a BMS and used to determine control instructions for the building systems in order to optimize the building's various environments.

Example of System for Controlling Functions of Tintable Windows

FIG. 7 is a block diagram of components of a system 700 for controlling functions (e.g., transitioning to different tint levels) of one or more tintable windows of a building (e.g., the building 601 shown in FIG. 6), according to embodiments. System 700 may be one of the systems managed by a BMS (e.g., the BMS 605 shown in FIG. 6) or may operate independently of a BMS.

The system 700 includes a window control system 702 having a network of window controllers that can send control signals to the tintable windows to control its functions. The system 700 also includes a network 701 in electronic communication with the master controller 703. The predictive control logic, other control logic and instructions for controlling functions of the tintable window(s), sensor data, and/or schedule information regarding clear sky models can be communicated to the master controller 703 through the network 701. The network 701 can be a wired or wireless network (e.g. a cloud network). In one embodiment, the network 701 may be in communication with a BMS to allow the BMS to send instructions for controlling the tintable window(s) through the network 701 to the tintable window(s) in a building.

System 700 also includes electrochromic devices 780 of the tintable windows (not shown) and optional wall switches 790, which are both in electronic communication with the master controller 703. In this illustrated example, the master controller 703 can send control signals to electrochromic device(s) 780 to control the tint level of the tintable windows having the electrochromic device(s) 780. Each wall switch 790 is also in communication with electrochromic device(s) 780 and master controller 703. An end user (e.g., occupant of a room having the tintable window) can use the wall switch 790 to input an override tint level and other functions of the tintable window having the electrochromic device(s) 780.

In FIG. 7, the window control system 702 is depicted as a distributed network of window controllers including a master controller 703, a plurality of network controllers 705 in communication with the master controller 703, and multiple pluralities of end or leaf window controllers 710. Each plurality of end or leaf window controllers 710 is in communication with a single network controller 705. The components of the system 700 in FIG. 7 may be similar in some respects to components described with respect to FIG. 6. For example, master controller 703 may be similar to master controller 603 and network controllers 705 may be similar to network controllers 607*a*, 607*b*. Each of the window controllers in the distributed network of FIG. 7 includes a processor (e.g., microprocessor) and a computer readable medium in electrical communication with the processor.

In FIG. 7, each leaf or end window controller 710 is in communication with electrochromic device(s) 780 of a single tintable window to control the tint level of that tintable window in the building. In the case of an IGU, the leaf or end window controller 710 may be in communication with electrochromic device(s) 780 on multiple lites of the IGU control the tint level of the IGU. In other embodiments, each leaf or end window controller 710 may be in communication with a plurality of tintable windows, e.g., a zone of tintable windows. The leaf or end window controller 710 may be integrated into the tintable window or may be separate from the tintable window that it controls. Leaf and end window controllers 710 in FIG. 7 may be similar to the end or leaf controllers 608 in FIG. 6 and/or may also be similar to window controller 450 described with respect to FIG. 4.

Each wall switch 790 can be operated by an end user (e.g., occupant of the room) to control the tint level and other functions of the tintable window in communication with the wall switch 790. The end user can operate the wall switch 790 to communicate control signals to the EC device(s) 780 in the associated tintable window. These signals from the wall switch 790 may override signals from window control system 702 in some cases. In other cases (e.g., high demand cases), control signals from the window control system 702 may override the control signals from wall switch 1490.

Each wall switch 790 is also in communication with the leaf or end window controller 710 to send information about the control signals (e.g. time, date, tint level requested, etc.) sent from wall switch 790 back to master window controller 703 e.g., to be stored in memory. In some cases, the wall switches 790 may be manually operated. In other cases, the wall switches 790 may be wirelessly controlled by the end user using a remote device (e.g., cell phone, tablet, etc.) sending wireless communications with the control signals, for example, using infrared (IR), and/or radio frequency (RF) signals. In some cases, wall switches 790 may include a wireless protocol chip, such as Bluetooth, EnOcean, WiFi, Zigbee, and the like. Although the wall switches 790 depicted in FIG. 7 are located on the wall(s), other embodiments of system 700 may have switches located elsewhere in the room.

In another embodiment, system 700 also includes a multi-sensor device in electronic communication with the one or more controllers via the communication network 701 in order to communicate sensor readings and/or filtered sensor values to the controller(s).

II. General System Architecture

Actively maintaining and storing models of shadows and reflections on a building can be cumbersome and an inefficient use of computing resources at a building. The system architecture described herein does not require the window control system to actively generate these models of the building. Instead, models specific to the building site are generated and maintained on a cloud network or other network separate from the window control system. Tint schedule information derived from these models is pushed to the window control system. The window control system uses the tint schedule information derived from these predefined models, customized for the building, to make final tinting decisions implemented at the tintable windows. The models can be maintained, for example, on a cloud-based 3D modeling platform. The cloud-based 3D modeling platform can be used to generate visualizations of the 3D model of the building site to allow users to manage input for setting up and customizing the models of the building site and the corresponding final tint states applied to the tintable windows. With this system architecture, once the tint schedule information is loaded into the window control system, there is no need for modeling calculations to tie up computing power of the window control system. Tint schedule information resulting from any changes to the models on the cloud-based 3D modeling platform can be pushed to the window control system when and as needed. It would be understood that although the system architecture is generally described herein with respect to controlling tintable windows, other components at the building could additionally or alternatively be controlled with this architecture.

In various implementations, the system architecture includes cloud-based modules to setup and customize a 3D model of the building site. For example, the system architecture includes a cloud-based 3D modelling system that initializes the 3D model of the building site using architectural model(s) data as input, for example, data from an Autodesk®Revit model or other industry standard building model may be used. A 3D model in its simplest form includes exterior surfaces of structures of the building including window openings and a stripped version of the interior of the building with only floors and walls. More complex 3D models may include the exterior surfaces of objects surrounding the building as well as more detailed features of the interior and exterior of the building.

The system architecture also includes a cloud-based clear sky module that assigns reflective or non-reflective properties to the exterior surfaces of the objects in the 3D model, defines interior three-dimensional occupancy regions, assigns IDs to windows, and groups windows into zones based on input from user(s). Time-varying simulations of the resulting clear sky 3D model (i.e. the 3D model with configuration data having the assigned attributes) can be used to determine the direction of sunlight at the different positions of the sun in the sky under clear sky conditions and taking into account shadows and reflections from the objects at the building site, sunlight entering into spaces of the building through windows or other apertures, and the intersection of 3D projections of sunlight though the windows with three-dimensional occupancy regions in the building. The clear sky module uses this information to determine whether certain conditions exist for particular occupancy regions (i.e. from the perspective of the occupant) such as, for example, a glare condition, direct and indirect reflection condition, and passive heat condition. The clear sky module determines a clear sky tint state for each zone at each time interval based on the existence of particular conditions at that time, tint states assigned to the conditions, and the priority of different conditions if multiple conditions exist. Each zone having one or more tintable windows. The clear sky tint schedule information for each zone over a period of time, typically for a year, is pushed to, e.g. a master controller of, the window control system at the building. The window control system determines a weather-based tint state for each zone at each time interval based on sensor data such as measurements from infrared sensors and/or photosensors or filtered sensor data such as a median/mean of rolling sensor readings taken over time. The window control system then determines the minimum of the weather-based tint state and the clear sky tint state or each zone to set the final tint state and send tint instructions to implement the final tint state at the zones of the tintable windows. Thus window control systems described herein do not actively model the building or 3D parameters around and inside the building, that is done offline and therefore computing power of the window control system is primarily used to apply the tint states derived from the model, depending upon sensor or other inputs to the window control system.

Figure 8A:
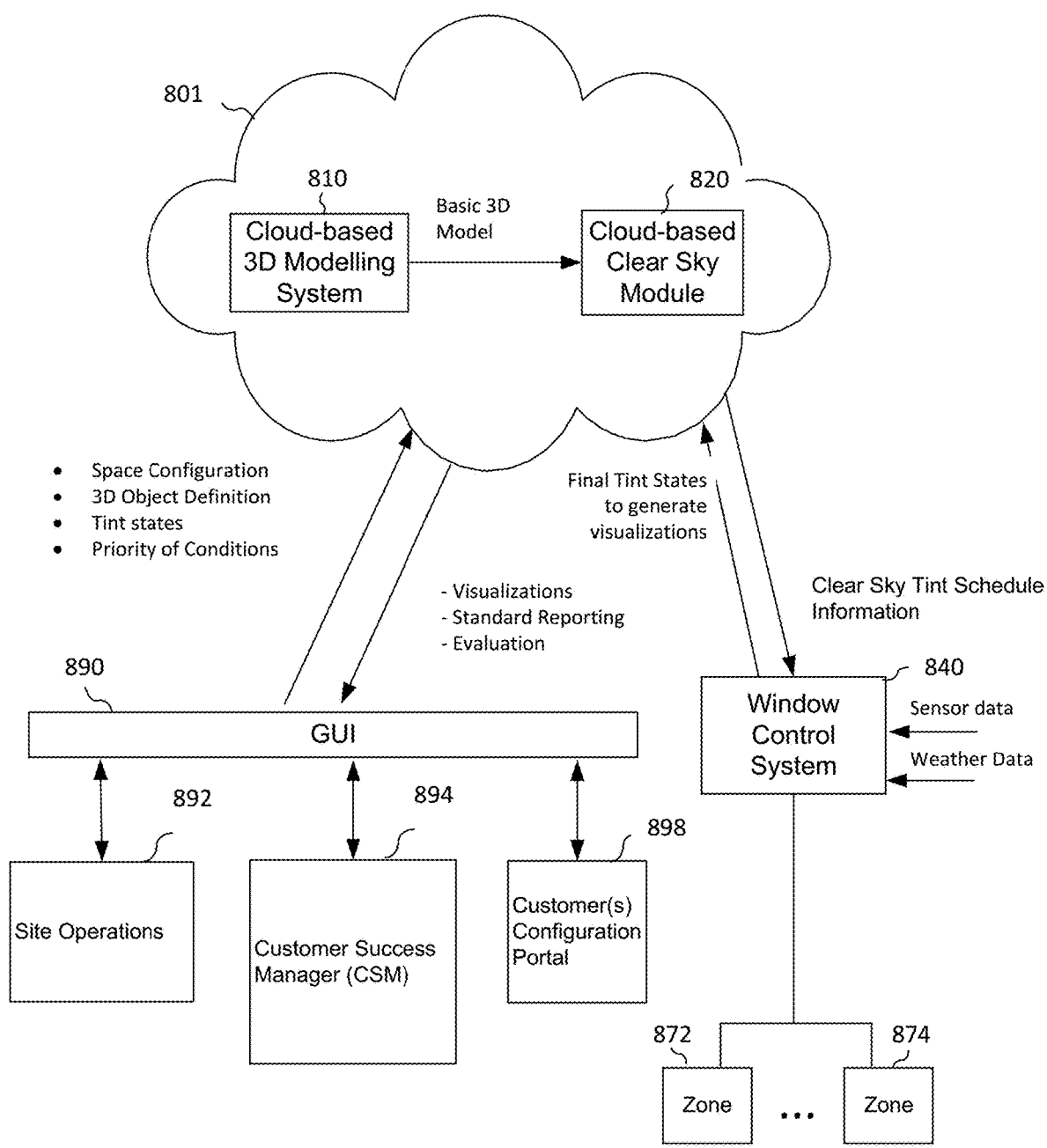
FIG. 8A is schematic diagram depicting the general system architecture of systems and users involved in maintaining clear sky models on a cloud network and controlling the tintable windows of a building based on data derived from output from the models, according to various implementations.

FIG. 8A is a schematic illustration depicting a general architecture 800 of systems and users involved in initializing and customizing models maintained in a cloud network 801 and in controlling the tintable windows of a building based on output from the models, according to various implementations. The system architecture 800 includes a cloud-based 3D modelling system 810 in communication with a cloud-based clear sky module 820 and a window control system 840 in communication with one or both of these modules via the cloud network. The cloud-based 3D modelling system 810 can initialize and/or revise a 3D model of a building site and communicate the data derived from the 3D model (e.g., a clear sky tint schedule with tint states for each zone over a period of time) to the cloud-based clear sky module 820. In one implementation, the 3D model initialized by the 3D modelling system includes the exterior surfaces of the surrounding structures and other objects at the building site and the building stripped of all but walls, floors, and exterior surfaces. The cloud-based clear sky module 820 can assign attributes to the 3D model to generate clear sky 3D models such as, e.g., one or more of a glare/shadow model, a reflection model, and a passive heat model. The cloud-based systems are in communication with each other and with other applications via the cloud network 801 using application program interfaces (APIs). Both the cloud-based 3D modelling system 810 and the clear sky module 820 include logic as described in more detail herein. It would be understood that the logic of these cloud-based modules and others are stored in computer readable medium (e.g. memory) of the cloud network and that one or more processors in the cloud network are in communication with the computer readable medium to execute instructions to perform the functions of the logic.

Although many examples of the control architecture and models are described herein with the 3D model platform and various models residing on a cloud network, in other implementations, one or more of the 3D model platform, models, and control modules do not reside on a cloud network. For example, one or more of the 3D model platform, models, and control modules may reside on a standalone computer or other computing device that is separate from and in communication with the window control system (e.g., window control system 840). Alternatively, in certain implementations, the control network may be an edge cloud network where the cloud is part of the window control system and/or BMS at the building of interest, at other building(s), or a combination of the building and other buildings.

Returning to FIG. 8A, the clear sky module 820 can use the 3D model of the building site to generate simulations over time for different positions of the sun under clear sky conditions to determine shadows and reflections from objects at the building site. For example, the clear sky module 820 can generate a clear sky glare/shadow model and a reflection model and using a ray tracing engine, the clear sky module 820 can determine the direction of sunlight passing through the window openings of the building that accounts for shadows and reflections under clear sky conditions. The clear sky module 820 uses this shadow and reflection based data to determine the existence of glare, reflection, and passive heat conditions at occupancy regions (i.e. likely locations of occupants) of the building. The cloud-based clear sky module 820 determines a yearly schedule (or other time period) of tint states for each of the zones of the building based on whether or not these conditions exist at different time intervals over the year. This schedule is also referred to herein as a "clear sky tint schedule." The cloud-based clear sky module 820 typically pushes the clear sky tint schedule information to the window control system 840. The window control system 840 includes a network of window controllers such as, e.g., the networks described in FIGS. 6 and 7. The window control system 840 is in communication with the zones of tintable windows in the building, depicted in FIG. 8A as series of zones from a $1^{st}$ zone 872 to an $n^{th}$ zone 874. The window control system 840 determines final tint states and sends tint instructions to control the tint states of the tintable windows. In certain implementations, the final tint states are determined based on the clear sky schedule information and also based on sensor data, and/or weather data. As described above with respect to the illustrated system architecture 800, the window control system 840 does not actively generate models or otherwise waste computing power on modeling. The models, which are specific to the building site, are created, customized, and stored in the cloud network 801. The predefined clear sky tint schedule is pushed to the window control system 840 initially, and then again only if updates to the 3D model are made. For example, a 3D model may need to be updated when there are changes made to the building layout, new objects in the surrounding area, or the like.

The system architecture 800 also includes a graphical user interface (GUI) 890 for communicating with customers and other users to provide application services, reports, and visualizations of the 3D model and to receive input for setting up and customizing the 3D model. Visualizations of the 3D model (also referred to herein as "3D building site visualizations") can be provided to users and received from users through the GUI 890. The illustrated users include site operations 892 that are involved in troubleshooting at the building site and have the capability to review visualizations and edit the 3D model. The users also include a Customer Success Manager (CSM) 894 with the capability of reviewing visualizations and on-site configuration changes to the 3D model. The users also include a customer(s) configuration portal 898 in communication with various customers. Through the customer(s) configuration portal 898, the customer(s) can review various visualizations of data mapped to the 3D model and provide input to change the configuration at the building site. Some examples of input from the users include space configuration including e.g., occupancy areas in the building, 3D object definition at the building site, tint states for particular conditions, and the priority of the conditions at the building. Some examples of output provided to the users include visualizations of data on the 3D model such as visualization of tint states on the 3D model, standard reporting, and performance evaluation of the building. Certain users are depicted for illustrative purposes. It would be understood that other or additional users could be included.

Figure 8B:
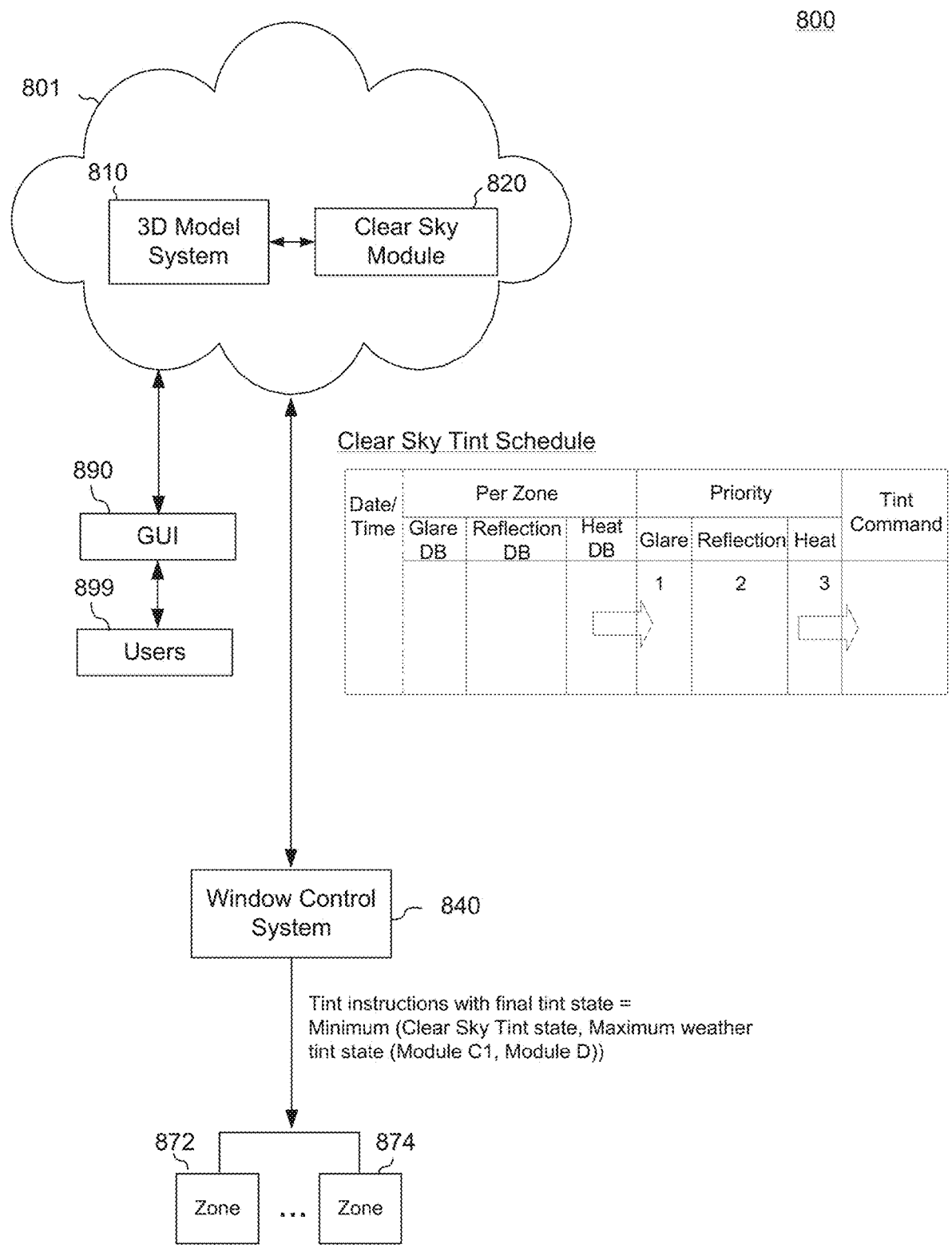
FIG. 8B is an illustrated example of the flow of data communicated between some of the systems of the system architecture shown in FIG. 8A.

FIG. 8B is an illustrated example of the flow of data communicated between some of the systems of the system architecture 800 shown in FIG. 8A. As shown, the clear sky module 820 generates clear sky model schedule information and pushes that information to the window control system 840. The clear sky module 820 includes logic that generates a tint state for each time interval and zone by applying the priority data to the condition values. The control logic of the window control system 840 sets the final tint state for each zone. In this example, the final tint state is determined by the logic as the minimum between the clear sky tint state and a maximum weather tint state. The maximum weather tint state is the maximum tint state between a tint state determined by Module C and a tint state determined by Module D. In other implementations, the logic of the clear sky module 820 determines the final tint states using other methods.

A. Cloud-Based 3D Modelling System

In various implementations, the system architecture has a cloud-based 3D modelling system that can generate a 3D model (e.g., solid model, surface model, or wireframe model) of the building site on a 3D modelling platform. Various commercially-available programs can be used as the 3D modelling platform. An example of such a commercially-available program is Rhino® 3D software produced by McNeel North America of Seattle Washington. Another example of a commercially-available program is Autocad® computer-aided design and drafting software application by Autodesk® of San Rafael, California.

Figure 9:
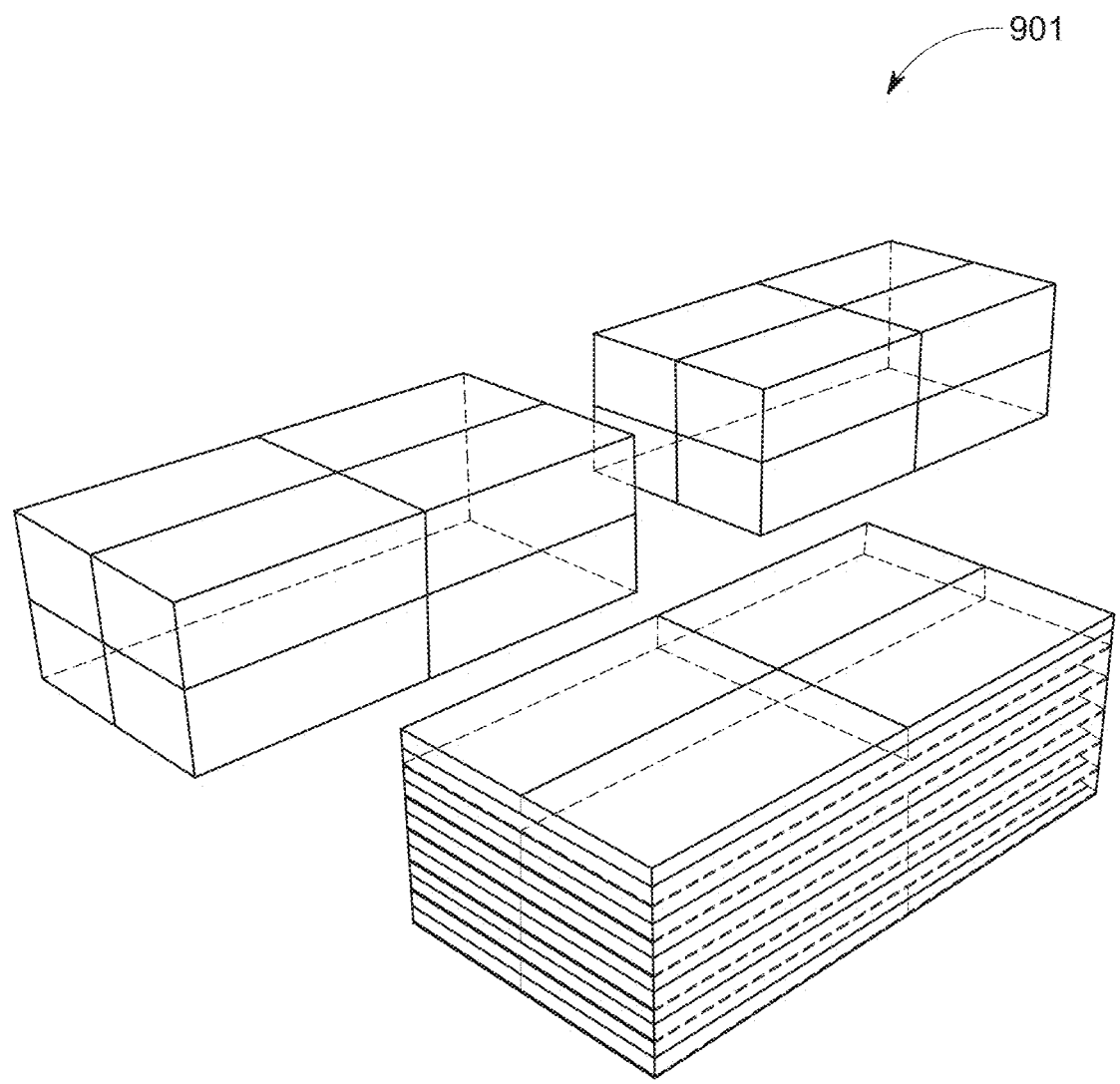
FIG. 9 is an illustration of a 3D model of a building site, according to one example.

The 3D model is a three-dimensional representation of the buildings and other objects at the site of the building with the tintable windows. A building site generally refers to a region surrounding the building of interest. The region is typically defined to include all objects surrounding the building that would cause shadows or reflections on the building. The 3D model includes three-dimensional representations of the exterior surfaces of the buildings and other objects surrounding the building and also of the building stripped of all its surfaces except walls, floors, and exterior surfaces. The 3D modelling system can generate the 3D model, for example, automatically using a standard building model such as a Revit or other industry standard building model and stripping the modelled building of all its surfaces except walls, floors, and exterior surfaces with window openings. Any other object in the 3D model would be automatically stripped of all elements except exterior surfaces. As another example, the 3D model can be generated from scratch using 3D modelling software. An example of a 3D model of a building site 901 having three buildings is shown in FIG. 9.

B. Cloud-based Clear Sky Module

Recent installations of large numbers of tintable windows such as electrochromic windows, sometimes referred to as "smart windows," in large-scale buildings have created an increased need for complex control and monitoring systems that can involve extensive computing resources. For example, a high number of tintable windows deployed in a large-scale building may have a huge number of zones (e.g., 10,000) would require complex and memory-intensive reflection and glare models. As these tintable windows continue to gain acceptance and are more widely deployed, they will require more sophisticated control systems and models that will involve storing and manipulating a large amount of data.

Figure 10:
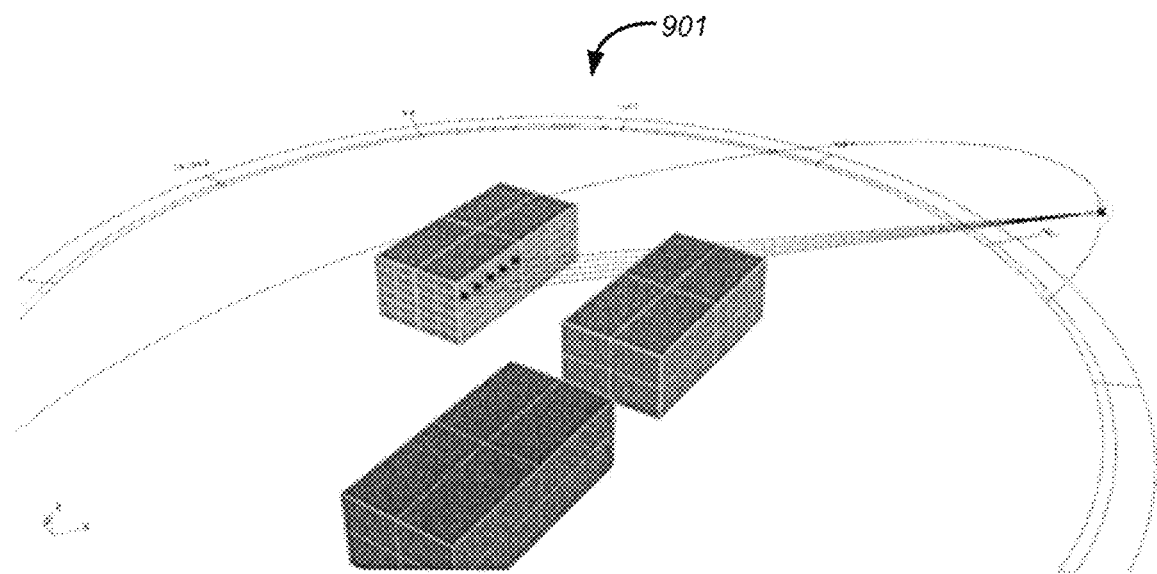
FIG. 10 is an illustration of a visualization of a glare/shadow model based on the 3D model of FIG. 9 and showing the rays of direct sunlight from the sun at one position in the sky under clear sky conditions, according to one example.
Figure 11:
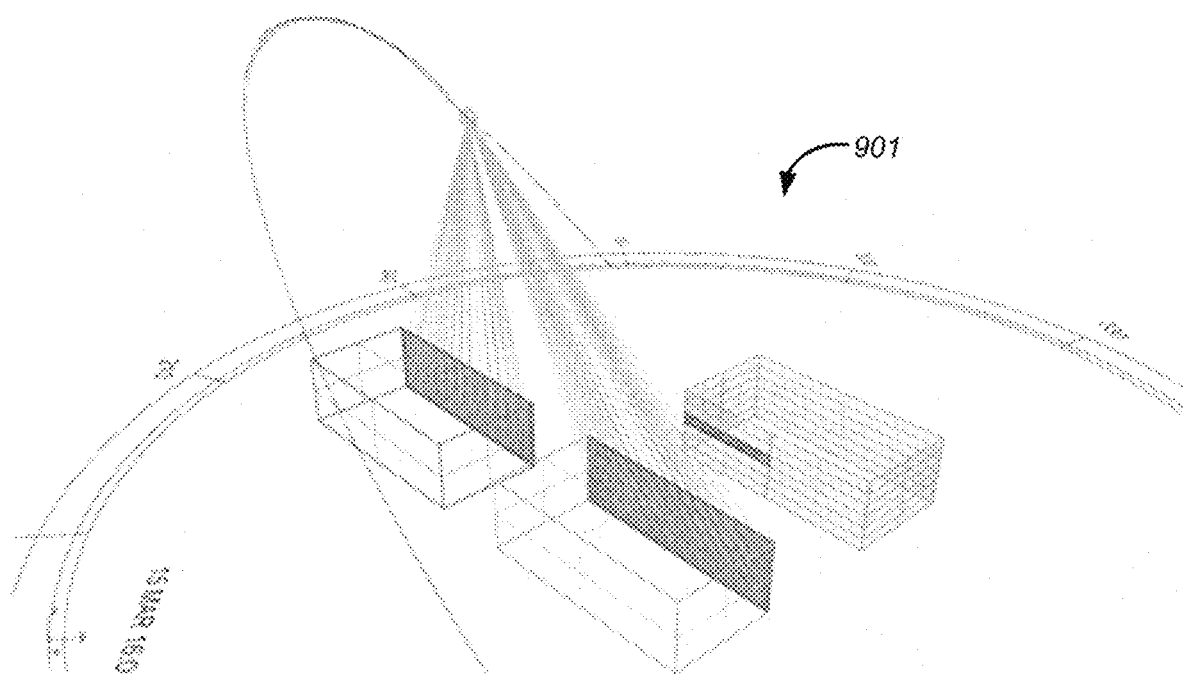
FIG. 11 is an illustration of a visualization of a reflection model based on the 3D model of FIG. 9 and showing the rays of reflected sunlight off of buildings at the site under clear sky conditions, according to one example.

The system architecture described herein implements cloud-based modules on a 3D modelling platform to generate clear sky 3D models stored and maintained on a cloud network. These clear sky models include, for example, a glare/shadow model, a reflection model, and a passive heat model that are based on clear sky conditions at the building site. An example of a visualization of a glare/shadow model of the building site 901 in FIG. 9 with the sun at one position in the sky under clear sky conditions is shown in FIG. 10. The glare/shadow model can be used to determine the direct sunlight (not shadowed by surrounding objects) that enters the window openings of the building of interest at a particular time interval. FIG. 11 is an example of a visualization of a reflection model of the building under the same conditions depicted in FIG. 10. The glare and reflection models shown in FIGS. 10 and 11 are based on a clear sky 3D model of the building site 901 shown in FIG. 9 with attributes such as reflective properties assigned to the exterior surfaces of the three modeled buildings. The clear sky module can use the data from the simulation of the glare/shadow model shown in FIG. 10 to determine a glare condition at that time interval. The clear sky module can use the data from the simulation of the reflection model shown in FIG. 11 to determine a direct reflection condition at that time interval.

The clear sky module includes logic that can be implemented to assign attributes to the 3D model to generate the clear sky 3D model. The clear sky module also includes logic that can be used to generate other models to determine various conditions such as, for example, a glare/shadow model, a reflection model, and a passive heat model. These models of the building site 901 can be used to generate a yearly schedule of tint states for the zones of the building that is pushed to the window control system at the building to make final tinting decisions. With this system architecture, most of the data is kept on the cloud network. Keeping the models on the cloud network allows for easy access to and customization by customers and other users. For example, visualizations of various models can be sent to the users to allow them to review and send input, for example, to setup and customize the models and/or override final tint states in the clear sky tint schedules or other systems functions at the building. For example, the visualizations can be used by users to manage input used to assign attributes to the clear sky model such as in zone management and window management as part of site set up or customization.

C. Graphical User Interface (GUI) for Site Setup and Customization

The system architecture also includes a GUI for interfacing with various customers and other users. The GUI can provide application services or reports to the users and receive input for the various models from the users. The GUI can, for example, provide visualizations of various models to the users. The GUI can also provide an interface for zone management, window management, and occupancy region definition to set up the clear sky model. The GUI can also provide an interface for entering priority data, reflective properties of exterior surfaces, override values, and other data. In addition, the users can use the GUI to customize the spaces of the 3D model, for example, after viewing visualizations of the clear sky model of the building site. Some examples of customizations include:

- re-structure the building site (move buildings, revise exterior surface properties) to see changes to reflection, glare, and heat conditions or to tinting of zones of building
- re-structure internal structures (walls, floors) and external shell of building to see how changes will affect tint states
- manage zones of windows
- change materials used in building to see changes to reflection properties and corresponding changes in reflection model and tint states
- change tinting priorities to see changes in tint states as mapped to 3D model of building
- override tint states in schedule data
- revise buildings at building site
- add model of new condition D. Window Control System The system architecture described herein includes a window control system that includes a network of window controllers controlling the tint levels of the zones of tintable windows at the building. Some examples of controllers that may be included in the window control system of the system architecture are described with respect to FIGS. 6 and 7. Other examples of window controllers that may be included in the window control system are described in U.S. patent application Ser. No. 15/334,835 filed on Oct. 26, 2016 and titled "CONTROLLERS FOR OPTICALLY-SWITCHABLE DEVICES," which is hereby incorporated by reference in its entirety.

The window control system includes control logic for making tinting decisions and sending tint instructions to change tint levels of the windows. In certain embodiments, the control logic includes logic of a Module C and a Module D that determine a tint level for each zone based on infrared sensor and/or photosensor measurements. As discussed above, the clear sky model schedule information is pushed to the window control system. In one implementation, the control logic of the window control system determines the final tint state as the minimum value between the tint state from the yearly schedule information and the maximum tint state from Module C/D.

As mentioned above, the window control system of the system architecture described herein does not generate models. The models maintained by the control architecture are specific to the building site and are maintained in the cloud network by the cloud-based modules.

E. General Process of System Architecture

As discussed above, FIG. 8B is an illustrated example of the flow of data communicated between some of the systems of the system architecture 800. As shown, the clear sky module 820 generates clear sky model schedule information and pushes that information to the window control system 840. The clear sky module 820 includes logic that generates a tint state for each time interval and zone by applying the priority data to the condition values. The control logic of the window control system 840 sets the final tint state for each zone. In this example, the final tint state is determined by the logic as the minimum between the clear sky tint state and a maximum weather tint state. The maximum weather tint state is the maximum tint state between a tint state determined by Module C and a tint state determined by Module D. In other implementations, the logic of the clear sky module 820 determines the final tint states using other methods.

FIG. 12 is schematic illustration of an example of certain logic operations implemented by the clear sky module to generate tint schedule information based on clear sky conditions (also referred to herein as "clear sky tint schedule information"). In this illustrated example, the clear sky module applies the tint state assigned to each condition to the condition values and then applies the priorities from the priority data to determine the tint state for each zone at a particular time. In another example, the clear sky module could apply the priorities from the priority data to the condition values to determine the condition that applies and then apply the tint state for that condition to determine a tint state for each zone at a particular time interval.

In FIG. 12, the top table ("Table 1") is an example of a table of condition values determined by the clear sky module including values of the glare condition, the direct reflection condition, and the passive heat condition for zone 1 of a building at different time intervals during the morning of a day. In this example, the condition values are binary values (0 or 1) of whether the condition exists at different times during day: "0—Condition does not exist and 1—Condition does exist. FIG. 12 also includes a second table ("Table 2") that is an example of tint state assigned for each condition (glare, reflection, passive heat) to each zone. For example, Zone 1 is assigned for a glare condition to Tint 4, Zone 1 is assigned for a reflection condition to Tint 3, and Zone 1 is assigned for a passive heating condition to Tint 2. When a condition is true, the clear sky module assigns a tint state to apply for that condition. Priority data generally refers to the list of priorities for each of the conditions (glare, reflection, passive heat) at each zone of the building. Priority data can be configurable by a user in certain cases. The third table ("Table 3") illustrated in FIG. 12 is an example of a configurable priority table (e.g. configurable by a user) that assigns priority to conditions for each zone to let the clear sky module know which condition takes priority. In this example, priorities are given for glare condition, direct reflection condition, and passive heat condition for each zone of a building. FIG. 12 also includes a graph with four plotted curves. The first curve ("Zone 1 Glare") are the clear sky tint states at zone 1 over a day based on applying the tint states assigned to the glare condition in Table 2 to the condition values Table 1 applied over a day. The second curve ("Zone 1 Reflection") are the clear sky tint states at zone 1 over a day based on applying the tint states as assigned to the reflection condition in Table 2 to the condition values Table 1 applied over a day. The third curve ("Zone 1 Passive Heat") are the clear sky tint states at zone 1 over a day based on applying the tint states as assigned to the passive heat condition in Table 2 to the condition values Table 1 applied over a day. The fourth curve ("Priority Constrained") are the clear sky tint states at zone 1 over a day based on the priority data from Table 3 applied to the tint states determined by applying the tint states assigned to each condition (glare, reflection, passive heat) in Table 2 to the condition values Table 1 applied over a day.

Figure 13:
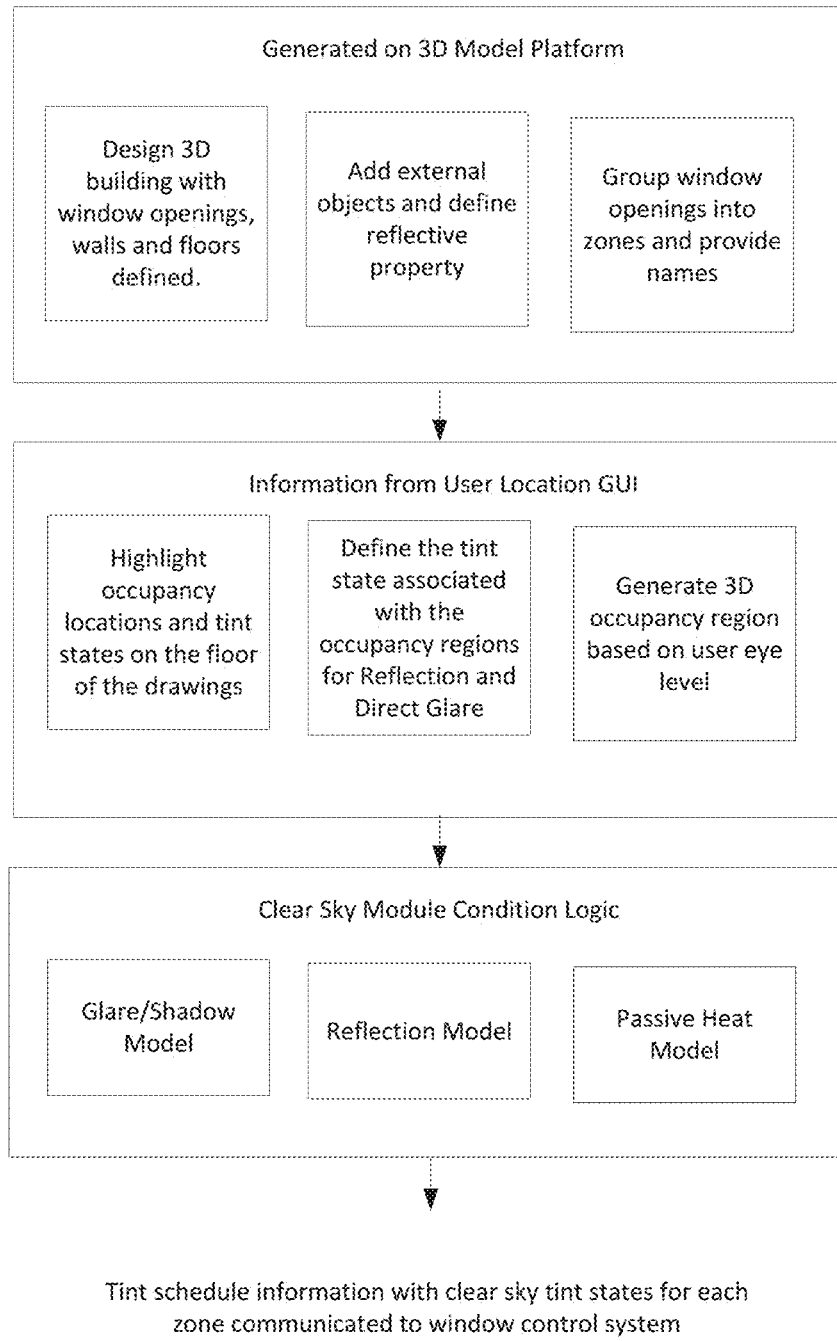
FIG. 13 is schematic depiction of the model data flow through the cloud-based systems of the system architecture shown in FIG. 8A.

FIG. 13 is schematic depiction of the model data flow through the cloud-based systems of the system architecture of an implementation. The 3D model is generated on the 3D platform. An illustrated example of a 3D model is shown in FIG. 9. The 3D model includes a 3D version of the building of interest with window openings, walls and floors defined. External surfaces of surrounding objects and their reflective properties are added to the 3D model on the on the 3D platform. The window openings in the 3D model are grouped into zones and given names on the 3D platform. Information is received from the user, for example, via the GUI. For example, the user can highlight or otherwise identify the 2D areas of the occupancy locations and/or identify the desired tint states for these occupancy locations on the floor of the spaces of the 3D model of the building or in the architectural model used to generate the 3D model. The user can also use the GUI to define the tint state for each occupancy region that is associated with each condition such as, for example, the direct glare condition and the reflection condition. The user can also input a value for the user eye level. This value of the user eye level can be used to generate a 3D extrusion of the 2D area of the occupancy locations to determine a 3D volume of the occupancy region. The logic of the clear sky module can be used to generate various condition models including, for example, a glare/shadow model, a reflection model, and a heat model. Illustrated examples of a glare/shadow model and reflection model are shown in FIGS. 10 and 11 respectively. The condition models can be used to generate clear sky tint schedule information communicated to the window control system.

III. Clear Sky Module—Models Setup/Customizations and Generating Scheduling Information The 3D model of a building site is initialized during a site setup process. In some implementations, the user is given the capability, e.g., through a GUI, of revising the 3D model to customize the control of the tintable windows and/or other systems in the building. These customizations can be reviewed by the user through visualizations using the 3D modelling platform. For example, customers or other users can view what has been designed for the building site after customization and how it will operate on a given day and provide "what if" scenarios. Also, different users can review the same 3D model stored on the cloud network to compare and discuss options that will cater to multiple users. For example, Customer Success Managers (CSMs) can review user locations, tint states by condition, priorities and expected behavior during clear sky conditions with the facility managers. The site setup process includes generating a 3D model of the building site and assigning attributes to the elements of the 3D model. The 3D model platform is typically used to generate a 3D model of the building site by stripping away unnecessary features from an architectural model of the building of interest and creating external surfaces of objects surrounding the building.

Figure 14:
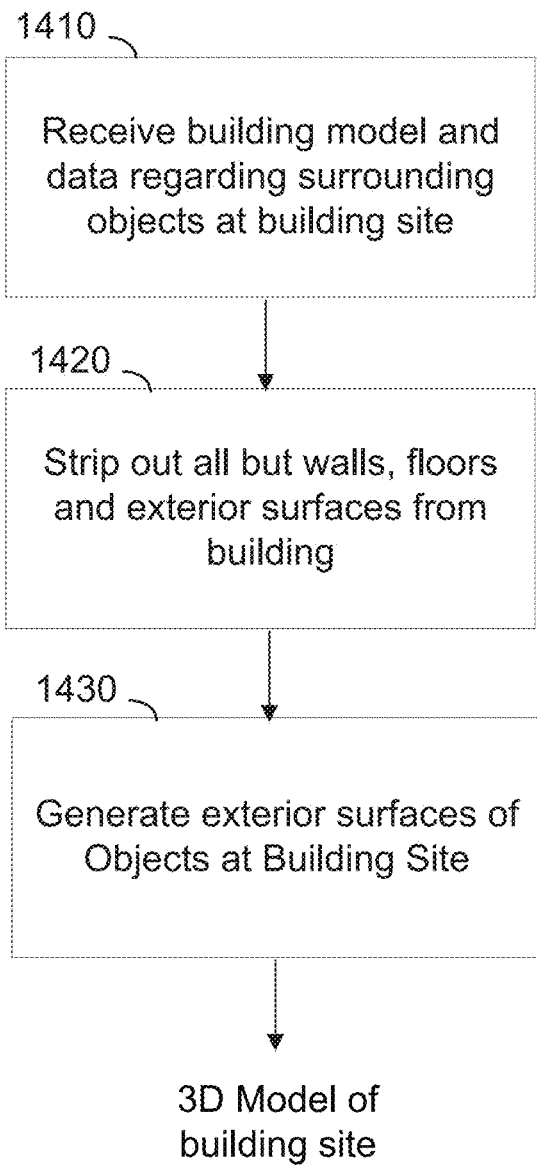
FIG. 14 is a flowchart of the general operations involved in initializing the 3D model on the 3D model platform, according to various implementations.

FIG. 14 is a flowchart depicting the general operations involved in initializing the 3D model on the 3D model platform according to various implementations. In one implementation, the 3D model is generated automatically from an architectural model of the building and/or the surrounding structures by stripping the architectural model of all but the structural elements representing the window openings, walls, floors and exterior surfaces of the building with the tintable windows. For example, an Autodesk® Revit model of a building may be received and stripped of all elements except walls, floors, and exterior surfaces including window openings. These operations may be implemented by the 3D modelling system. In FIG. 14, the 3D modelling system receives an architectural model for the building with the tintable windows and also data, possibly the same or different architectural model, for the structures and other objects surrounding the building at the building site (1410). At operation 1420, the 3D modelling system strips out all but the structural elements representing the window openings, walls, floors and exterior surfaces of the building with the tintable windows. At operation 1430, the 3D modelling system builds the exterior surfaces of buildings and other objects surrounding the building or removes all elements from the surrounding objects except the exterior surfaces. The output of operation 1430 is the 3D model of the building site. An example of a 3D model of a building site is shown in FIG. 9.

Figure 15:
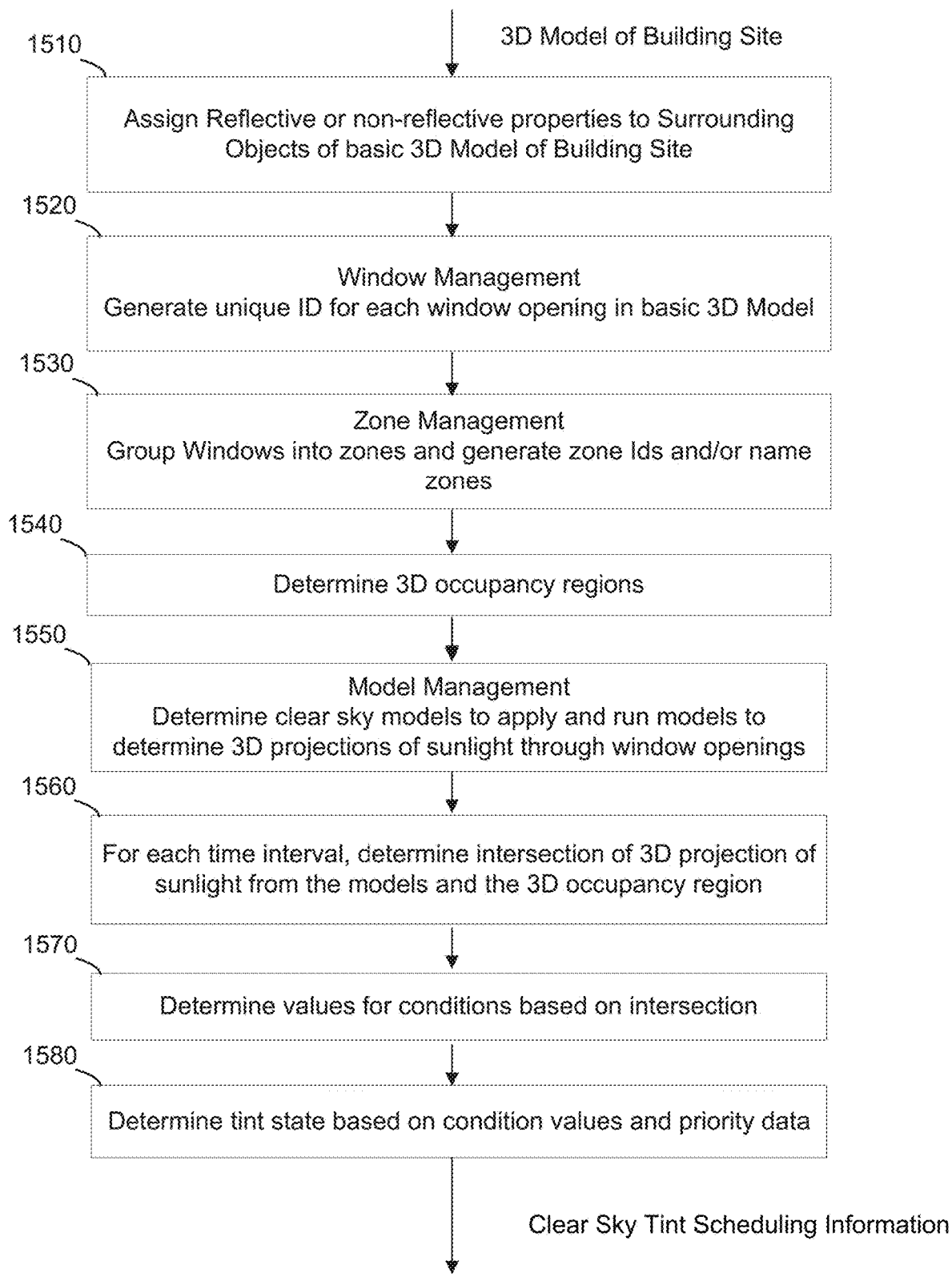
FIG. 15 is a flowchart of the general operations involved in assigning attributes to the 3D model, generating the condition models, and other operations involved to generate the clear sky scheduling information, according to various implementations.

FIG. 15 is a flowchart depicting the general operations involved in assigning attributes to the 3D model, generating the condition models, and other operations involved with generation of the clear sky tint scheduling information, according to certain implementations. One or more of these operations may be implemented using logic of the clear sky module. As depicted, the input for the operations is the 3D model of the building site from the 3D modelling system (e.g., 3D modelling system 810 in FIG. 8A). At operation 1510, the reflective or non-reflective properties are assigning to the surface elements of any objects surrounding the building in the 3D model of the building site. These reflective properties will be used to generate the reflective model to evaluate conditions.

At operation 1520, a unique window ID is assigned to each window openings of the building of interest in the 3D model. In this window management operation, the window openings are mapped to unique window/controller IDs. In one implementation, these mappings may be validated and/or revised based on input from commissioning of the windows at installation in the building.

At operation 1530, window openings in the 3D model are grouped into zones and zone IDs and/or names of the zones are assigned to the zones. In this zone management operation, window openings in the building of interest in the 3D model are mapped to zones. Each zone maps to one or more window openings.

At operation 1540, one or more 3D occupancy regions in the building of interest in the 3D model are determined. For example, the user may identify/define two-dimensional (2D) areas as occupancy areas on floors of the 3D model and also define an eye level of the occupant associated with each occupancy area. The logic of the clear sky module can generate an extrusion of each 2D occupancy area from the floor to the defined eye level to generate a 3D occupancy region in the 3D model.

At operation 1550, the clear sky models that will be applied are determined and the clear sky models are run to determine the 3D projections of sunlight through the window openings. In this model management operation, the various clear sky models, e.g., glare/shadow model and reflection model, are generated. The clear sky module includes a ray tracing engine that can be used to determine the directions of rays of sunlight based on different positions of the sun in the sky throughout a day of a year or other time period. The ray tracing engine can also be used to determine the reflection direction and intensity of the reflected light from objects surrounding the building of interest from the location and reflective properties of the external surfaces of the objects surrounding the building. From these determinations, 3D projections of sunlight through the window openings in the 3D model can be determined.

At operation 1560, the amount and duration of any intersection of the 3D projections of sunlight through the window openings and the 3D occupancy region(s) is determined. For each time interval of the day, the clear sky models are run to determine the 3D projection of sunlight through the window openings and the amount of any intersection of the determined 3D projection with a 3D occupancy region(s). By determining amount of the intersection at each time interval, the duration of the intersection can be determined.

At operation 1570, the conditions are evaluated based on the intersection properties determined at operation 1560. For example, a value for a glare/condition for a particular zone can be determined based on the amount and duration of any intersection of the determined 3D projections through the window openings with 3D occupancy region(s) in that zone.

At operation 1580, the priority data is applied to the condition values evaluated at operation 1570 to determine a tint state for each zone of the building over time, e.g., in a yearly schedule. For example, the process described with respect to FIG. 12 can be used in one implementation to determine tint states for each zone over a time period. These tint states based on clear sky conditions are communicated to the window control system to make final tinting decisions that are implemented at tintable windows.

A. Window Management

During set up of the 3D model of the building site, each window opening is assigned a unique window id that corresponds to a local window controller. Assigning the window opening to a window id maps the window opening to a single window controller. Each window id effectively represents each window controller that can be grouped into a zone. Alternatively or additionally, after installation of the windows and their controllers in a building, commissioning operations may be used to determined which window is installed in which location and paired to which window controller. These associations from the commissioning process can then be used to compare to and validate the mapping in the 3D model or update the mapping in the configuration data of the 3D model. An example of a commissioning process that can be used to determine such mappings is described in International application PCT/US2017/062634, filed on Nov. 11, 2017 and titled "AUTOMATED COMMISSIONING OF CONTROLLERS IN A WINDOW NETWORK," which is hereby incorporated by reference in its entirety. The mapping of each window opening to a window ID may also be revised based on user customizations.

Figure 16:
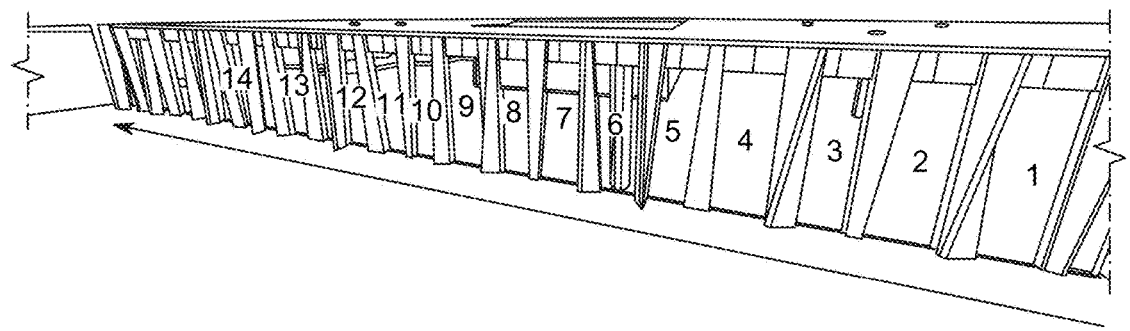
FIG. 16 is an example of a visualization of window management on the 3D modelling platform, according to various implementations.

In one implementation, the user can select window openings in the 3D model on the 3D model platform and assign unique window ids. FIG. 16 is an example of such an implementation as applied to fourteen (14) window openings in a floor of a building of interest in a 3D model. As shown, the user has assigned these window openings the window ids of 1-14.

B. Zone Management

Each zone of a building includes one or more tintable windows. The tintable windows are represented as openings in the 3D model. The one or more tintable windows in each zone will be controlled to behave in the same way (e.g., transitioned to the same end tint state). This means that if the occupancy region(s) associated with one of the tintable windows in a zone experiences a particular condition, all the tintable windows will be controlled to react to that condition. The configuration data with attributes of the 3D model include zone properties such as one or more of a name of the zone, an SHGC value of a representative window of the zone, and a maximum value of internal radiation.

Figure 17A:
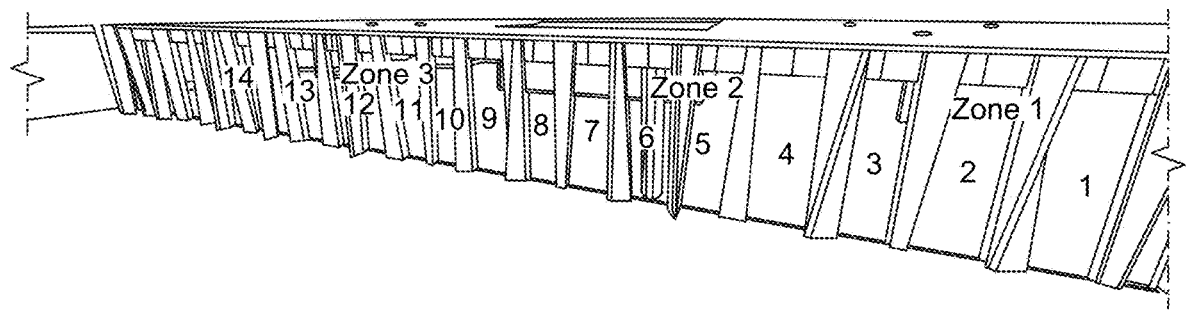
FIG. 17A is an example of a visualization of zone management on the 3D modelling platform, according to various implementations.

During zone management as part of site setup or customization of the 3D model, a user can define the window openings that will be grouped together in zones and assign properties to the defined zones. FIG. 17A is an illustrated example of a graphical interface on the 3D modelling platform that allows a user to select one or more window openings from the fourteen (14) window openings shown in FIG. 16 to group together as (map to) a zone and to name the zone. This can be done for any number of zones. In this example, window openings 1, 2, and 3 are defined as "Zone 1," window openings 4-7 are defined as "Zone 2," and window openings 8-14 are defined as "Zone 3."

Figure 17B:
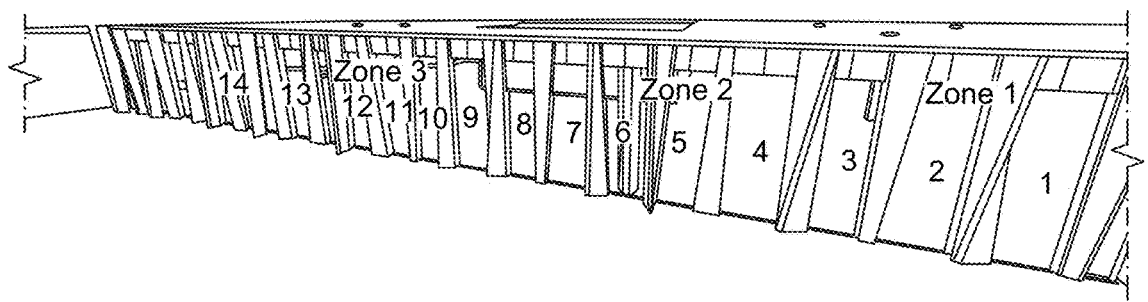
FIG. 17B is an example of a visualization of zone management on the 3D modelling platform, according to various implementations.

In one implementation, the user can select and group together multiple zones so that the multiple zones behave in the same way. FIG. 17B is an illustrated example of a graphical interface on the 3D modelling platform that allows a user to select and group together "Zone 1" and "Zone 2" from FIG. 17A. As shown, "Zone 1" and "Zone 2" are grouped together and are controlled in the same manner. Each of the zones grouped together retain their zone name, ID, and associated window IDs.

Figure 18:
FIG. 18 is an example of an interface that can be used by a user in zone management, according to various implementations.

FIG. 18 is an example of an interface that can be used by a user to map the unmapped spaces of a 3D model to particular defined zones. As shown, the user has selected the spaces of "Office 1," "Office 2," "Office 3," and "Office 4" to be mapped to "Zone 1." In this example, the windows associated with these spaces will be associated with "Zone 1." In one aspect, the user can select the "review mapping" button to visualize the mapped windows of the spaces in "Zone 1" on the 3D model of the building site.

Figure 19:
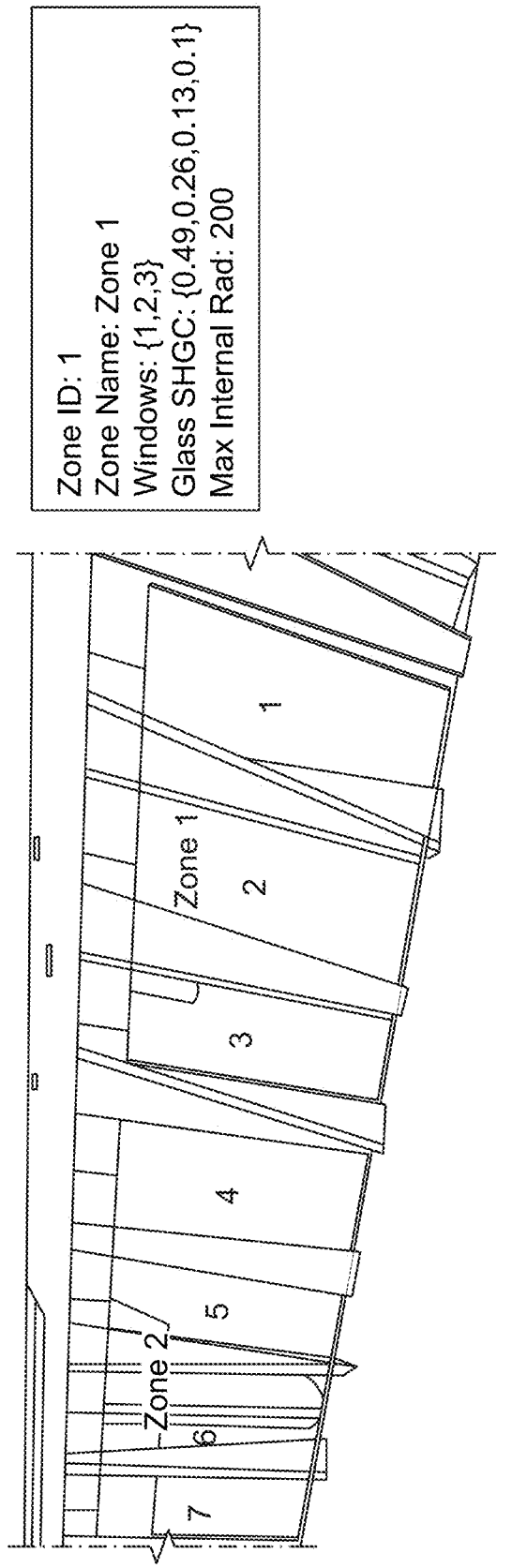
FIG. 19 is an example of an interface that can be used by a user in zone management to review the properties assigned to each zone, according to various implementations.

During zone management, each zone is assigned zone properties. Some examples of zone properties include: zone name (user defined), zone id (system generated), IDs of windows, glass SHGC, maximum allowable radiation into the space in watts per meter squared. FIG. 19 is an example of interface that can be used by review the properties assigned to each zone of window openings from the fourteen (14) window openings shown in FIG. 16. In this example, the user can select "Zone 1" to display that Zone ID, the Zone name, the IDs of the windows in the zone, the Glass SHGC values, and the maximum allowable radiation.

C. Generate 3D Occupancy Regions

As used herein, an occupancy region refers to a three-dimensional volume that is likely to be occupied during a particular time period. Occupancy regions are defined during site setup and can be re-defined during customization. In certain implementations, defining an occupancy region involves defining a three-dimensional volume by extruding a two-dimensional occupancy area on a surface (e.g., a floor) to a vertical plane at the eye level of an occupant, and assigning properties to the 3D occupancy region. Some examples of properties include occupancy region name, glare tint state (tint state if glare condition exists), direct reflection tint state (tint states for different levels of direct reflection radiation), and indirect reflection tint state (tint states for different levels of indirect reflection radiation).

Figure 20A:
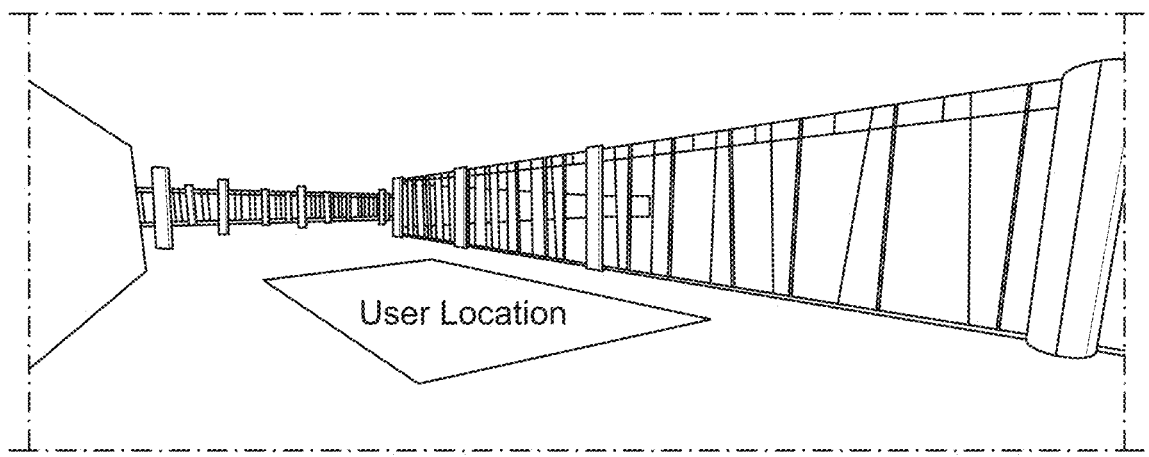
FIG. 20A is an illustrated example of a two-dimensional user location drawn on the floor of a 3D model, according to an implementation.
Figure 20B:
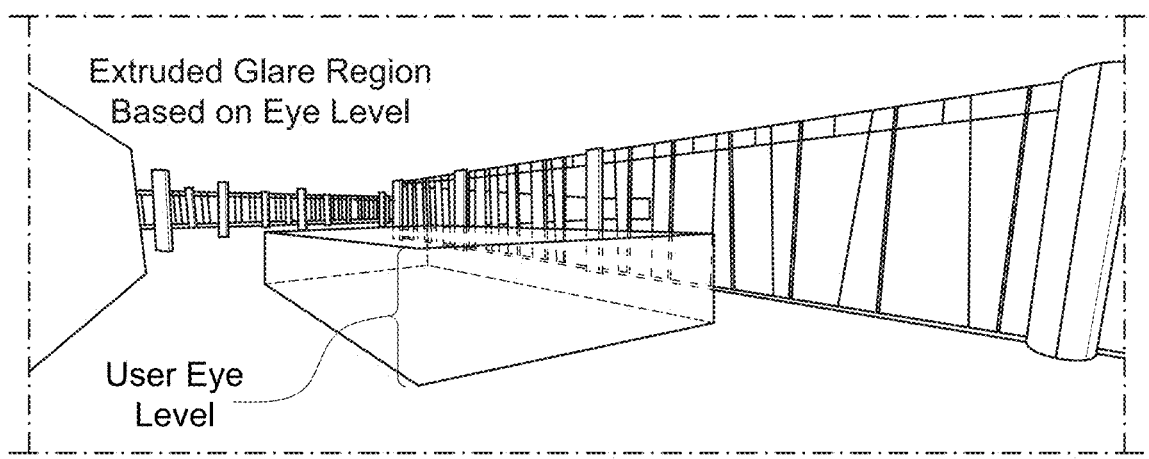
FIG. 20B is an illustrated example of a three-dimensional occupancy region generated by extruding the two-dimensional object in FIG. 20A to an upper eye level.

In certain implementations, an occupancy region is generated on the 3D modelling platform. The user draws or otherwise defines the user location or area of activity as a two-dimensional shape (e.g., polygon) or shapes on the floor or other surface (e.g., desktop) of the 3D model and also defines an occupant eye level. An example of a two-dimensional four-sided user location drawn on the floor of a 3D model is shown in FIG. 20A. The clear sky module defines the three-dimensional occupancy region as an extrusion of the two-dimensional shape from the surface to the occupant eye level (e.g., lower eye level or upper eye level). An example of a three-dimensional occupancy region generated by extruding the two-dimensional object in FIG. 20A to an upper eye level is shown in FIG. 20B.

D. Clear Sky Models

In certain implementations, a glare/shadow model, a direct reflection model, and an indirect reflection model are generated based on the 3D model of a building site. These models can be used to determine 3D projections of sunlight through the window openings of the building of interest in the 3D model over time based on clear sky conditions. A raytracing engine is used to simulate the directions of rays of sunlight at the location of the sun during each time interval. The simulations are run to evaluate different glare conditions in each of the zones of a building such as a basic glare condition (direct radiation intersecting an occupancy region), direct reflection glare condition (single bounce reflection off a direct reflective surface to an occupancy region), indirect reflection glare condition (multiple bounce reflection off an indirect reflective surface(s) to an occupancy region). The simulations assume clear sky conditions and take into account shadowing on spaces and reflection by external objects surrounding the building. The simulations determine values of glare and other conditions in time intervals over a year or other time period. The clear sky tint schedule data includes values for each of the conditions and/or tint state for each time interval (e.g., every 10 minutes) over a time period such as a year.

Generally, the clear sky module includes logic to determine whether different conditions (e.g., glare, reflection, passive heat) exist at each zone of the building at each time interval (e.g., every ten minutes) of a time period such as a year. The clear sky module outputs tint schedule information of values for these conditions and/or associated tint states at each zone for each time interval. The value of a condition may be, for example, a binary value of 1 (condition does exist) or 0 (condition does not exist). In some cases, the clear sky module includes a raytracing engine that determines the direction of rays of sunlight (direct or reflected) based on the location of the sun at different times.

In one aspect, the glare condition is evaluated based on multiple glare areas from the models in a single occupancy region. For example, light projections can intersect different occupancy areas within a single occupancy region. In one aspect, the conditions are evaluated based on multiple elevations within in a single zone.

Glare Control

In certain implementations, a determination of a glare condition is made using the intersection (also referred to as an "overlap") of a 3D projection of sunlight from the glare (absence of shadow) model and/or the direct reflection (one bounce) model with a three-dimensional (3D) occupancy region. A positive determination of basic glare from the glare model is a function of the percentage (%) of total intersection with the 3D occupancy region and the duration of the intersection. The determination of reflection glare based on the reflection model is a function of the duration of the intersection. The clear sky module includes logic for evaluating the existence (positive determination) of a glare condition based on the glare (absence of shadow) model and/or the direct reflection (one bounce) model based on surrounding objects to the building.

According to one implementation, for each zone, the logic determines from the glare model if 3D projections of direct sunlight through the window openings of the zone intersect any of the three-dimensional occupancy regions in the zone. If the % intersection is greater than the minimum % of total Intersection (minimum threshold of overlap from the window projection into the occupancy region before glare condition is considered) and the duration of the intersection is greater than the minimum duration of intersection (minimum amount of time the intersection must occurs before it becomes significant), then a glare condition value (e.g., 1) and tint state associated with the glare condition is returned. If the logic determines from the glare model that a 3D projection of direct sunlight through the window openings does not intersect any of the three-dimensional occupancy regions in the zone, for example, zone is in a shadow, then a glare condition value (e.g., 0) and tint state associated with no glare condition is returned. The logic takes the maximum tint state of the zones that may be linked together. If there are no intersections, a lowest tint state is returned (e.g., tint 1).

In another implementation, the logic determines for each time interval, for each zone of tintable windows (collection of window openings), if the sun is directly intersecting any of the three-dimensional occupancy regions. If any of the occupancy regions are simultaneously intersected, output is that the condition does exist. If none of the occupancy regions are intersected, the condition does not exist.

Figure 21:
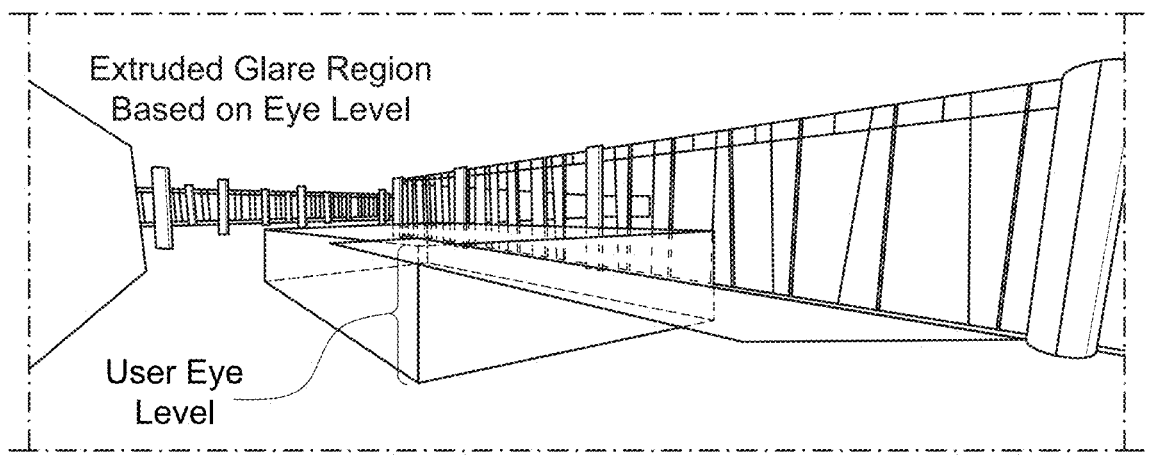
FIG. 21 is an illustrated example of using the glare/shadow model that returned a no glare condition based on the three-dimensional occupancy region shown in FIG. 20B.

FIG. 21 is an example of using a simulation of the glare/shadow model that did not return a glare condition based on basic glare. In this example, the simulation generated a low total intersection of glare with the 3D occupancy region and the glare was not present long throughout the day so that the clear sky module did not return a glare condition.

Figure 22:
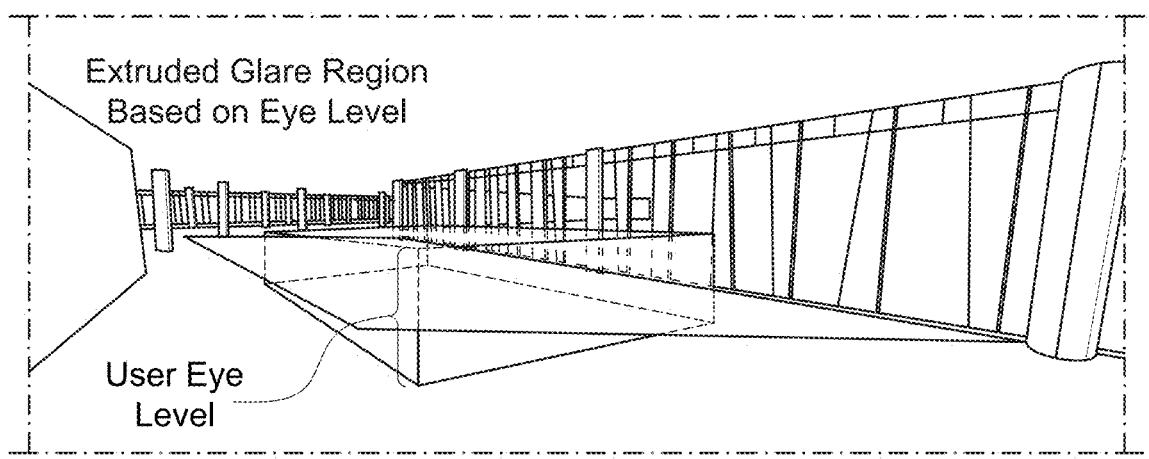
FIG. 22 is an illustrated example of using the direct reflection (one bounce) model that returned a glare condition based on the three-dimensional occupancy region shown in FIG. 20B.

FIG. 22 is an example of using a simulation of the direct reflection (one bounce) model that returned a glare condition based on glare from direct one-bounce reflection. In this example, the simulation generated a high total intersection with the 3D occupancy region and extended periods of glare occurred on this day so that glare value was returned.

Reflected Radiation Control

The clear sky module includes logic for evaluating the existence of a reflection condition under clear sky conditions based on the models and for determining the lowest state to keep the internal radiation below the maximum allowable internal radiation. The logic determines a radiation condition based on the direct normal radiation hitting the window openings of a zone. The logic determines a tint state based on the clearest tint state that can keep the normal radiation below the defined threshold for that zone.

The logic determines the external normal radiation on the tintable window from the 3D model and calculates the internal radiation for each tint state by multiplying the determined level of external radiation by the glass SHGC. The logic compares the maximum internal radiation for the zone to the calculated internal radiation for each of the tint states and chooses the lightest calculated tint state that is below the maximum internal radiation for that zone. For example, the external normal radiation from the model is 800 and the maximum internal radiation is 200 and the T1=0.5, T2=0.25, and T3=0.1. The logic calculated the internal radiation for each tint state by multiplying the determined level of external radiation by the glass SHGC: Calc T1 (800)*0.5=400, Calc T2 (800)*0.25=200, and Calc T3 (800)*0.1=80. The logic would select T2 since T2 is lighter than T3.

In another implementation, the logic determines for each zone of windows (collection of openings), if the sun has a single bounce off of the external objects. If there is a reflection to any of the occupancy regions, then the reflection condition does exist. If reflection is not on any of the occupancy regions, the reflection condition does not exist.

Passive Heat Control

In certain implementations, the clear sky module includes logic for evaluating the existence of a passive heat condition that sets a darker tinting state in the windows of a zone based on output from the clear sky models. The logic determines the external solar radiation hitting the tintable windows under clear sky conditions from the clear sky models. The logic determines the estimated clear sky heat entering the room based on the external radiation on the tintable windows. If the logic determines that the estimated clear sky heat entering the room is greater than a maximum allowable value, then the passive heat conditions exists and a darker tint state is set to the zone based on the passive heat condition. The maximum allowable value may be set based on the external temperature to the building and/or user input. In one example, if the external temperature is low, the maximum allowable external radiation may be set very high to allow for an increased level of passive heat to enter the building space.

E. Building Site Clear Sky Model Customizations

Figure 23:
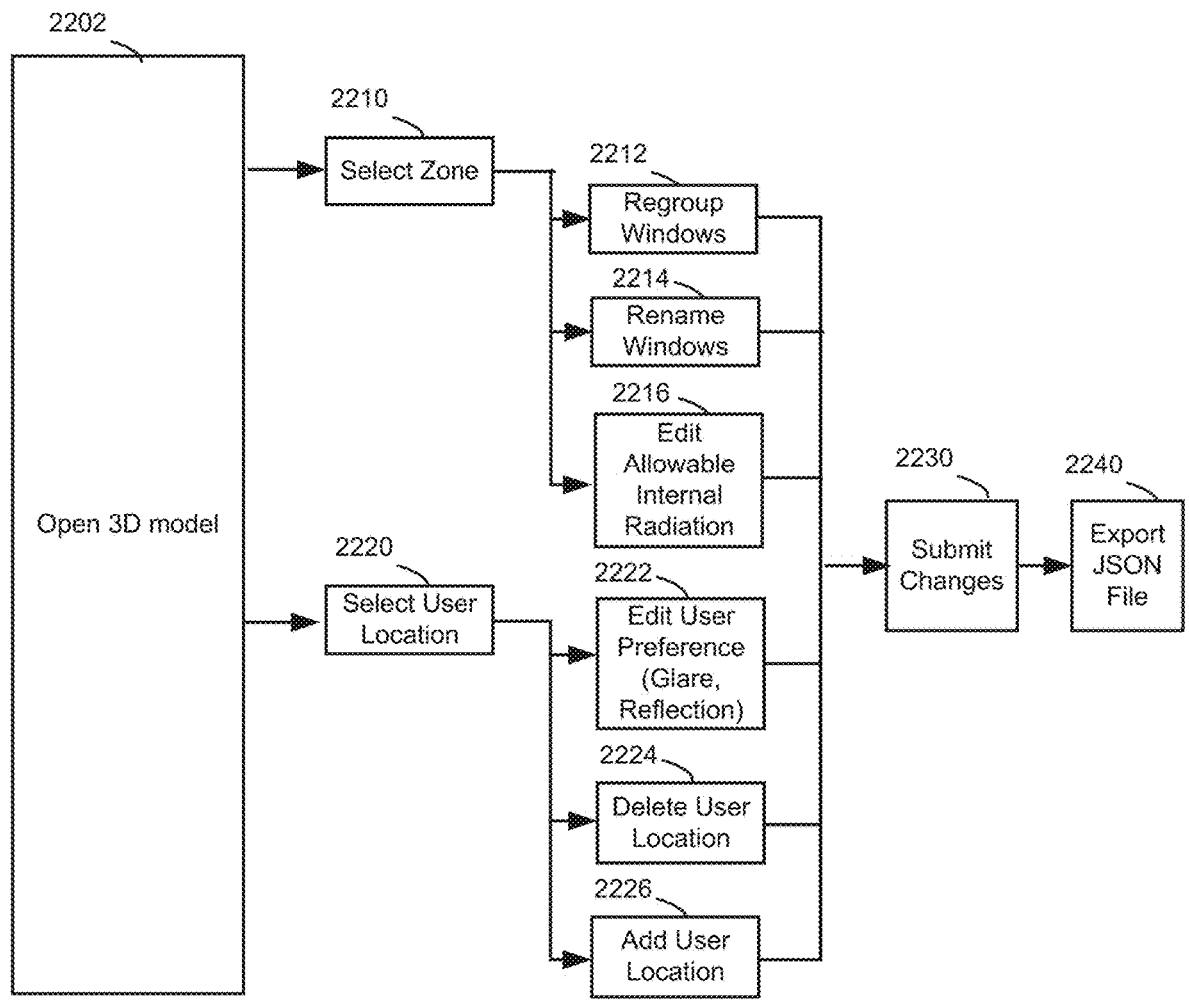
FIG. 23 is a flowchart of the actions and processes for implementing user input to customize the clear sky 3D model of a building site, according to one aspect.

FIG. 23 is a flowchart of the actions and processes for implementing user input to customize the clear sky 3D model of a building site, according to one aspect. These site editing operations can be implemented by logic on the clear sky module. The attributes of the clear sky model can be editable (customizable) and defined/redefined at any time. The user can enter input via a GUI, for example. In the flowchart, the process starts by opening the 3D model (2202). The user then has the options of selecting a zone to edit or a user location to edit (2210, 2220). If the user selects to edit a zone, the user can regroup the windows defined to that zone (2212), rename the zone (2214), and/or edit the allowable internal radiation or other property of the zone (2216). If the If the user selects a user location to edit (2220), the user edit the user preferences to select a glare model or a reflection model to map to the user location (2222), and or delete a user location (2224) or add a user location (2226). Once the edit is made or edits are made, the user submits the changes to update the clear sky 3D model of the building site (2230). The changes are used to generate new schedule data based on the revised clear sky 3D model and the schedule data is exported and communicated to the window control module (2240).

F. Visualizations

In certain implementations, the system architecture includes GUI that allows the user to make changes to attributes of the clear sky model to see the changes to the model and/or changes to the schedule data in visualizations on the 3D modeling platform. Visualizations of the building site on the 3D modeling platform can be used for the purposes of customization.

Figure 24:
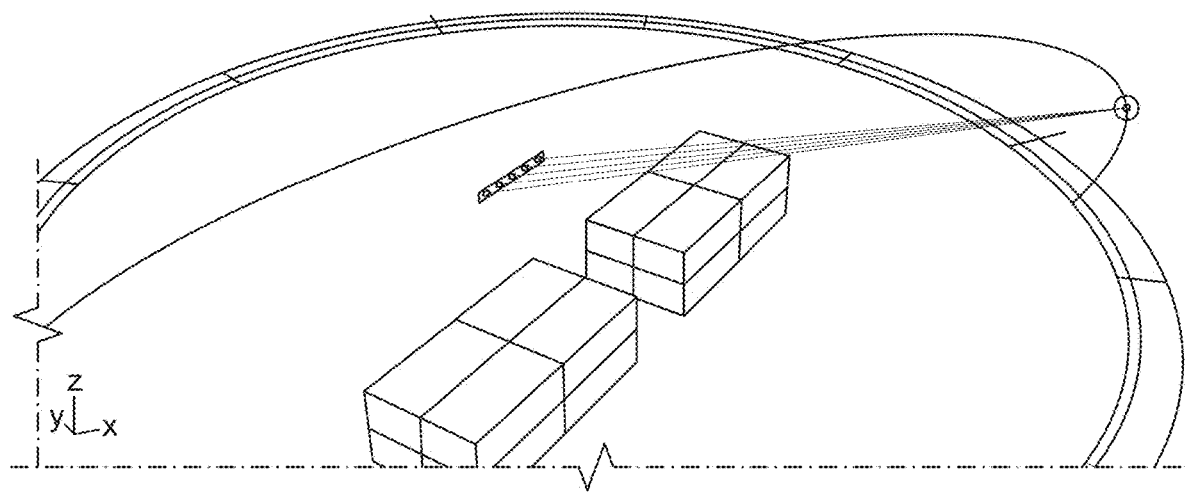
FIG. 24 is an example of a visualization of the direct rays of sunlight on a zone of five tintable windows to see how the sun is impacting glare on the windows, according to one aspect.

In one aspect, the user can see how that sun is impacting glare on a zone or group of zones by selecting the zone or group of zones and a date/time from the glare/shadow clear sky model. FIG. 24 is an example of a visualization of the direct rays of sunlight on a zone of five tintable windows at a particular date/time to see how the sun is impacting glare on the windows. In one example, the GUI can include a slider or other movable selector interface that allows the user to slide through different time intervals in the day to see the sun path and impact of glare from direct sunlight over the course of a day.

Figure 25:
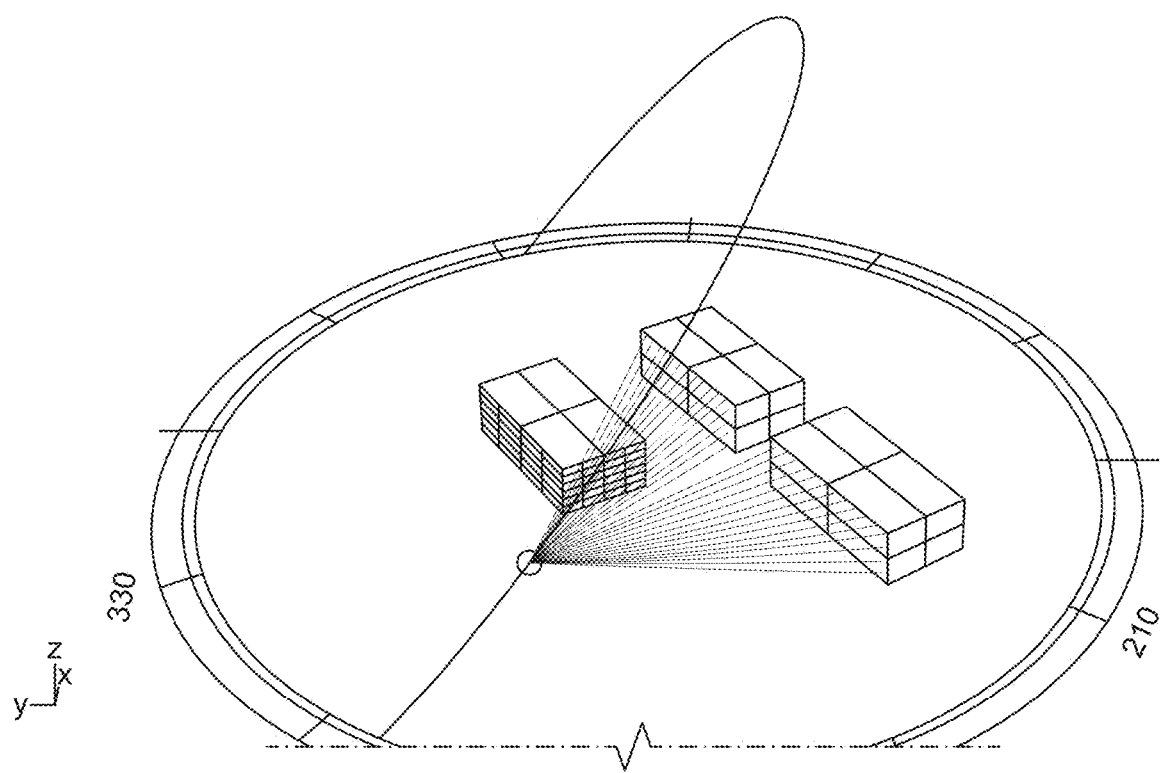
FIG. 25 is an example of a visualization of the reflected (one bounce) rays of sunlight off two buildings to a zone of five tintable windows on the building of interest to see how the sun is impacting reflected radiation, according to one aspect.

As another aspect, the user can see how that sun is impacting reflection on a zone or group of zones by selecting the zone or group of zones and a date/time from the reflection model. FIG. 25 is an example of a visualization of the reflected (one bounce) rays of sunlight off two buildings to a zone of five tintable windows on the building of interest to see how the sun is impacting reflected radiation at the particular date/time. In one example, the GUI can include a slider or other movable selector interface that allows the user to slide through different time intervals the day to see the sun path and impact of reflected radiation over the course of a day.

In another aspect, the user can see how the is impacting glare and reflection light on a zone or group of zones by implementing both the reflection model and the glare/shadow clear sky model.

III. Window Control System

Examples logic modules based on infrared sensors and photosensors are described in international PCT application PCT/US17/55631, filed on Oct. 6, 2017 titled "INFRARED CLOUD DETECTOR SYSTEMS AND METHODS, which is hereby incorporated by reference in its entirety.

A. Control Method with Clear Sky Tint Schedule Data and Modules C and D

Figure 26:
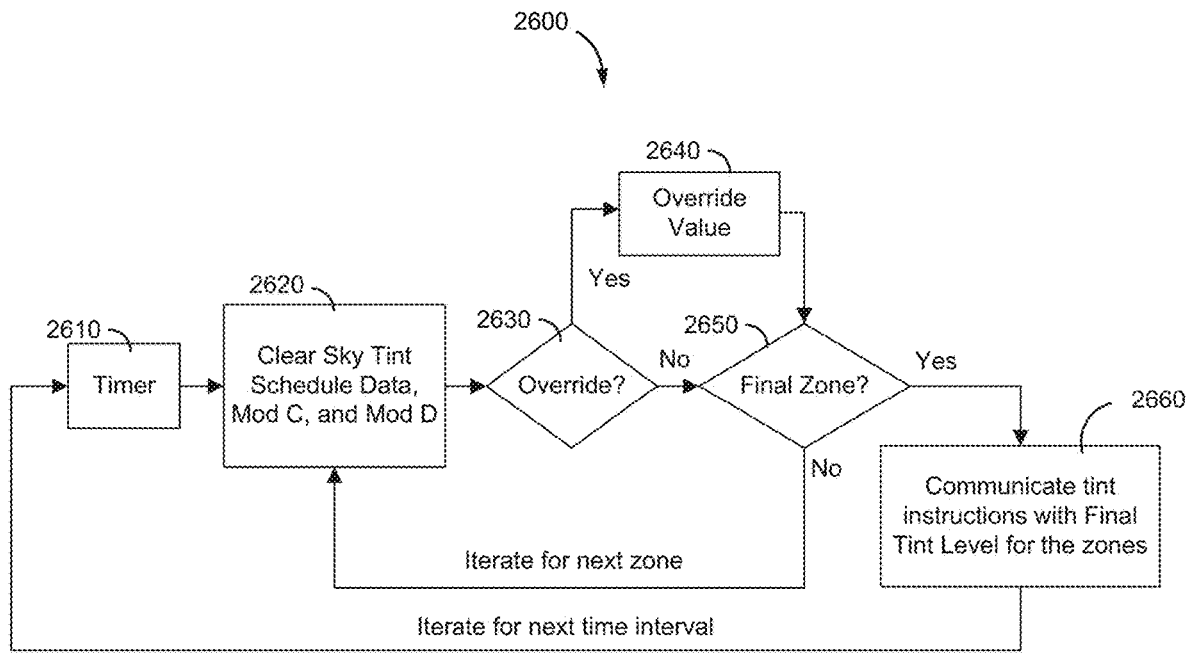
FIG. 26 is a flowchart depicting general control logic implemented by the window control system to control the one or more zones of tintable windows in a building, according to various implementations.
Figure 27:
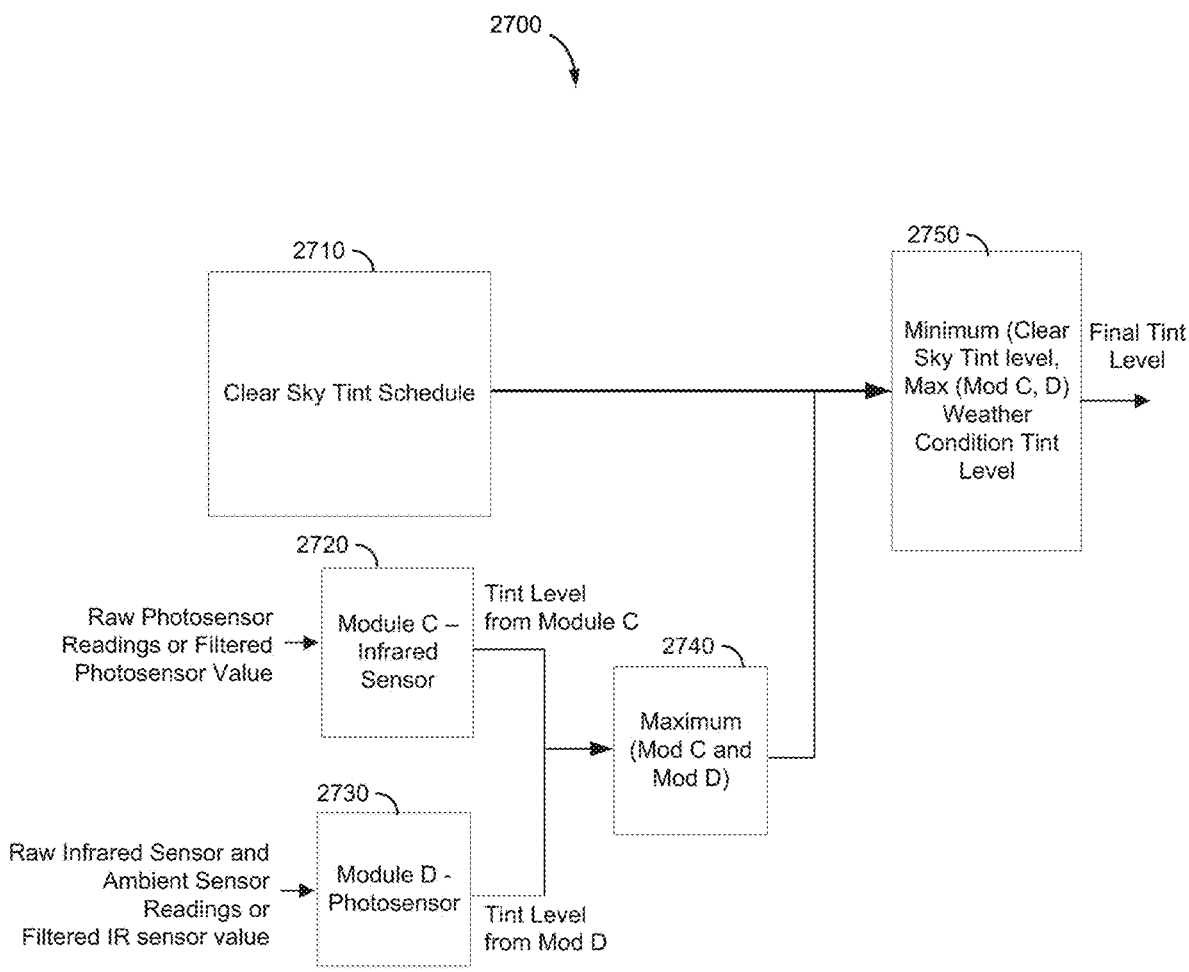
FIG. 27 is a flowchart depicting control logic for making tint decisions based on input from the clear sky model output, Module C, and Module D, according to various implementations.

FIG. 26 includes flowchart 2600 depicting control logic for a method of controlling the one or more zones of tintable windows in a building, according to various implementations. This control logic determines a final tint level for each zone based on one or more of a tint level determined from the clear sky tint schedule data received from the clear sky module, a tint level determined by Module C, and a tint level determined by Module D. The window control system communicates tint instructions to transition each of the tintable windows in the zone(s) to the final tint level. For example, the window control system may include a master controller that implements this control logic to make tinting decisions and communicate the final tint level for each zone to the local window controller(s) controlling the tintable windows of that zone. In one implementation, the tintable windows are electrochromic windows, each including at least one electrochromic device. For example, each tintable window may be an insulated glass unit with two glass lites having an electrochromic device on at least one of these lites. The instructions for the control logic can be executed by one or more processors of window controller or window controllers and/or a multi-sensor device described herein. For example, a processor of a multi-sensor device may determine filtered sensor values and communicate these filtered sensor values to a window controller that determines the tint level based on the filtered sensor values. In another example, one or more processors of a window controller may determine the filtered sensor values and corresponding tint level based on sensor readings received from the multi-sensor device.

The operations of the illustrated iterative control logic in FIG. 26 are run at time intervals as timed by a timer at operation 2610. The logic operations can be performed at constant time intervals in some aspects. In one case, the logic operations are done every 2 to 5 minutes. In other cases, it may be desirable to perform the logic operations on a less frequent basis such as every 30 minutes or every 20 minutes such as for tint transition for large pieces of electrochromic lites (e.g. up to 6 feet×10 feet) that can take up to 30 minutes or more to transition.

At operation 2620, the control logic sets a tint level for a zone at a single instant in time $t_i$ based on one or more of a tint level calculated from the clear sky tint schedule data received from the clear sky module(s), a tint level calculated by logic Module C, and a tint level calculated by a tint level calculated by logic Module D. The control logic also performs the calculations to determine these tint levels. An example of calculations used to determine these tint levels is described in detail with respect to FIG. 27. Another example of calculations that can be used to determine tint levels from Modules C and D is described in detail with respect to FIG. 30. These calculations can be performed by one or more processors of a window controller(s) and/or a multi-sensor device. For example, a processor of a multi-sensor device may determine filtered sensor values and communicate these filtered sensor values to a window controller that determines the tint level based on the filtered sensor values. In another example, one or more processors of a window controller may determine the filtered sensor values and corresponding tint level based on sensor readings received from the multi-sensor device.

In certain implementations, the control logic implemented by the window control system is predictive logic that calculates how the tintable window should transition in advance of the actual transition. In these cases, the determined tint levels are based on a future time e.g., around or after transition is complete. For example, the future time used in the calculations may be a time in the future that is sufficient to allow the transition to be completed after receiving the tint instructions. In these cases, the window controller can send tint instructions in the present time in advance of the actual transition. By the completion of the transition, the tintable window will have transitioned to a tint level that is desired for that future time.

Module C and Module D each determine a cloud cover condition and a tint level based on the determined cloud cover condition. The operations of Module C determine a cloud cover condition based on raw photosensor readings or a filtered photosensor value and determine a tint level based on the determined cloud cover condition. The photosensor readings/value can be sent directly to Module C as input. Alternatively, Module C can query a database for the photosensor readings/value. The photosensor readings are measurements taken by the plurality of photosensor(s), for example, of a multi-sensor device. In one aspect, the processor uses the logic of Module C to determine the cloud cover condition by comparing the photosensor readings/value with a threshold value. In one implementation, Module C can also calculate a filtered photosensor value using the raw photosensor readings. Generally the operations of Module C determine a tint level that is the same or is lighter than the tint level in the clear sky tint schedule data from the clear sky model(s).

In certain implementations, the logic of Module D uses filtered infrared (IR) sensor values (e.g., rolling average or median values of readings) to determine a tint level for a zone of one or more electrochromic windows in a building. Module D includes logic to calculate the filtered IR sensor values based on sky temperature readings ($T_{sky}$) and ambient temperature readings from local sensors ($T_{amb}$) or from weather feed ($T_{weather}$), and/or a difference, delta (Δ), between sky temperature readings and ambient temperature readings. The raw sensor readings are input directly to Module D or retrieved from a database in response to a database query. The ambient temperature readings are measurements taken by local ambient temperature sensors, $T_{amb}$, or ambient temperature readings from weather feed, $T_{weather}$. The sky temperature readings are generally taken by one or more infrared sensors. The ambient temperature readings may be received from various sources. For example, the ambient temperature readings may be communicated from one or more ambient temperature sensors located onboard an infrared sensor and/or a standalone temperature sensor of, for example, a multi-sensor device at the building. As another example, the ambient temperature readings may be received from weather feed. Generally the operations of Module D determine a tint level that is darker or the same as the tint level determined by Module C. In other implementations, the logic of Module D uses raw infrared (IR) sensor values to determine a tint level for a zone of one or more electrochromic windows in a building.

Returning to FIG. 26, at operation 2630, the control logic determines whether there is an override to allow for various types of overrides to disengage the logic. If there is an override, the control logic sets the final tint level for the zone to an override value at operation 2640. For example, the override may be input by a current occupant of the space that would like to override the control system and set the tint level. Another example an override is a high demand (or peak load) override, which is associated with a requirement of a utility that energy consumption in the building be reduced. For example, on particularly hot days in large metropolitan areas, it may be necessary to reduce energy consumption throughout the municipality in order to not overly tax the municipality's energy generation and delivery systems. In such cases, the building management may override the tint level from the control logic to ensure that all tintable windows have a high tint level. This override may override a user's manual override. There may be levels of priority in the override values.

At operation 2650, the control logic determines whether a tint level for each zone of the building being determined has been determined. If not, the control logic iterates to determine a final tint level for the next zone. If the tint state for the final zone being determined is complete, the control signals for implementing the tint level for each zone are transmitted over a network to the power supply in electrical communication with the device(s) of the tintable windows of the zone to transition to the final tint level at operation 2660 and the control logic iterates for the next time interval returning to operation 2610. For example, the tint level may be transmitted over a network to the power supply in electrical communication with electrochromic device(s) of the one or more electrochromic windows to transition the windows to the tint level. In certain embodiments, the transmission of tint level to the windows of a building may be implemented with efficiency in mind. For example, if the recalculation of the tint level suggests that no change in tint from the current tint level is required, then there is no transmission of instructions with an updated tint level. As another example, the control logic may recalculate tint levels for zones with smaller windows more frequently than for zones with larger windows.

In one case, the control logic in FIG. 26 implements a control method for controlling the tint level of all the electrochromic windows of an entire building on a single device, for example, on a single master window controller. This device can perform the calculations for each and every electrochromic window in the building and also provide an interface for transmitting tint levels to the electrochromic devices in individual electrochromic windows.

FIG. 26 includes flowchart 2600 depicting control logic for making tint decisions for a zone at a single instant in time $t_i$ based on input from the clear sky tint schedule information from the clear sky model(s), Module C, and Module D, according to an implementation. At operation 2610, the clear sky tint level for the zone is determined based on the clear sky schedule data output from the clear sky models. For example, the clear sky tint schedule data may include the clear sky tint states for different time intervals and the control logic determines the clear sky tint state for the zone at time $t_i$. The clear sky tint schedule data may include clear sky tint states for different time intervals over a day based on different conditions (e.g., glare condition, reflection condition, passive heat condition), and/or priority data. For example, the clear sky tint schedule data may be in the form of clear sky tint states over different time intervals based on tint levels associated with different conditions as constrained by priority data such as shown by the priority constrained curve shown in the graph in FIG. 12. In this example, the logic determines a tint state based on the priority constrained curve at time $t_i$. At operation 2620, the control logic uses logic Module C to determine a tint level for the zone. The operations performed by logic module C are described in detail with reference to FIG. 35. At operation 2630, the control logic uses logic Module D to determine a tint level for the zone. The operations performed by logic Module D are described in detail with reference to FIGS. 28, 30, 31, and 32. At operation 2640, the control logic calculates the maximum tint level from Module C and Module D. At operation 2650, the control logic calculates the minimum tint level from the clear sky tint level determined at operation 2610 and the maximum tint level from Module C and D determined at operation 2640.

Figure 30:
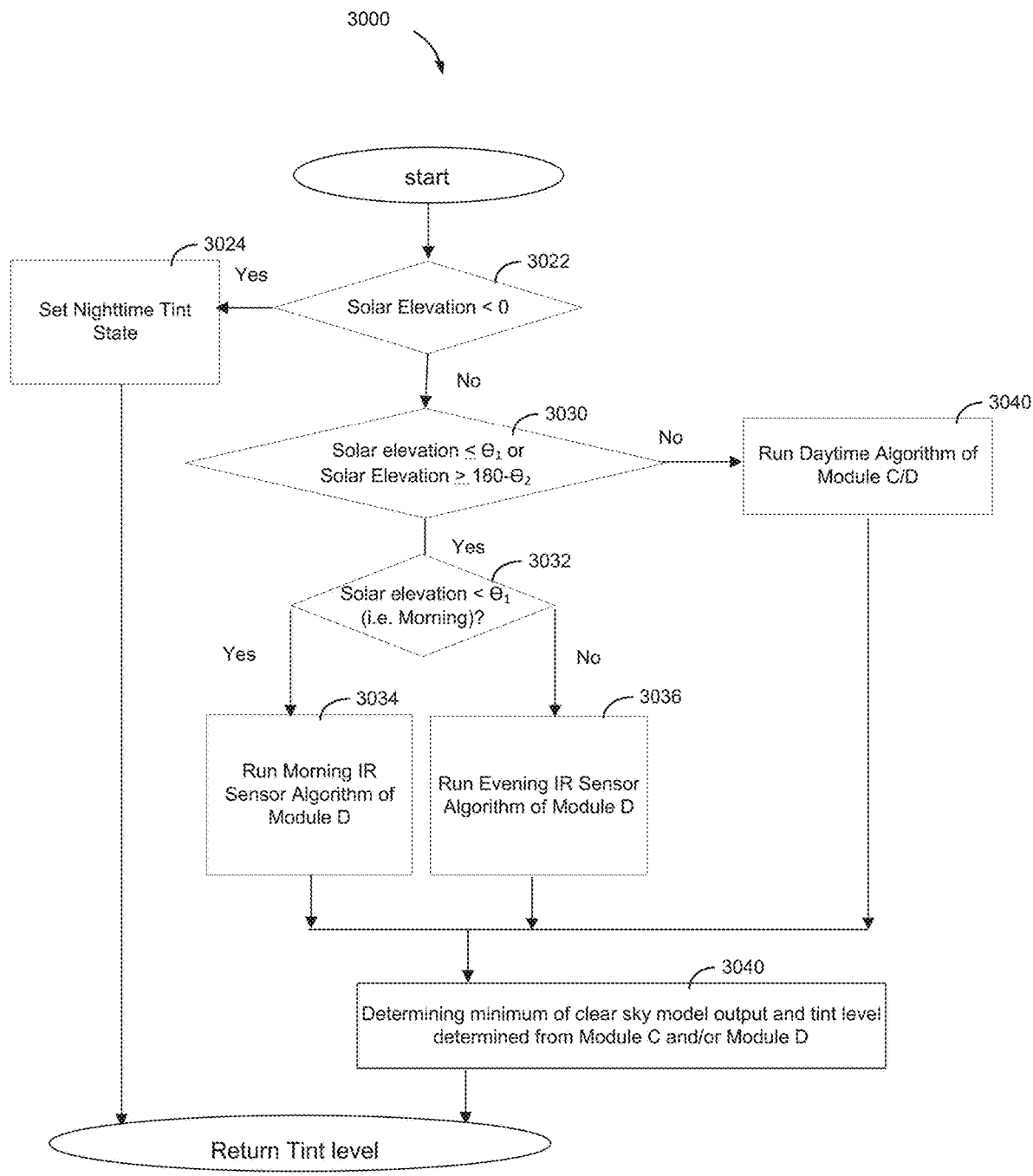
FIG. 30 depicts a flowchart of control logic for making tinting decisions using either infrared sensor and/or photosensor data depending on whether the solar elevation is indicating morning, daytime, or evening regions, according to implementations.

Another example of control logic that can be used to derive tint levels from Module C and Module D is described with respect to FIG. 30.

Also, there may be certain adaptive components of the control logic of embodiments. For example, the control logic may determine how an end user (e.g. occupant) tries to override the algorithm at particular times of day and then makes use of this information in a more predictive manner to determine a desired tint level. For example, the end user may be using a wall switch to override the tint level provided by the control logic at a certain time on each day over a consecutive sequence of days to an override value. The control logic may receive information about these instances and change the control logic to introduce an override value that changes the tint level to the override value from the end user at that time of day.

Examples of Module D

In certain implementations, Module D uses filtered infrared (IR) sensor values (e.g., rolling average or median values of readings) to determine a tint level for a zone of one or more electrochromic windows in a building. Module D includes logic to calculate the filtered IR sensor values using a Cloudy Offset value and sky temperature readings ($T_{sky}$) and ambient temperature readings from local sensors ($T_{amb}$) or from weather feed ($T_{weather}$), and/or a difference, delta (A), between sky temperature readings and ambient temperature readings. The Cloudy Offset value is a temperature offset that corresponds to the threshold values that will be used to determine the cloudy condition by the logic in Module D. The logic of Module D may be performed by the one or more processors of a network controller or a master controller. Alternatively, the logic of Module D may be performed by one or more processors of a multi-sensor device. In one case, the calculated filtered IR sensor values from Module D are saved into an IR sensor measurement database which is stored in memory. In this case, the one or more processors performing the calculations of Module D retrieves the IR sensor values as input from IR sensor measurement database.

Figure 28:
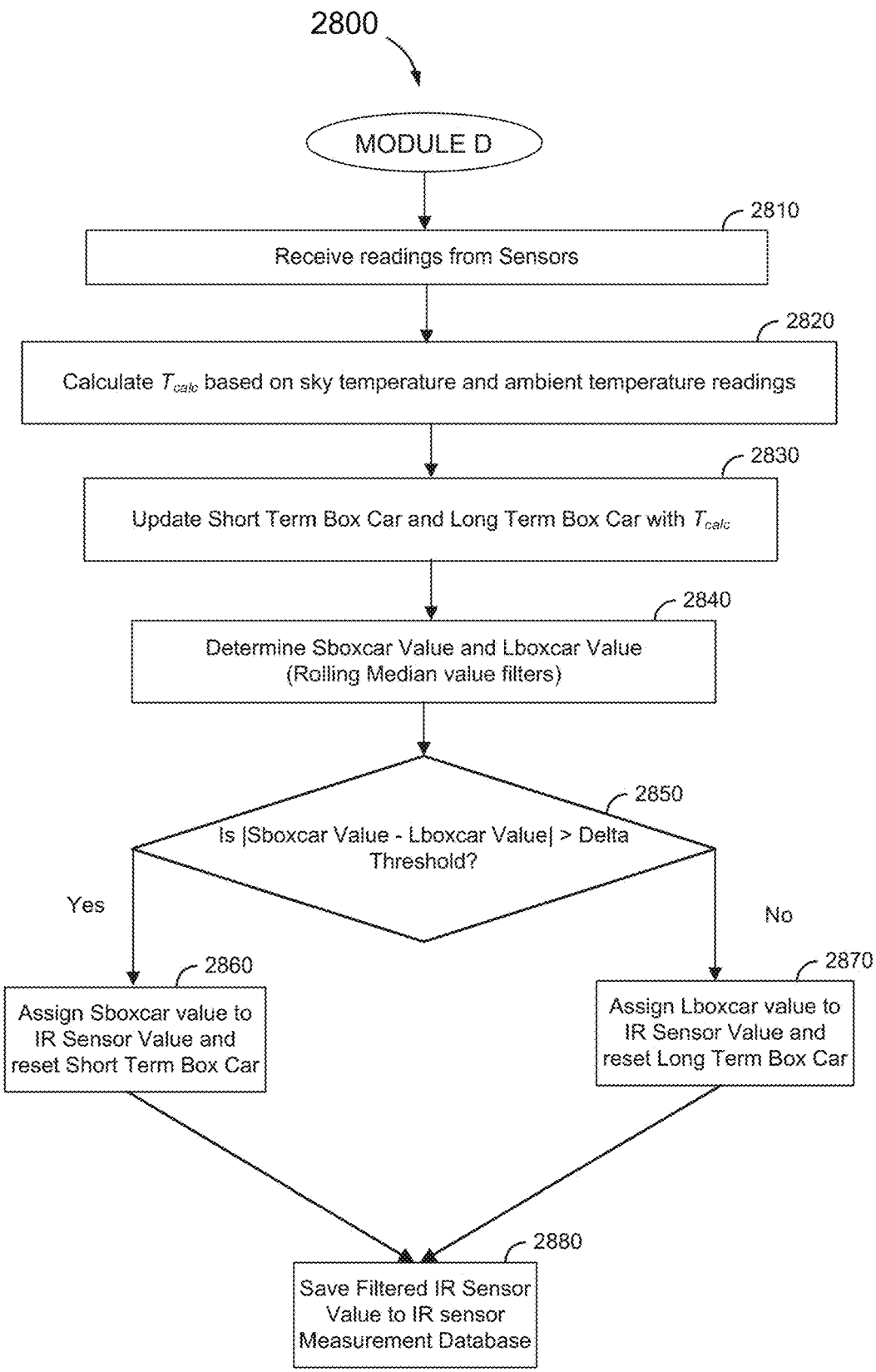
FIG. 28 illustrates a flowchart depicting logic of Module D, according to various implementations.

FIG. 28 illustrates a flowchart 2800 depicting logic of a Module D, according to certain implementations. The logic of Module D may be performed by one or more processors of a local window controller, a network controller, a master controller, or a multi-sensor device. At operation 2810, the processor(s) performing the operations of Module D receives as data associated with a current time. The sensor readings may be received via a communication network at the building, for example, from a rooftop multi-sensor device. The received sensor readings include sky temperature readings ($T_{sky}$) and ambient temperature readings from local sensors at the building ($T_{amb}$) or from weather feed ($T_{weather}$) and/or readings of the difference between $T_{sky}$ and $T_{amb}$ (A). The ambient temperature readings from local sensors at the building ($T_{amb}$) are measurements taken by ambient temperature sensors located either onboard an IR sensor device or separate from the IR sensor device. The ambient temperature sensor readings can alternatively be from weather feed data.

In another implementation, the logic of Module D receives and uses raw sensor readings of measurements taken by two or more IR sensor devices at the building (e.g., of a rooftop multi-sensor device), each IR sensor device having an onboard ambient temperature sensor for measuring ambient temperature ($T_{amb}$) and an onboard infrared sensor directed to the sky for measuring sky temperature ($T_{sky}$) based on infrared radiation received within its field-of-view. Two or more IR sensor devices are typically used to provide redundancy. In one case, each infrared sensor device outputs readings of ambient temperature ($T_{amb}$) and sky temperature ($T_{sky}$). In another case, each infrared sensor device outputs readings of ambient temperature ($T_{am}b$), sky temperature ($T_{sky}$), and the difference between $T_{sky}$ and $T_{amb}$, delta A. In one case, each infrared sensor device outputs readings the difference between $T_{sky}$ and $T_{amb}$, delta A. According to one aspect, the logic of Module D uses raw sensor readings of measurements taken by two IR sensor devices at the building. In another aspect, the logic of Module D uses raw sensor readings of measurements taken by 1-10 IR sensor devices at the building.

In another implementation, the logic of Module D receives and uses raw sky temperature ($T_{sky}$) readings taken by infrared sensors at the building and directed to the sky to received infrared radiation within its field-of-view and ambient temperature readings from weather feed data ($T_{weather}$). The weather feed data is received from one or more weather services and/or other data sources over a communication network. Weather feed data generally includes data associated with weather conditions such as, for example, cloud coverage percentage, visibility data, wind speed data, temperature data, percentage probability of precipitation, and/or humidity. Typically weather feed data is received in a signal through a communication network by a window controller. According to certain aspects, the window controller can send a signal with a request for the weather feed data through a communication interface over the communication network to one or more weather services. The request usually includes at least the longitude and latitude of the location of the window(s) being controlled. In response, the one or more weather services send a signal with weather feed data through the communication network through a communication interface to the window controller. The communication interface and network may be in wired or wireless form. In some cases, a weather service may be accessible through a weather website. An example of a weather website can be found at www.forecast.io. Another example is the National Weather Service (www.weather.gov). The weather feed data may be based on a current time or may be forecasted at a future time. More details regarding logic that uses weather feed data can be found in international application PCT/US16/41344, filed on Jul. 7, 2016 and titled "CONTROL METHOD FOR TINTABLE WINDOWS," which is hereby incorporated by reference in its entirety.

Returning to FIG. 28, at operation 2820, the logic of Module D calculates a temperature value ($T_{calc}$) based on sky temperature readings from one or more infrared sensors, ambient temperature readings from either one or more local ambient temperature sensors or from weather feed, and a Cloudy Offset value. The Cloudy Offset value refers to a temperature offset which determines the first and second threshold values used to make a determination of the cloud condition in Module D. In one example, the Cloudy Offset value is −17 millidegrees Celsius. In one aspect, the Cloudy Offset value of −17 millidegrees Celsius corresponds to a first threshold value of 0 millidegrees Celsius. In another example, the Cloudy Offset value is in the range of −30 millidegrees Celsius to 0 millidegrees Celsius.

In certain implementations, Module D calculates the temperature value ($T_{calc}$) based on sky temperature readings from two or more pairs of thermal sensors. Each pair of thermal sensors having an infrared sensor and an ambient temperature sensor. In one implementation, the thermal sensors of each pair are integral components of an IR sensor device. Each IR sensor device has an onboard infrared sensor and an onboard ambient temperature sensor. Two IR sensor devices are typically used to provide redundancy. In another implementation, the infrared sensor and ambient temperature sensor are separate.

At operation 2820, the logic of Module D calculates the temperature value ($T_{calc}$) using:

$$T_{calc} = \text{minimum } (T_{sky1}, T_{sky2}, ... ) - \text{minimum } (T_{amb1}, T_{amb2}, ... ) - \text{Cloudy Offset} \quad \text{(Eqn. 1)}$$

where $T_{sky1}, T_{sky2}, \ldots$ are temperature readings taken by the multiple infrared sensors and $T_{amb1}, T_{amb2}, \ldots$ are temperature readings taken the multiple ambient temperature sensors. If two infrared sensors and two ambient temperature sensors are used, $T_{calc}$=minimum ($T_{sky1}$, $T_{sky2}$)—minimum ($T_{amb1}$, $T_{amb2}$)—Cloudy Offset. Minimums of the readings from multiple sensors of the same type are used to bias the result toward lower temperature values that would indicate lower cloud cover and result in higher tint level in order to bias the result toward avoiding glare.

In another implementation, the logic of Module D may switch from using a local ambient temperature sensor to using weather feed data when ambient temperature sensor readings become unavailable or inaccurate, for example, where an ambient temperature sensor is reading heat radiating from a local source such as from a rooftop. In this implementation, the temperature value ($T_{calc}$) is calculated based on sky temperature readings and ambient temperature readings from weather feed data ($T_{weather}$). In this implementation, the temperature value is calculated as:

$$T_{calc} = \text{minimum } (T_{sky1}, T_{sky2}, ... ) - T_{weather} - \text{Cloudy Offset} \quad \text{(Eqn. 2)}$$

In another implementation, the temperature value ($T_{calc}$) is calculated based on readings of the difference, Δ, between sky temperature and ambient temperature as measured by two or more IR sensor devices, each having an onboard infrared sensor measuring and ambient temperature sensor. In this implementation, the temperature value is calculated as:

$$T_{calc} = \text{minimum } (\Delta_1, \Delta_2, ... ) - \text{Cloudy Offset} \quad \text{(Eqn. 3)}$$

where $\Delta_1, \Delta_2, \ldots$ are readings of the difference, Δ, between sky temperature and ambient temperature measured by multiple IR sensor devices.

In implementations that use Eqn. 1 and Eqn. 3, the control logic uses the difference between the sky temperature and the ambient temperature to determine the IR sensor value input to determine a cloud condition. Ambient temperature readings tend to fluctuate less than sky temperature readings. By using the difference between sky temperature and ambient temperature as input to determine tint state, the tint states determined over time may fluctuate to a lesser degree and provide a more stable tinting of the window.

In another implementation, the control logic calculates Tea based only on sky temperature readings from two or more infrared sensors. In this implementation, the IR sensor value determined by Module D and input into Module D is based on sky temperature readings and not on ambient temperature readings. In this case, Module D determines a cloud condition based on sky temperature readings. Although the above described implementations for determining Tea are based on two or more redundant sensors of each type, it would be understood that the control logic may be implemented with readings from a single sensor.

At operation 2830, the processor updates the short term box car and long term box car with the $T_{calc}$ determined in operation 2820. To update the box cars, the most recent sensor reading is added to the box cars and the oldest sensor reading is dropped out of the box cars.

For Module D and other control logic described herein, filtered sensor values are used as input to making tinting decisions. Module D and other logic described herein determine filtered sensor values using short term and long term box cars (filters). A short box car (e.g., box car that employs sample values taken over 10 minutes, 20 minutes, 5 minutes, etc.) is based on a smaller number of sensor samples (e.g., n=1, 2, 3, . . . 10, etc.) relative to the larger number of sensor samples (e.g., n=10, 20, 30, 40, etc.) in a long box car (e.g., box car that employs sample values taken over 1 hour, 2 hours, etc.). A box car (illumination) value may be based on a mean, average, median or other representative value of the sample values in the box car. In one example, the short box car value is a median value of sensor samples and the long box car value is a median value of sensor samples. Module D typically uses a rolling median value of sensor samples for each of the short box car value and long box car value. In another example, the short box car value is a mean value of sensor samples and the long box car value is a mean value of sensor samples. Module C typically uses filtered photosensor values that are determined from short and/or long box car values based on mean value of sensor samples.

Since a short box car value is based on a smaller number of sensor samples, short box car values more closely follow the current sensor readings than long box car values. Thus, short box car values respond to rapidly changing conditions more quickly and to a greater degree than the long box car values. Although both the calculated short and long box car values lag behind the sensor readings, short box car values will lag behind to a lesser extent than the long box car values. Short box car values tend to react more quickly than long box car values to current conditions. A long box car can be used to smooth the response of the window controller to frequent short duration weather fluctuations like a passing cloud, while a short box car does not smooth as well but responds more quickly to rapid and significant weather changes like overcast conditions. In the case of a passing cloud condition, control logic using only a long box car value will not react quickly to the current passing cloud condition. In this case, the long box car value can be used in tinting decisions to determine an appropriate high tint level. In the case of a fog burning off condition, it may be more appropriate to use a short term box car value in tinting decisions. In this case, the short term box car reacts more quickly to a new sunny condition after the fog burns off. By using the short term box car value to make tinting decisions, the tintable window can quickly adjust to the sunny condition and keeps the occupant comfortable as the fog rapidly burns off.

At operation 2840, the processor determines a short box car value (Sboxcar value) and the long box car value (Lboxcar value) based on the current sensor readings in the box cars updated at operation 2830. In this example, each box car value is calculated by taking the median value of the sensor readings in the box car after the last update made at operation 2830. In another implementation, each box car value is calculated by taking the mean value of the current sensor readings in each box car. In other implementations, other calculations of the sensor readings in each box car may be used.

In certain implementations, control logic described herein evaluates the difference between the short term box car value and the long term box car value to determine which box car value to implement in making decisions. For example, when the absolute value of the difference between the short term box car value and the long term box car value exceeds a threshold value, the short term box car value is used in the calculation. In this case, the short box car value of the sensor readings in the short term is larger by the threshold the value of the long term sensor readings which may indicate a short term fluctuation of a large enough significance, e.g., a large cloud that may suggest transitioning to a lower tint state. If the absolute value of the difference between the short and long box car values does not exceed the threshold value, the long term box car is used. Returning to FIG. 28, at operation 2850, the logic evaluates whether the value of the absolute value of the difference between the Sboxcar value and the Lboxcar value is greater than a delta threshold value (|Sboxcar Value−Lboxcar Value|>Delta Threshold). In some cases, the value of the Delta Threshold is in the range of 0 millidegrees Celsius to 10 millidegrees Celsius. In one case, the value of the Delta Threshold is 0 millidegrees Celsius.

If the absolute value of the difference is above the delta threshold value, the Sboxcar value is assigned to the IR sensor value and the short term box car is reset to empty its values (operation 2860). If the absolute value of the difference is not above the delta threshold value, the Lboxcar value is assigned to the IR sensor value and the long term box car is reset to empty its values (operation 2870). At operation 2880, the filtered IR sensor value is saved to the IR sensor Measurement database.

Implementing Module C and/or Module D Depending on Solar Elevation

In the morning and evening, sunlight levels are low and readings taken by visible light photosensors in, for example, a multi-sensor are low values that might be considered consistent with a cloudy condition. For this reason, visible light photosensor readings taken during the morning and evening might falsely indicate a cloudy condition. In addition, any obstruction from a building or a hill/mountain may also result in a false positive indication for a cloudy condition based on visible light photosensor readings taken alone. Moreover, visible light photosensor readings taken before sunrise may result in a false positive cloudy condition if taken alone. Where control logic is predictive in determining a tint level at sunrise in advance based on visible light photosensor readings alone taken just before sunrise, a false positive cloudy condition might lead to transitioning an electrochromic window to a clear state at sunrise allowing glare in the room.

Figure 29:
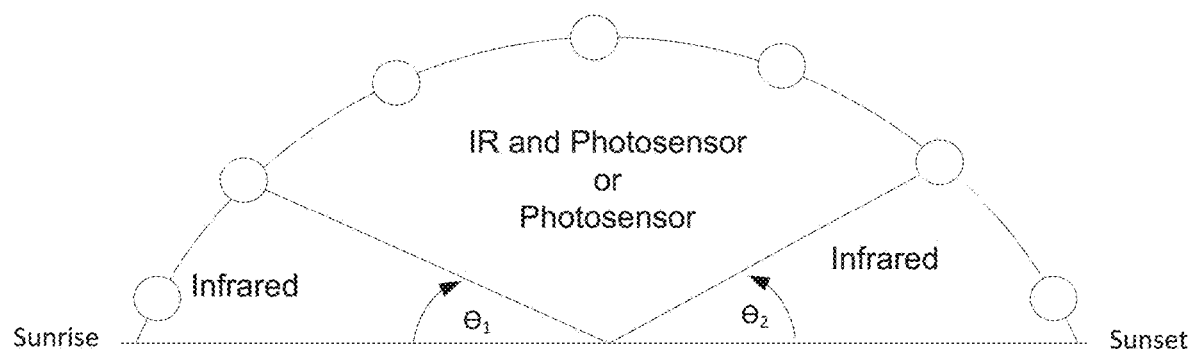
FIG. 29 shows a schematic illustration depicting the sun at different solar elevations from sunrise to sunset, according to various implementations.

FIG. 29 shows a schematic illustration depicting the sun at different solar elevations from sunrise to sunset. The illustration shows that when the solar elevation is greater than 0 degrees (sunrise) and less than $\theta_1$ (where $\theta_1$ is about 5 degrees, about 7 degrees, about 10 degrees, about 12 degrees, or in a range of 10-15 degrees) i.e. in the morning region or the solar elevation is less than about $\theta_2$ (where $\theta_2$ is about 5 degrees, about 7 degrees, about 10 degrees, about 12 degrees, in a range of 10-15 degrees) from 180 degrees (sunset), then infrared sensor readings values should be used to determine a cloudy condition, e.g., by implementing Module D. The illustration also shows that when the solar elevation is greater than $\theta_1$ and more than $\theta_2$ from 180 degrees, then it is in the daytime regime and the infrared and photosensor readings or photosensor readings should be used to determine a cloudy condition, e.g., using Module C/D.

FIG. 30 depicts a flowchart 3000 with control logic for making tinting decisions using either infrared sensor and/or photosensor data depending on whether the solar elevation is indicating morning, daytime, or evening regions, according to implementations. Depending on the solar elevation, either Module C and/or Module D is implemented. The control logic in FIG. 30 is an example of the logic determined in block 2620 of FIG. 26.

At operation 3022, the control logic determines whether the calculated solar elevation is less than 0 at a single instant in time $t_i$. In one implementation, the control logic also determines the solar elevation based on the sun's position and calculates the sun's position based on the latitude and longitude of the building with the window(s) and the time of day, $t_i$, and the day of the year (date). Publicly-available programs can provide the calculations for determining the sun's position.

If the solar elevation is determined to be less than 0 at operation 3022, it is nighttime and the control logic sets a nighttime tint state at operation 3024. An example of a nighttime tint state is a cleared tint level which is the lowest tint state. A cleared tint level may be used as a nighttime tint state, for example, to provide security by allowing security personnel outside the building to see inside lighted room(s) of the building through the cleared windows. Another example of a nighttime tint state is a highest tint level, which can also provide privacy and/or security by not allowing others to see inside the building at nighttime when the windows are in the darkest tint state. If the solar elevation is determined to be less than 0, the control logic returns the nighttime tint state.

At operation 3030, the control logic determines whether the solar elevation is less than or equal to a lower solar elevation threshold value, $\theta_1$ (e.g., $\theta_1$ is about 5 degrees, about 12 degrees, about 10 degrees, in a range of 10-15 degrees) or greater than or equal to an upper solar elevation threshold value, $\theta_2$ (where $\theta_2$ is about 5 degrees, about 12 degrees, about 10 degrees, in a range of 10-15 degrees) from 180 degrees. If the solar elevation is in this range, the control logic determines that time $t_i$ is in the morning or evening.

If the solar elevation is not in this range, the control logic determines whether the solar elevation is increasing or decreasing at operation 3032. The control logic determines whether the solar elevation is increasing or decreasing by comparing the calculated solar elevation values over time. If the control logic determines that the solar elevation is increasing, it is determined to be morning and the control logic runs a morning IR sensor algorithm implementation of Module D at operation 3034. An example of a morning IR sensor algorithm that can be used is described with respect to the flowchart 3100 in FIG. 31.

If the control logic determines that the solar elevation is not increasing (decreasing) at operation 3032, it is determined to be evening and the control logic runs an evening IR sensor algorithm implementation of Module D at operation 3036. An example of an evening IR sensor algorithm that can be used is described with respect to the flowchart 3200 illustrated in FIG. 32. After running either the morning or evening IR sensor algorithms of Module D to determine a tint level based on Module D, the control logic determines the minimum value of the Module D tint level and the tint level from the clear sky tint schedule output from the clear sky model(s) at operation 3040 and returns the minimum value tint level.

If it is determined at operation 3030 that the solar elevation is greater than the $\theta_1$ and less than 180–$\theta_2$, then it is during the daytime region and the control logic runs a daytime algorithm which implements Module C and/or Module D to determine a tint level based on photosensor and/or infrared sensor readings (operation 3040). The control logic sets the tint level to the minimum value of the Module C/D tint level and the tint level from the clear sky tint schedule output from the clear sky models at operation 3040 and returns the minimum value tint level.

Examples of Morning and Evening IR Sensor Algorithms of Module D

Module D queries an infrared sensor measurements database for a filtered IR sensor value and then determines a cloud condition and associated tint level based on the filtered IR sensor value. If the filtered IR sensor value is below a lower threshold value, it is a "sunny" condition and the tint level from Module D set to the highest tint level. If the filtered IR sensor value is above an upper threshold value, it is a "Cloudy" condition and the tint level from Module D is set to the lowest tint level. If the filtered IR sensor value is less than or equal to the upper threshold value and greater than or equal to the lower threshold value, the tint level from Module D is set to an intermediate tint level. The upper and lower threshold values used in these calculations are based on whether the morning IR sensor algorithm, evening IR sensor algorithm, or daytime algorithm is being implemented.

Figure 34:
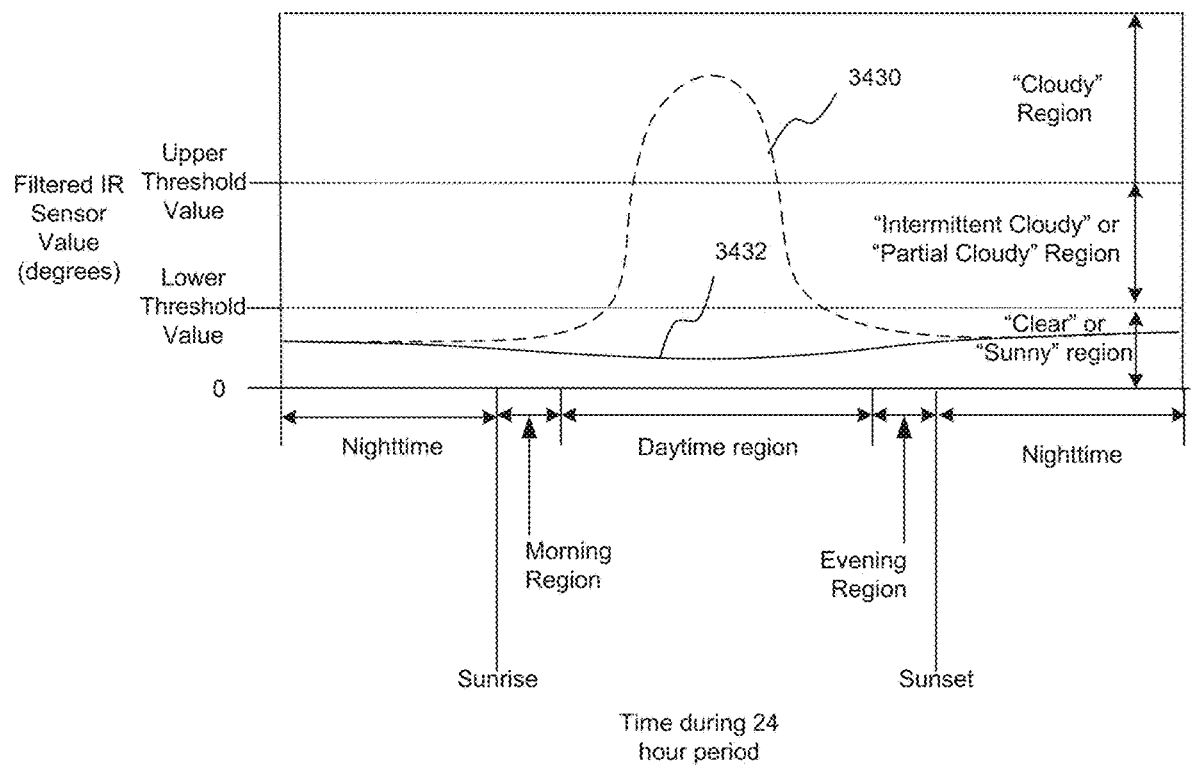
FIG. 34 shows a graph of filtered IR sensor values in millidegrees Celsius vs time during a 24 hour period, according to one implementation.

FIG. 34 shows a graph of filtered IR sensor values in millidegrees Celsius vs time during a 24 hour period. The graph shows three regions of ranges of filtered IR sensor values. The upper region above the upper threshold value is the "Cloudy" region. A filtered IR sensor value above the upper threshold value is in the "Cloudy" region. The mid region between the upper threshold value and the lower threshold value is the "Intermittent Cloudy" or "Partial Cloudy" region. The lower region below the lower threshold value is the "Clear" region also referred to as "Sunny" region. A filtered IR sensor value below the upper threshold value is in the "Clear" or "Sunny" region. The graph has two curves of the calculated filtered IR sensor values based on readings taken over two 24 hour periods. The first curve 3430 shows the calculated filtered IR sensor values taken during a first day with clouds in the afternoon. The second curve 3432 shows the calculated filtered IR sensor values taken during a second day that is sunny/clear all day. The lower threshold value describes the lower boundary between the mid region and the lower region. The upper threshold value describes the upper boundary between the mid region and the upper region. The lower and upper threshold values used during the evening (evening lower threshold value and evening upper threshold value) are typically higher than the lower and upper threshold values used during the morning (morning lower threshold value and morning upper threshold value).

Figure 31:
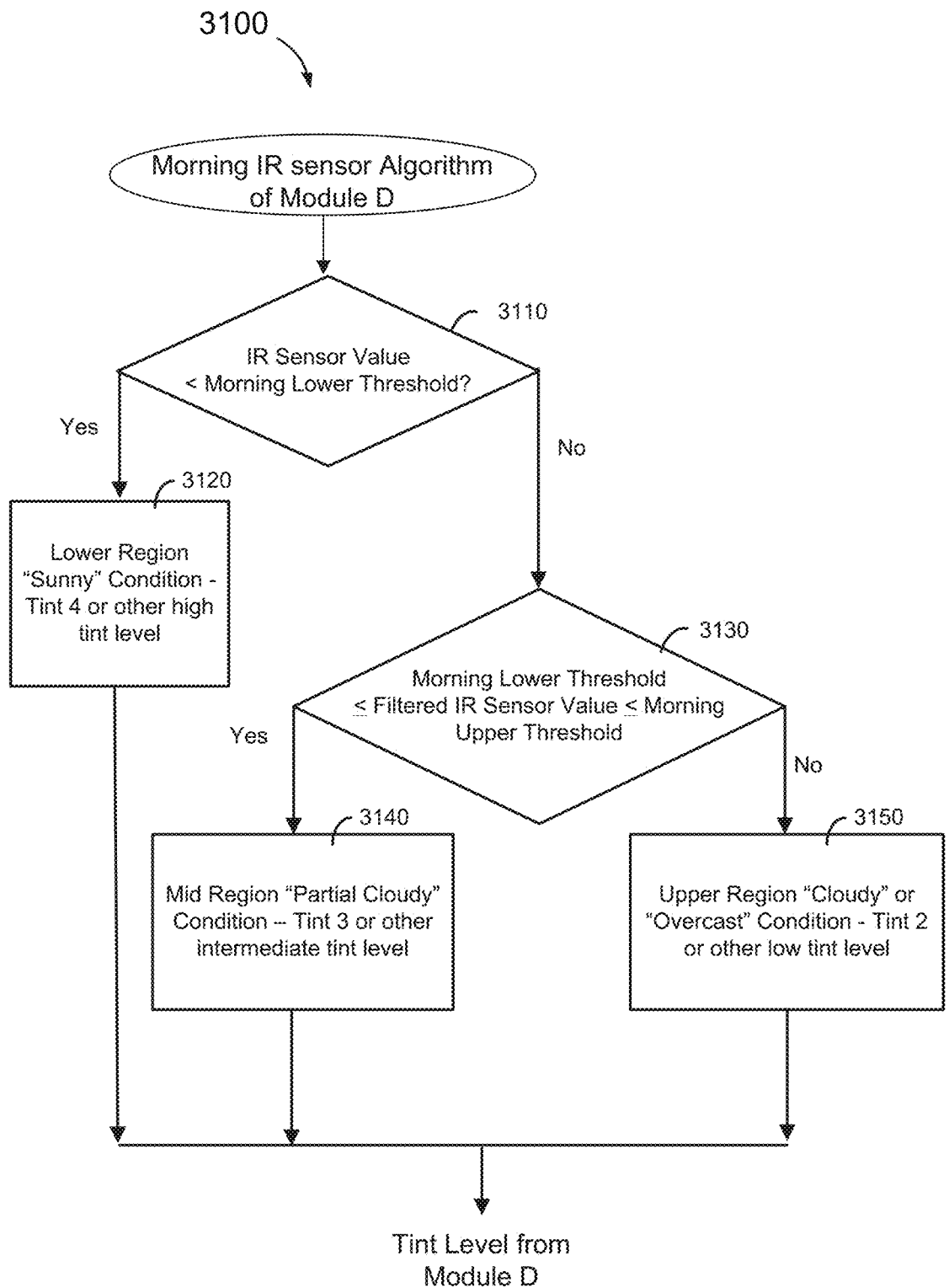
FIG. 31 depicts a flowchart of control logic for a morning IR sensor algorithm of Module D, according to implementations.

FIG. 31 depicts a flowchart 3100 of control logic for a morning IR sensor algorithm of Module D. The morning IR sensor algorithm can be implemented when tinting control logic determines that the current time is during a morning region. The morning IR sensor algorithm is an example of control logic that can be implemented at operation 3134 of the flowchart shown in FIG. 31 when the control logic determines that the solar elevation angle is less than an elevation threshold value and the solar elevation angle is increasing.

The control logic of the flowchart 3100 starts at operation 3110 and the filtered IR sensor value is compared with a Morning Lower threshold value to determine whether the filtered IR sensor value is less than the Morning Lower threshold value. The control logic of Module D queries an infrared sensor measurements database or other database to retrieve the filtered IR sensor value. Alternatively, the control logic calculates the filtered IR sensor value. An example of control logic that can be used to calculate the filtered IR sensor value and store the value to the infrared sensor measurements database is the control logic of Module D described with reference to the flowchart in FIG. 28. The Morning Lower threshold value is the temperature value at the lower boundary of the filtered IR sensor values between the lower region ("Sunny" or "Clear" region) and the mid region ("Partly Cloudy" region) that applies during the morning region. In certain implementations, the Morning Lower threshold value is in the range of about –20 and about 20 millidegrees Celsius. In one example, the Morning Lower threshold value is about 1 degree Celsius.

If it is determined at operation 3110 that the filtered IR sensor value is less than the Morning Lower threshold value, the filtered IR sensor value is in a lower region which is the "Clear" or "Sunny" region. In this case, the control logic sets the tint level from Module D to a high tint state (e.g. tint level 4) and passes the tint level from Module D (operation 3120).

If it is determined at operation 3110 that the filtered IR sensor value is not less than the Morning Lower threshold value, the control logic proceeds to determine whether the filtered IR sensor value is less than or equal to a Morning Upper threshold value and greater than or equal to a Morning Lower threshold value at operation 3130. The Morning Upper threshold is the temperature at the upper boundary of the filtered IR sensor values between the mid region ("Partly Cloudy" region) and the upper region ("Cloudy" region) that applies during the morning region of the day. In certain implementations, the Morning Upper threshold value is in the range of −20 and 20 millidegrees Celsius. In one example, the Morning Upper threshold value is 3 millidegrees Celsius.

If it is determined at operation 3130 that the filtered IR sensor value is less than or equal to the Morning Upper threshold value and greater than or equal to the Morning Lower Threshold Value, the filtered IR sensor value is determined to be in a mid region that is the "Partial Cloudy" region (operation 3140). In this case, the control logic sets the tint level of Module D to an intermediate tint state (e.g. tint level 2 or 3) and the tint level from Module D is passed.

If it is determined at operation 3130 that the filtered IR sensor value is not less than or equal to the Morning Upper threshold value and greater than or equal to the Morning Lower Threshold Value (i.e., the filtered sensor value is greater than the Morning Upper threshold value), the filtered IR sensor value is determined to be in an upper region that is the "Cloudy" or "Overcast" condition (operation 3150). In this case, the control logic sets the tint level of Module D to a low tint state (e.g. tint level 2 or lower tint level) and the tint level from Module D is passed.

Figure 32:
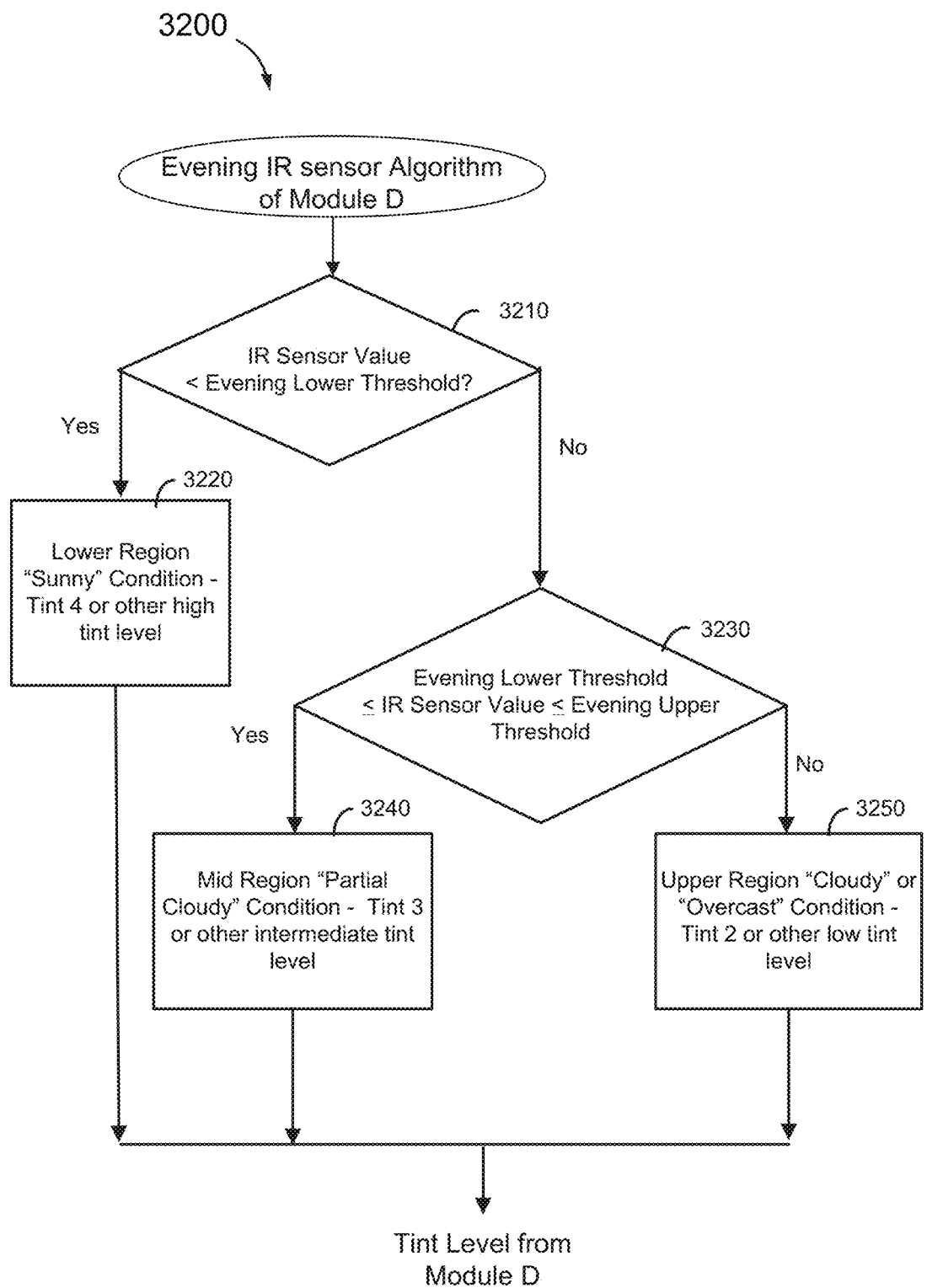
FIG. 32 depicts a flowchart of control logic for an evening IR sensor algorithm of Module D, according to implementations.

FIG. 32 depicts a flowchart 3200 of control logic for of an evening IR sensor algorithm of Module D. The evening IR sensor algorithm can be implemented when tinting control logic determines that the current time is during an evening region. The evening IR sensor algorithm is an example of control logic that can be implemented at operation 3036 of the flowchart shown in FIG. 30 when the control logic determines that the solar elevation angle is less than an elevation threshold value and the solar elevation angle is decreasing.

The control logic of the flowchart 3200 starts at operation 3210 and the filtered IR sensor value is compared with an Evening lower threshold value to determine whether the filtered IR sensor value is less than the Evening Lower threshold value. The control logic of Module D queries an infrared sensor measurements database or other database to retrieve the filtered IR sensor value. Alternatively, the control logic calculates the filtered IR sensor value. An example of control logic that can be used to calculate the filtered IR sensor value and store the value to the infrared sensor measurements database is the control logic of Module D described with reference to the flowchart in FIG. 28. The Evening Lower threshold value is the temperature value at the lower boundary of the filtered IR sensor values between the lower region ("Sunny" or "Clear" region) and the mid region ("Partly Cloudy" region) that applies during the evening region. In certain implementations, the Evening Lower threshold value is in the range of −20 and 20 millidegrees Celsius. In one implementation, the Evening Lower threshold value is 2 millidegrees Celsius.

If it is determined at operation 3210 that the filtered IR sensor value is less than the Evening Lower threshold value, the control logic determines the filtered IR sensor value is in a lower region which is the "Clear" or "Sunny" region. In this case, the control logic sets the tint level from Module D to a high tint state (e.g. tint level 4) at operation 3220 and passes the tint level from Module D.

If it is determined at operation 3210 that the filtered IR sensor value is not less than the Evening Lower threshold value, the control logic proceeds to determine whether the filtered IR sensor value is less than or equal to an Evening Upper threshold value and greater than or equal to an Evening Lower threshold value at operation 3230. The Evening Upper threshold is the temperature at the upper boundary of the filtered IR sensor values between the mid region ("Partly Cloudy" region) and the upper region ("Cloudy" region) that applies during the evening region of the day. In certain implementations, the Evening Upper threshold value is in the range of −20 and 20 millidegrees Celsius. In one example, the Evening Upper threshold value is 5 millidegrees Celsius.

If it is determined at operation 3230 that the filtered IR sensor value is less than or equal to the Evening Upper threshold value and greater than or equal to the Evening Lower Threshold Value, the filtered IR sensor value is determined to be in a mid region that is the "Partial Cloudy" region (operation 3240). In this case, the control logic sets the tint level of Module D to an intermediate tint state (e.g. tint level 2 or 3) and the tint level from Module D is passed.

If it is determined at operation 3230 that the filtered IR sensor value is not less than or equal to the Evening Upper threshold value and greater than or equal to the Evening Lower Threshold Value (i.e., the filtered sensor value is greater than the Evening Upper threshold value), the filtered IR sensor value is determined to be in an upper region that is the "Cloudy" (operation 3250). In this case, the control logic sets the tint level of Module D to a low tint state (e.g. tint level 2 or lower tint level) and this tint level from Module D is passed.

Example of Daytime Algorithm of Module C and/or Module D

During the daytime, temperature readings taken by an infrared sensor can tend to fluctuate if the local area around the infrared sensor is heated up. For example, an infrared sensor located on a rooftop may be heated by the rooftop as it absorbs heat from the midday sun. In certain implementations, a daytime algorithm disables the use of IR sensor readings in its tinting decisions under certain circumstances and uses Module C to determine tint level from photosensor readings alone. In other circumstances, the daytime algorithm determines a first tint level based on IR sensor readings using Module D, determines a second tint level based on photosensor readings using Module C, and then sets the tint level to the maximum of the first and second tint levels.

Figure 33:
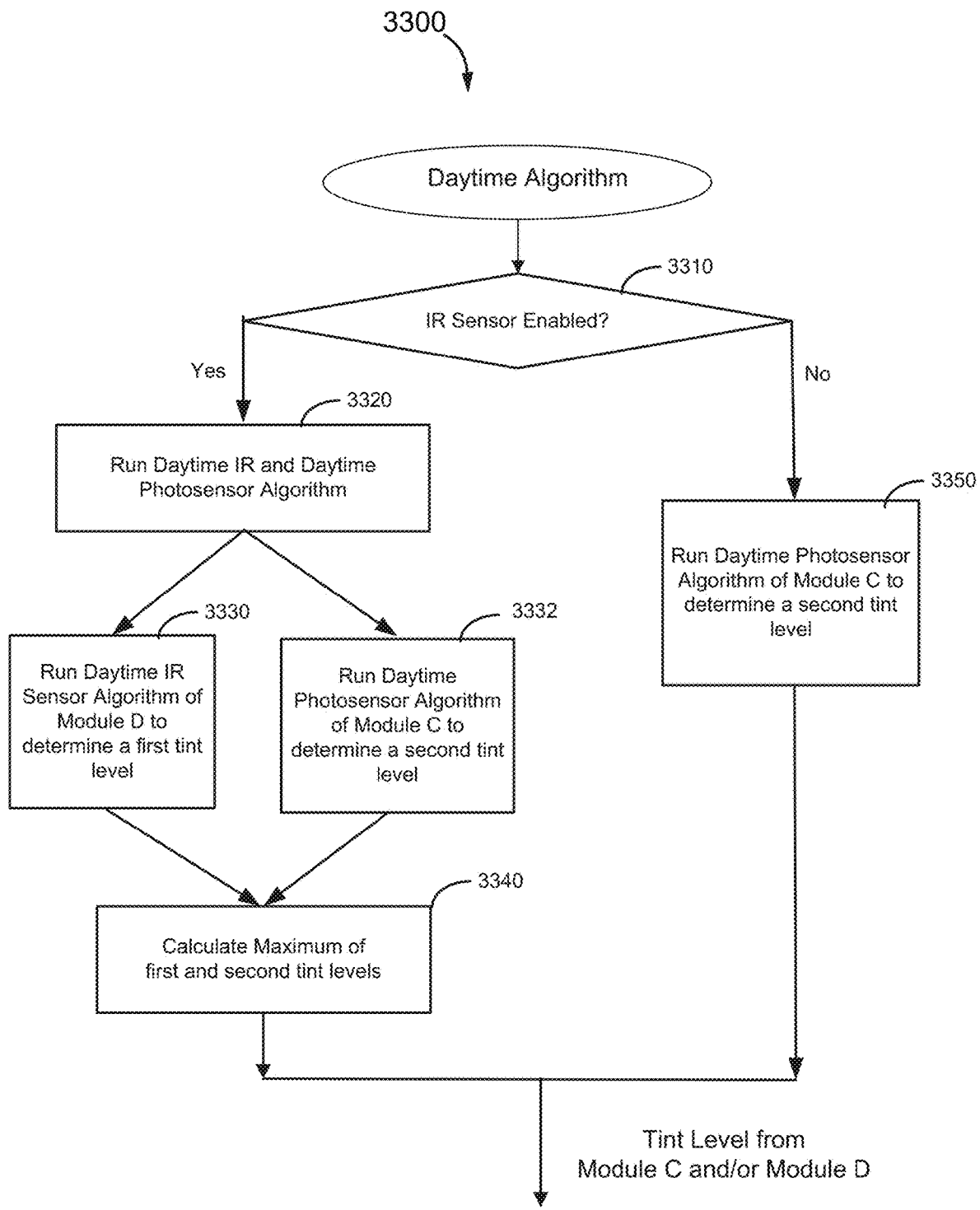
FIG. 33 depicts a flowchart of control logic for a daytime algorithm that can implement a daytime IR sensor algorithm of Module C and/or a daytime photosensor algorithm of Module D, according to implementations.

FIG. 33 illustrates a flowchart 3300 depicting control logic of a daytime algorithm that can implement a daytime IR sensor algorithm of Module C and/or a daytime photosensor algorithm of Module D. The daytime algorithm is used when tinting control logic determines that the current time is during a daytime region. The daytime algorithm is an example of control logic that can be implemented at operation 3040 of the flowchart shown in FIG. 30 when the solar elevation angle is greater than or equal to 0 and less than or equal to the elevation threshold.

At operation 3310, it is determined whether using IR sensor readings is enabled. In one case, the default setting for tinting control logic is to disable using the IR sensor readings unless photosensor readings are unavailable, for example, due to malfunctioning photosensors. In another case, the control logic disables using the IR sensor readings if the IR sensor data is not available, for example, due to malfunctioning IR sensors.

If it is determined at operation 3310 that the using IR sensor readings is enabled, the control logic runs both the daytime IR sensor algorithm of Module D and the daytime photosensor algorithm of Module C (operation 3320). In this case, the control logic proceeds to both operation 3330 and operation 3332. If it is determined at operation 3310 that the using IR sensor readings is not enabled, the control logic runs the daytime photosensor algorithm of Module C (operation 3350).

At operation 3330, the logic of a daytime IR sensor algorithm of Module D is run to determine a first tint state. A filtered IR sensor value is retrieved from an infrared sensor measurements database or other database. Alternatively, the logic of the daytime IR sensor algorithm calculates the filtered IR sensor value. An example of logic that can be used to calculate the filtered IR sensor value and store the value to the infrared sensor measurements database is the control logic of Module D described with reference to the flowchart in FIG. 28. The logic of the daytime IR sensor algorithm compares the filtered IR sensor value with a daytime lower threshold to determine whether the filtered IR sensor value is less than the Daytime Lower threshold, greater than the Daytime Upper threshold, or between the Daytime Lower and Upper thresholds. The Daytime Lower threshold is the temperature at the lower boundary of the filtered IR sensor values between the lower region ("Sunny" or "Clear" region) and the mid region ("Partly Cloudy" region) that applies during the daytime region. In certain implementations, the Daytime Lower threshold value is in the range of −20 and 20 millidegrees Celsius. In one example, the Daytime Lower threshold value is −1 millidegrees Celsius. The Daytime Upper threshold value is the temperature value at the upper boundary of the filtered IR sensor values between the mid region ("Partly Cloudy" region) and the upper region ("Cloudy" region) that applies during the evening region of the day. In certain implementations, the Daytime Upper threshold is in the range of −20 and 20 millidegrees Celsius. In one example, the Daytime Upper threshold is 5 millidegrees Celsius. If it is determined that the filtered IR sensor value is less than the Daytime Lower threshold value, the filtered IR sensor value is in a lower region which is the "Clear" or "Sunny" region. In this case, the control logic sets the first tint level from Module D to a high tint state (e.g. tint level 4). If it is determined that the filtered IR sensor value is less than or equal to a Daytime Upper threshold value and greater than or equal to an Upper Daytime threshold value, the filtered IR sensor value is determined to be in a mid region that is the "Partial Cloudy" region. In this case, the control logic sets the first tint level to an intermediate tint state (e.g. tint level 2 or 3). If it is determined that the filtered IR sensor value is not less than or equal to the Daytime Upper threshold value and greater than or equal to the Daytime Lower Threshold Value (i.e., the filtered sensor value is greater than the Daytime Upper threshold value), the filtered IR sensor value is determined to be in an upper region that is the "Cloudy" region. In this case, the control logic sets the first tint level of Module D to a low tint state (e.g. tint level 2 or lower tint level).

At operation 3332, the logic of a daytime photosensor sensor algorithm of Module C is run to determine a second tint level. Module C determines the second tint level based on real-time irradiance using photosensor readings. An example of control logic of Module C that can be used to determine the second tint level is described with respect to a flowchart 3500 shown in FIG. 35 in the section below.

At operation 3340, the logic of the daytime algorithm calculates the maximum of the first tint level using Module D based on IR sensor readings determined at operation 3330 and the second tint level using Module C based on photosensor readings determined at operation 3332. The tint level from the daytime algorithm is set to the maximum of the calculated first tint level and the calculated second tint level and the. The tint level from Module C or D is returned.

If it is determined at operation 3310 that the using IR sensor readings is not enabled, the control logic runs the daytime photosensor algorithm of Module C (operation 3350). At operation 3350, the logic of the daytime photosensor sensor algorithm of Module C is run to determine the second tint level. In this case, the tint state from the daytime algorithm is set to second tint level based on photosensor readings and this tint level from Module C is returned. An example of control logic of Module C that can be used to determine the second tint level is described with respect to the flowchart shown in FIG. 35.

Examples of Module C and Module C'

Figure 35:
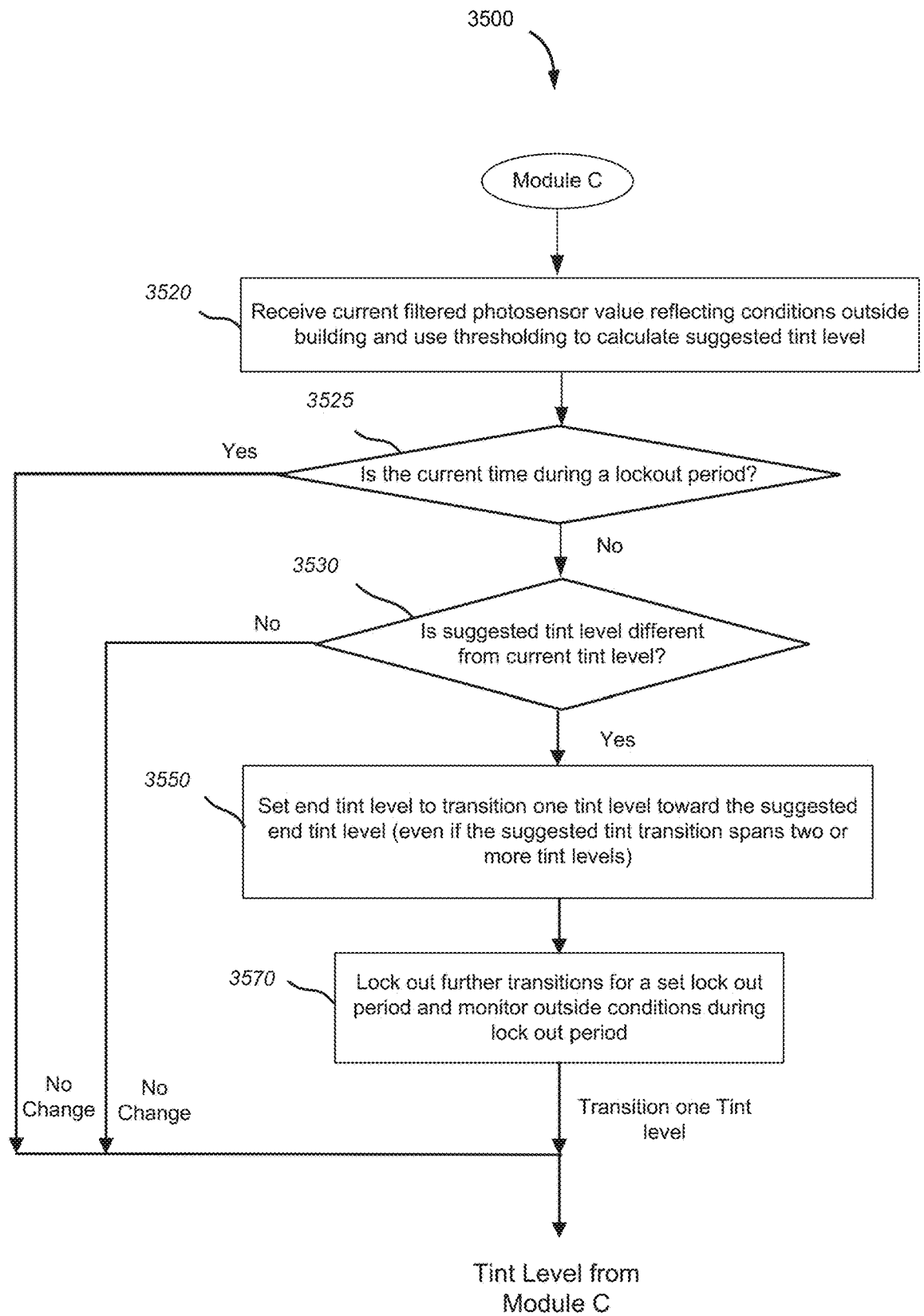
FIG. 35 is a flowchart depicting control logic for an example of Module C for determining a tint level for the one or more electrochromic windows.

FIG. 35 depicts a flowchart 3500 of control logic for an example of a Module C for determining a tint level for the one or more electrochromic windows. At operation 3520, a current filtered photosensor value is received reflecting conditions outside the building and thresholding is implemented to calculate a suggested tint level to apply. In one example, the current filtered photosensor value is a maximum value of measurements taken by a plurality of photsensors (e.g., thirteen (13) photosensors of a multi-sensor device) at one sample time. In another example, the filtered photosensor value is a rolling mean or median of multiple photosensor readings taken at different sample times, where each reading is the maximum reading of all readings taken by a plurality of photsensors at a sample time. In another example, the filtered photosensor value is a rolling mean or median of multiple photosensor readings taken at different sample times by a single photosensor. An example of control logic that can be used to calculate a current filtered photosensor value is described in a flowchart 3600 in FIG. 36 which depicts control logic of a Module C. The logic of Module C may be performed by one or more processors of a local window controller, a network controller, a master controller, and/or a multi-sensor device.

At operation 3520, the control logic uses thresholding to calculate the suggested tint level by determining whether the current filtered photosensor value has crossed one or more thresholds over a period of time. The period of time may be, for example, the time period between the current time and the last sample time taken by the photosensors or between the current time and the first of multiple sample readings previously taken. Photosensor readings may be taken on a periodic basis such as once a minute, once every 10 seconds, once every 10 minutes, etc.

In one implementation, thresholding involves using two threshold values: a lower photosensor threshold value and an upper photosensor threshold value. If it is determined that the photosensor value is higher than the upper photosensor threshold value, the photosensor value is in a higher region which is the "Clear" or "Sunny" region. In this case, the control logic determines the suggested tint level from Module C is a high tint state (e.g. tint level 4). If it is determined that the photosensor value is less than or equal to the Upper photosensor threshold value and greater than or equal to the Lower photosensor Threshold Value, the photosensor value is determined to be in a mid region that is the "Partial Cloudy" region. In this case, the control logic determines the suggested tint level from Module C is an intermediate tint state (e.g. tint level 2 or 3). If it is determined that the photosensor sensor value is greater than the Evening Upper threshold value, the photo sensor value is determined to be in an upper region that is the "Cloudy" region. In this case, the control logic determines the suggested tint level from Module C to a low tint state (e.g. tint level 2 or lower tint level).

If the current time $t_i$ is the instant in time after the lockout period has ended, the control logic calculates the suggested tint level at operation 3520 based on the conditions monitored during the lockout period. The suggested tint level calculated based on the conditions monitored during the lockout period is based on a statistical evaluation of the monitored input. Various techniques can be used for the statistical evaluation of the input monitored during the wait time. One example is tint level averaging during the wait time. During the wait time, the control logic implements an operation that monitors the input and calculates tint levels determined. The operation then averages the determined tint levels over the wait time to determine which direction is suggested for a one tint region transition.

At operation 3525, the control logic determines whether the current time is during a lockout period. If the current time is during a lockout period, Module C does not change the tint level. During the lockout period, photosensor values of outside conditions are monitored. In addition, the control logic monitors the suggested tint levels determined by operation 3520 during the lockout period. If the current time is determined to not be during a lockout period, the control logic proceeds to operation 3530.

At operation 3530, the logic goes on to determine whether the current information suggests a tint transition. This operation 3530 compares the suggested tint level determined in operation 3520 with the current tint level applied to the one or more windows to determine whether the tint levels are different. If the suggested tint level is not different from the current tint level, the tint level is not changed.

At operation 3550, if the suggested tint level is different from the current tint level, the logic sets a new tint level that is one tint level toward the suggested tint level determined in operation 3520 (even if the suggested tint level is two or more tint levels from the current tint level). For example, if the suggested tint region determined in operation 3520 is from a first tint level to a third tint level, the tint level returned by Module C is to transition one tint level to a second tint level.

At operation 3570, a lock out period is set to lock out from transitions to other tint levels during the lockout period. During the lockout period, photosensor values of outside conditions are monitored. In addition, the control logic calculates a suggested tint region during intervals based on the conditions monitored during the lockout period. The new tint level passed from Module C is determined at operation 3550 as one tint level toward the suggested tint level determined in operation 3520.

Figure 36:
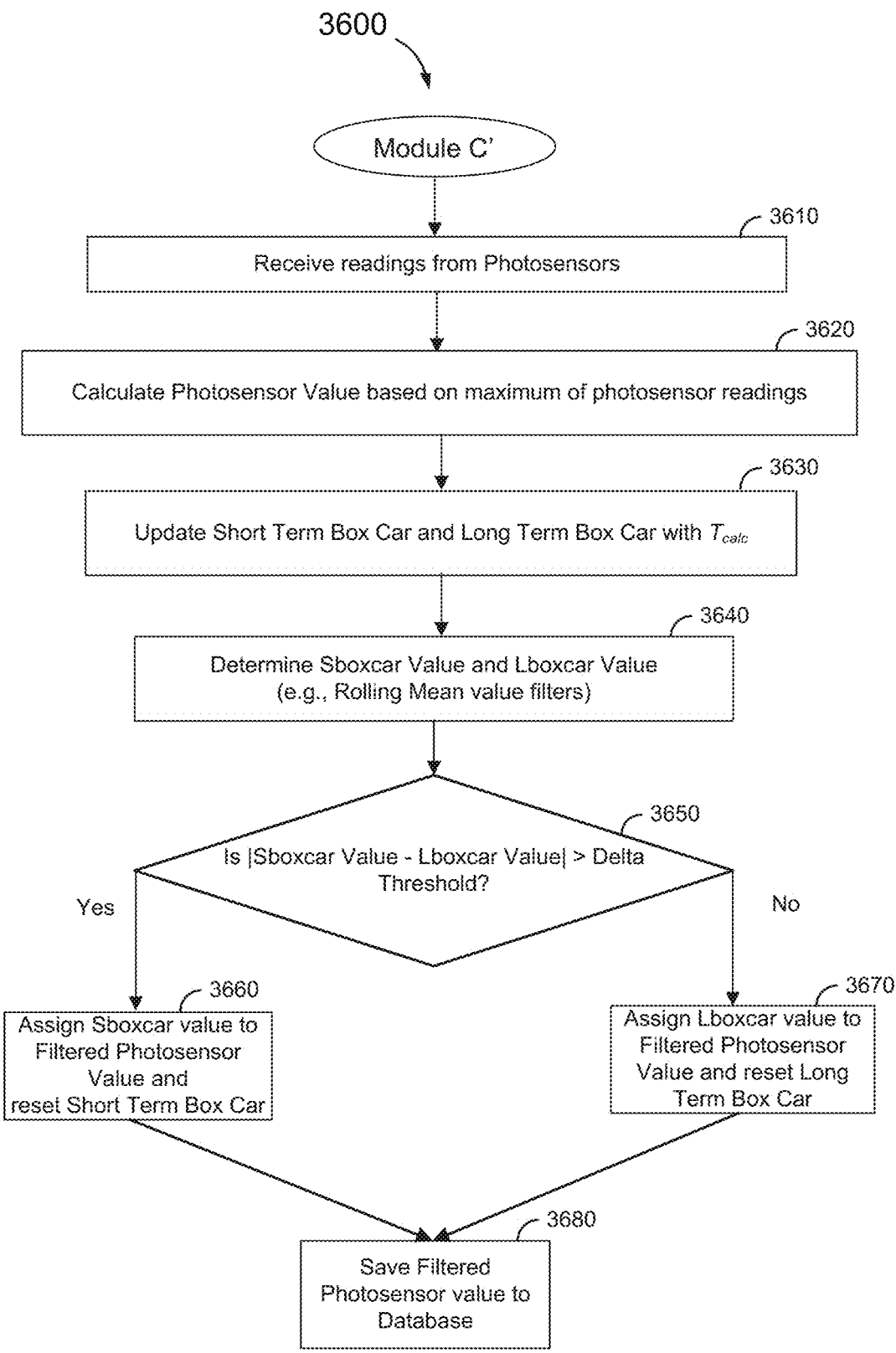
FIG. 36 depicts a flowchart of control logic for another example of a Module C for determining a tint level for the one or more electrochromic windows.

FIG. 36 illustrates a flowchart 3600 depicting logic of a Module C' that can be used to determine a filtered photosensor value and save the filtered photosensor value to a database, according to one implementation. The filtered photosensor value can then be retrieved by the Module C depicted in FIG. 35 at operation 3520. In one aspect, Module C includes the logic depicted in FIG. 35 and further includes the logic of Module C' and performs its operations prior to operation 3520 in FIG. 35.

The logic of Module C1' may be performed by one or more processors of a local window controller, a network controller, a master controller, and/or a multi-sensor device. At operation 3110, the processor(s) performing the operations of Module C1' receives as input photosensor readings at a current time. The photosensor readings may be received via a communication network at the building, for example, from a rooftop multi-sensor device. The received photosensor readings are real-time irradiance readings.

At operation 3610, the processor(s) performing the logic operations of Module C' receives as input raw photosensor readings at a current time. The photosensor readings may be received via a communication network at the building, for example, from a rooftop multi-sensor device. The received photosensor readings are real-time irradiance readings.

At operation 3620, processor(s) performing the logic operations of Module C' calculates a photosensor value based on raw measurements taken by two or more photosensors. For example, the photosensor value may be calculated as the maximum value of measurements taken by the two or more photosensors at a single sample time.

At operation 3630, the processor(s) updates the short term box car and long term box car with the photosensor value determined in operation 3620. In Module C and other control logic described herein, filtered photosensor values are used as input to making tinting decisions. Module C and other logic described herein determines filtered sensor values using short term and long term box cars (filters). A short box car (e.g., box car that employs sample values taken over 10 minutes, 20 minutes, 5 minutes, etc.) is based on a smaller number of sensor samples (e.g., n=1, 2, 3, . . . 10, etc.) relative to the larger number of sensor samples (e.g., n=10, 20, 30, 40, etc.) in a long box car (e.g., box car that employs sample values taken over 1 hour, 2 hours, etc.). A box car (illumination) value may be based on a mean, average, median or other representative value of the sample values in the box car. In one example, the short box car value is a mean value of sensor samples and the long box car value is a mean value of photosensor samples.

At operation 3640, the processor(s) determines the short box car value (Sboxcar value) and the long box car value (Lboxcar value) based on the current photosensor readings in the box cars updated at operation 3630. In this example, each box car value is calculated by taking the mean value of the photosensor readings in the box car after the last update made at operation 3630. In another example, each box car value is calculated by taking the median value of the photosensor readings in the box car after the last update made at operation 3630.

At operation 3650, the processor(s) performing the logic operations of Module C' evaluates whether the value of the absolute value of the difference between the Sboxcar value and the Lboxcar value is greater than a delta threshold value (|Sboxcar Value−Lboxcar Value|>Delta Threshold). In some cases, the value of the Delta Threshold is in the range of 0 millidegrees Celsius to 10 millidegrees Celsius. In one case, the value of the Delta Threshold is 0 millidegrees Celsius.

If the difference is above the delta threshold value, the Sboxcar value is assigned to the photosensor value and the short term box car is reset to empty its values (operation 3660). If the difference is not above the delta threshold value, the Lboxcar value is assigned to the photosensor value and the long term box car is reset to empty its values (operation 3670). At operation 3680, the photosensor value is saved to a database.

In certain implementations, control logic described herein uses filtered sensor values based on temperature readings from one or more infrared sensors and from ambient temperature sensors to determine a cloud condition in the morning and evening and/or at a time just before sunrise. The one or more infrared sensors operate generally independent of sunlight levels allowing for the tinting control logic to determine a cloud condition before sunrise and as the sun is setting to determine and maintain a proper tint level during the morning and evening. In addition, the filtered sensor values based on the temperatures readings from the one or more infrared sensors can be used to determine a cloud condition even when the visible light photosensors are shaded or otherwise obstructed.

IV. Outside Temperature

Tint decision logic may operate by maintaining or improving occupant comfort and minimizing energy consumption. In some approaches, a glare condition from penetration of direct sunlight into the building interior and/or the current cloud conditions factor into decisions made by the tint decision logic. However, for buildings exposed to particularly hot outside temperatures (e.g., at or above 40° C.), additional measures may be advantageous to achieve both occupant comfort and limited energy consumption.

As indicated in the above-described embodiments, tint decisions may be based on information from various sources such as weather feed, sensors, clear sky models, solar position models, etc. However, in some embodiments presented in this section, such tint decisions additionally employ outside temperature information, particularly for tintable windows that face in directions where they are not receiving direct sunlight (e.g., the windows oriented azimuthally away from the sun's current position). For such tintable windows, the tint decision logic might, without using outside temperature information, determine that the tintable windows should be in the clearest tint state, e.g., tint state 1, because little if any solar radiation is directly penetrating into a room of a building. For example, baseline tint decision logic may specify that a tintable window clears if it is not in a direct line of sight with the sun. But if the temperature outside is very high, e.g., 40° C. or higher, there may be so much infrared radiation passing through such a window that the temperature in the room becomes uncomfortably hot very quickly. Therefore, from an indoor temperature and/or air conditioning usage perspective, a relatively clear tint state is ineffective. In other words, while in a relatively clear tint state, either the room may become uncomfortably hot or it requires too much air conditioning to maintain a comfortable temperature in the room. Therefore, in accordance with some embodiments, when the outside temperature is over a defined threshold, the tint decision logic is configured to tint electrochromic windows to a higher tint state (lower optical transmissivity) than would otherwise be required by baseline or default tint decision logic.

Many electrochromic windows and other tintable windows are relatively transparent to infrared radiation. In other words, without tinting or in a relatively clear tint state, these windows may allow significant amounts of indirect, heat-producing solar radiation, particularly infrared radiation, to enter buildings. As an example, an electrochromic window in a clear tint state may have a transmissivity to near infrared radiation (at some wavelengths close to the visible spectrum) of about 50%.

In certain embodiments, temperature, and particularly outside temperature, is used to influence tint state decisions. In various embodiments, when the outside temperature is determined to exceed a particular threshold (or otherwise meet a set of conditions), the outside temperature is used to make the window tint state darker than it would be otherwise. However, the tint decision logic may incorporate outside temperature in many different ways. For example, where the outside temperature is particularly low (as encountered in the winter in temperate climates, at night time, and/or in polar latitudes), the tint decision logic may make the window darker than otherwise specified. This can prevent some IR radiation from escaping the building.

The outside temperature used in such logic may be monitored in various ways. One approach employs an external source of information such as a local weather station that provides weather feed data with current outside temperatures in the vicinity of the building. Another approach employs one or more sensors at or on a building. One such example employs a roof top sensor, such as a sky sensor as described in U.S. patent application Ser. No. 14/998,019 filed Oct. 6, 2015, and incorporated herein by reference in its entirety.

The outside temperature override function may be implemented in various ways. For example, the tint decision override may be implemented as one or more configuration files that apply for particular buildings or portions of buildings that have been are expected to be subject to the problem of excessive infrared radiation penetration when the sun is not in the line of sight of building windows.

In various embodiments, the outside temperature override function described in this section may be used to override, or be used in conjunction with, tint decision logic as described in the sections above. For example, an outside temperature override may be implemented at the operation 2630 of FIG. 26.

1. Example of an Outside Temperature Implementation

In this example, a separate temperature profile is created for each location where installation occurs, e.g., one for Las Vegas, Nevada, another for Phoenix, Arizona, a third for Anchorage, Alaska, another for Greensboro, North Carolina, etc. For each location, a temperature override profile may be created in which outside temperatures in certain ranges or above certain thresholds automatically cause the window to tint by some predefined amount beyond what the tint decision logic would otherwise set (e.g., based on a glare condition from solar penetration into the building, other information determined by clear sky models including reflection models, a cloud cover condition, etc.). This increase in tint state can be particularly defined for windows that would otherwise be in a relatively clear tint states and/or for windows that are outside the sun's line of sight.

2. Example an Outside Temperature Implementation

In this example, an outside temperature reading overrides tint decision logic based on occupant set preferences for particular outside temperatures in the occupants' particular rooms. In some embodiments, the occupants have only limited power to adjust default tint decision logic. For example, if an occupant's preference would require an air conditioning load exceeding a pre-set maximum, the tint decision logic may force a darker tint state the state that would be set using the occupant's preference.

3. Example of an Outside Temperature Implementation

In this example, the tint state logic considers penetration of direct sunlight into a region of a building having a tintable window for which a tint state must be determined. For a direct line of sight, and consequently some penetration of direct solar radiation through the window, the tint state logic employs a default tint state logic to determine a baseline tint state (also referred to as "default tint state") such as that employed in various embodiments described above. Only for tintable windows that do not have any penetration of solar radiation directly through the windows is the modified or override tint decision logic activated. In such cases, the outside temperature may be sufficiently high that the tint state control logic determines that the tint state of the window should be darker than that selected by the default tint state logic. An example of default tint state logic that can calculate penetration depth of direct sunlight into a room through a tintable window and considers the penetration depth in tint decisions is described in U.S. patent application Ser. No. 15/347,677 filed on Nov. 9, 2016, which is incorporated herein by reference in its entirety.

Figure 37:
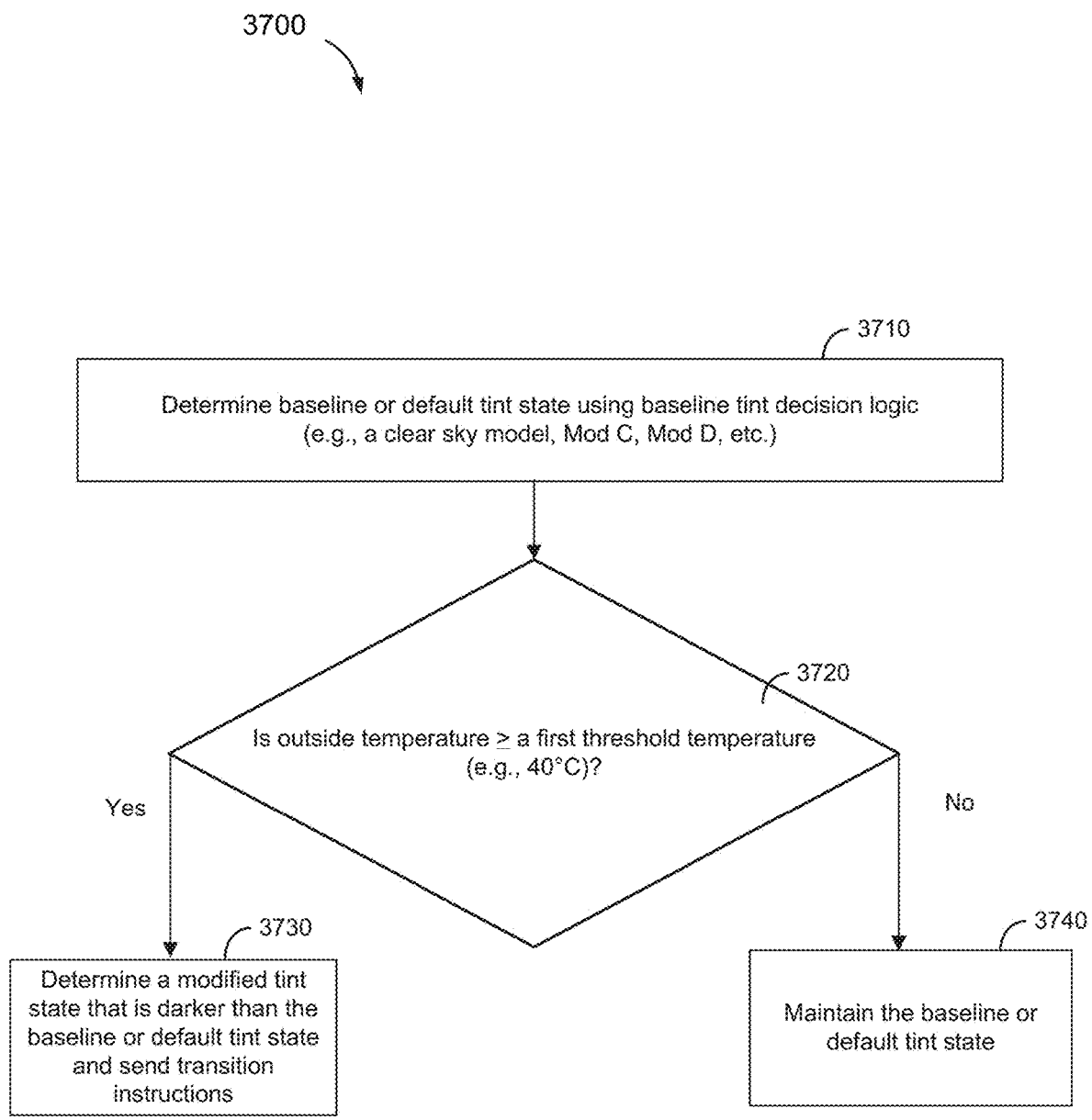
FIG. 37 is a flowchart depicting tint control logic that utilizes outside temperature in tint decisions, according to certain implementations.

FIG. 37 is a flowchart 3700 depicting tint control logic that utilizes outside temperature in tint decisions, according to certain implementations. The operations may be implemented by one or more processors. In one case, the depicted operations are performed as an outside temperature override at operation 2630 of FIG. 26.

At operation 3710, a baseline or default tint state is determined for one or more tintable windows using baseline tint decision logic. Some examples of logic that may be included in baseline tint decision logic are, e.g., a clear sky model, Module C, Module D, etc. In one implementation, the baseline tint decision logic includes logic that determines the baseline tint state using a penetration depth of direct sunlight through a tintable window. The penetration depth may be calculated using the relative position of the sun with respect to the tintable window. In another implementation, the baseline tint decision logic includes logic that determines a position of the sun and determines the baseline tint state using the determined position of the sun. In yet another implementation, the baseline tint logic determines a baseline tint state using a glare condition value determined from clear sky tint schedule data generated by a clear sky model. In yet another implementation, the baseline tint logic determines a baseline tint state using an irradiance value, e.g., determined using a predicted clear sky irradiance and/or from a signal received from one or more sensors.

At operation 3720, it is determined whether the outside temperature is at or above a first threshold temperature (e.g., at least about 40° C.). In another implementation, alternatively or additionally, it is determined whether the outside temperature is at or below a second threshold temperature that is lower than the first threshold temperature.

If it is determined that the outside temperature is at or above a first threshold temperature at operation 3720, the determination is used to determine a modified tint state that is darker than the baseline tint state and tint instructions are provided, e.g., to a window controller, to transition the tintable window to the modified tint state (operation 3730). For example, the baseline tint decision logic may provide a baseline clear tint state after determining there is no glare condition on a tintable windows that is outside the line of sight of direct sunlight. If the outside temperature is determined to be at or above a first threshold temperature, e.g., 40° C., it may be determined to use a modified tint state that is one or two levels higher than the clear tint state. As another example, the baseline tint decision logic may provide a dark tint state after determining that the tintable window is in the line of sight of direct sunlight and that sunlight directly penetrates into the building interior through a tintable window and overlaps an occupancy region in the room with the tintable window. In this example, if the outside temperature is determined to be at or above a first threshold temperature, e.g., 40° C., it is determined to maintain the baseline tint state.

If it is determined that the outside temperature is not at or above a first threshold temperature at operation 3720, the baseline or default tint state is maintained (operation 3740). Tint instructions may be provided to maintain the tintable window at the default tint state.

In certain embodiments described herein, control logic determines tint levels (states) based on a condition that is likely to occur at a future time (also referred to herein as a "future condition"). For example, a tint level may be determined based on the likelihood of the occurrence of a cloud condition at a future time (e.g., $t_i$=present time+time duration such as the transition time for the one or more electrochromic windows). The future time used in these logic operations may be set to a time in the future that is sufficient to allow the transition of the window to the tint level to be completed after receiving the control instructions. In these cases, a controller can send instructions in the present time in advance of the actual transition. By the completion of the transition, the window will have transitioned to the tint level that is desired for that future time. In other embodiments, the disclosed control logic may be used to determine tint levels based on a condition occurring or likely to occur at present time, e.g., by setting the time duration to 0. For example, in certain electrochromic windows the transition time to a new tint level, e.g., to an intermediate tint level, may be very short so that sending instructions to transition to a tint level based on the present time would be appropriate.

It should be understood that techniques as described above can be implemented in the form of control logic using computer software in a modular or integrated manner. Based on the disclosure and teachings provided herein, a person of ordinary skill in the art will know and appreciate other ways and/or methods to implement the disclosed techniques using hardware and a combination of hardware and software.

Any of the software components or functions described in this application, may be implemented as software code to be executed by a processor using any suitable computer language such as, for example, Java, C++ or Python using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

Although the foregoing disclosed embodiments have been described in some detail to facilitate understanding, the described embodiments are to be considered illustrative and not limiting. It will be apparent to one of ordinary skill in the art that certain changes and modifications can be practiced within the scope of the appended claims.

Although the foregoing disclosed embodiments for controlling lighting received through a window or a building's interior have been described in the context of optically switchable windows such as electrochromic windows, one can appreciate how the methods described herein may be implemented on appropriate controllers to adjust a position of a window shade, a window drapery, a window blind, or any other device that may be adjusted to limit or block light from reaching a building's interior space. In some cases, methods described herein may be used to control both the tint of one or more optically switchable windows and the position of a window shading device. All such combinations are intended to fall within the scope of the present disclosure.

One or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure.

What is claimed is:

1. A method of determining a tint state of at least one tintable window, the method comprising:
   (a) determining a baseline tint state for the at least one tintable window;
   (b) determining, based at least in part on an outside temperature and a determination that penetration depth of direct sunlight is below a predetermined threshold, a modified tint state that is darker than the baseline tint state; and
   (c) providing instructions to transition the at least one tintable window to the modified tint state.

2. The method of claim 1, wherein (b) further comprises determining that the outside temperature is below a temperature threshold.

3. The method of claim 2, wherein the temperature threshold is determined based on user input.

4. The method of claim 1, wherein the baseline tint state is determined in (a) using a determination of a position of sun.

5. The method of claim 1, wherein the baseline tint state is determined in (a) using a glare condition value.

6. The method of claim 1, wherein the baseline tint state is determined in (a) using a penetration depth of direct sunlight into a room having the at least one tintable window.

7. The method of claim 1, wherein the baseline tint state is determined in (a) using a glare condition value and/or one or more sensor readings.

8. The method of claim 7, wherein the one or more sensor readings are taken by at least one infrared sensor and/or at least one photosensor.

9. The method of claim 1, wherein the at least one tintable window comprises an electrochromic device.

10. The method of claim 1, wherein the baseline tint state is determined in (a) using one or more tint decision algorithms.

11. The method of claim 1, wherein the baseline tint state is determined based on an irradiance at a building the at least one tintable window is disposed in.

12. The method of claim 11, wherein the irradiance is detected based on a signal received from a sensor configured to detect light in a visible range of wavelengths, the sensor located on a roof the building.

13. A system for controlling tint of a tintable window located between an interior and an exterior of a building, the system comprising:
   (a) one or more processors configured to:
      determine a baseline tint state for the tintable window;
      determine, based at least in part on an outside temperature and a determination that penetration depth of direct sunlight is below a predetermined threshold, a modified tint state that is darker than the baseline tint state; and
      provide instructions to transition the tintable window to the modified tint state;
   (b) a controller in communication with the one or more processors and with the tintable window, wherein the controller is configured to apply commands to transition the tintable window to the modified tint state.

14. The system of claim 13, wherein the one or more processors are further configured to receive data from one or more sensors, and wherein the baseline tint state is determined based at least in part on the received data.

15. The system of claim 14, wherein the received data is indicative of an irradiance at the building.

16. The system of claim 13, wherein the one or more processors are further configured to determine a position of sun with respect to the tintable window, wherein the baseline tint state is determined based at least in part on the determined position of the sun.

17. The system of claim 13, wherein the baseline tint state is determined using a glare condition value.

18. The system of claim 13, wherein the baseline tint state is determined using a penetration depth of direct sunlight into a room having the tintable window.

19. The system of claim 13, wherein the one or more processors are further configured to determine that the outside temperature is below a temperature threshold.

20. The system of claim 19, wherein the temperature threshold is determined based on user input.

* * * * *